United States Patent
Fukasawa et al.

(10) Patent No.: US 7,154,538 B1
(45) Date of Patent: Dec. 26, 2006

(54) IMAGE PROCESSING SYSTEM, IMAGE PROCESSING METHOD, IMAGE UPLOAD SYSTEM, STORAGE MEDIUM, AND IMAGE UPLOAD SERVER

(75) Inventors: Toshihiko Fukasawa, Machida (JP); Kenichiro Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 863 days.

(21) Appl. No.: 09/708,907

(22) Filed: Nov. 8, 2000

(30) Foreign Application Priority Data

| Nov. 15, 1999 | (JP) | ................................ 11-323850 |
| Nov. 16, 1999 | (JP) | ................................ 11-325339 |
| Oct. 17, 2000 | (JP) | ............................ 2000-316647 |

(51) Int. Cl.
*H04N 5/232* (2006.01)

(52) U.S. Cl. .................................................. 348/211.3
(58) Field of Classification Search ............. 348/211.3, 348/207.1, 207.11, 211.11, 211.14; 725/105
See application file for complete search history.

(56) References Cited

U.S. PATENT DOCUMENTS

| 5,623,601 | A | * | 4/1997 | Vu .............................. 713/201 |
| 5,805,215 | A | * | 9/1998 | Mizoguchi ............... 348/231.5 |
| 5,944,790 | A | * | 8/1999 | Levy ......................... 709/218 |
| 6,017,157 | A | * | 1/2000 | Garfinkle et al. ........... 396/429 |
| 6,125,145 | A | * | 9/2000 | Koyanagi et al. ........ 348/413.1 |
| 6,223,190 | B1 | * | 4/2001 | Aihara et al. .......... 348/207.99 |
| 6,301,607 | B1 | * | 10/2001 | Barraclough et al. ....... 709/217 |
| 6,323,897 | B1 | * | 11/2001 | Kogane et al. ............. 348/159 |
| 6,370,498 | B1 | * | 4/2002 | Flores et al. .................... 704/3 |
| 6,556,241 | B1 | * | 4/2003 | Yoshimura et al. .... 348/211.99 |
| 6,571,271 | B1 | * | 5/2003 | Savitzky et al. ............ 709/200 |
| 6,698,021 | B1 | * | 2/2004 | Amini et al. ................ 348/143 |
| 6,763,377 | B1 | * | 7/2004 | Belknap et al. ............. 715/736 |
| 6,803,945 | B1 | * | 10/2004 | Needham ................. 348/211.3 |
| 2002/0138847 | A1 | * | 9/2002 | Abrams et al. ............. 348/373 |
| 2002/0163579 | A1 | * | 11/2002 | Patel et al. .............. 348/207.1 |
| 2003/0122954 | A1 | * | 7/2003 | Kassatly ..................... 348/335 |
| 2005/0078189 | A1 | * | 4/2005 | Creamer et al. ......... 348/207.1 |
| 2006/0031902 | A1 | * | 2/2006 | Creamer et al. ............ 725/105 |
| 2006/0203285 | A1 | * | 9/2006 | Yamaguchi et al. ....... 358/1.13 |

OTHER PUBLICATIONS

Jeffrey Rowe, "Hypertext to Hypermedia and Beyond: The Evolution Continues", 1997 ACM Special Interest Group for Design Communications: Proceedings of the 15th Annual International Conference on Computer Documentation 237.*

* cited by examiner

*Primary Examiner*—Vivek Srivastava
*Assistant Examiner*—Jason Whipkey
(74) *Attorney, Agent, or Firm*—Morgan & Finnegan, LLP

(57) ABSTRACT

The image upload system of the present invention, comprising, inter alia: a capture unit for capturing the image data from an image input apparatus disposed on a network; a storage unit for storing the plural captured image data; an image capture control unit for controlling the capture unit according to a previously designated schedule; a creation unit for creating a display image by adding information at image capture time to the captured image data captured by the capture unit, and a transmission unit for transmitting the created display image, allows information such as an image data capture date and time, an image data size or the like to be embedded as a part of the image data to be displayed.

70 Claims, 35 Drawing Sheets

FIG. 8

```
<html>
    <head>                                    801
    <title>SAMPLE OF TEMPLATE FILE</title>
    </head>

802
    <body>
        @@IMAGE_CAPTION@@<p>
                                803
        <p>
        DATE : @@DATE_STAMP [%Y YEAR % m MONTH % d DATE (%a)]@@<p>
        TIME : @@DATE_STAMP [%H : %M]@@<p>
        <p>
        <image src="@@IMAGE_FILE@@" >   804
    </body>
                                     805
</html>
```

```
<html>
    <head>                                    806
    <title>SAMPLE OF TEMPLATE FILE</title>
    </head>

807
    <body>
        VIDEO OF MT. FUJI<p>
        <p>              808
        DATE : JAN. 21, 1999 (TUE.) <p>
        TIME : 10:00 A.M. <p>
        <p>         809
        <image src="mt_Fuji.jpg" >
    </body>
                              810
</html>
```

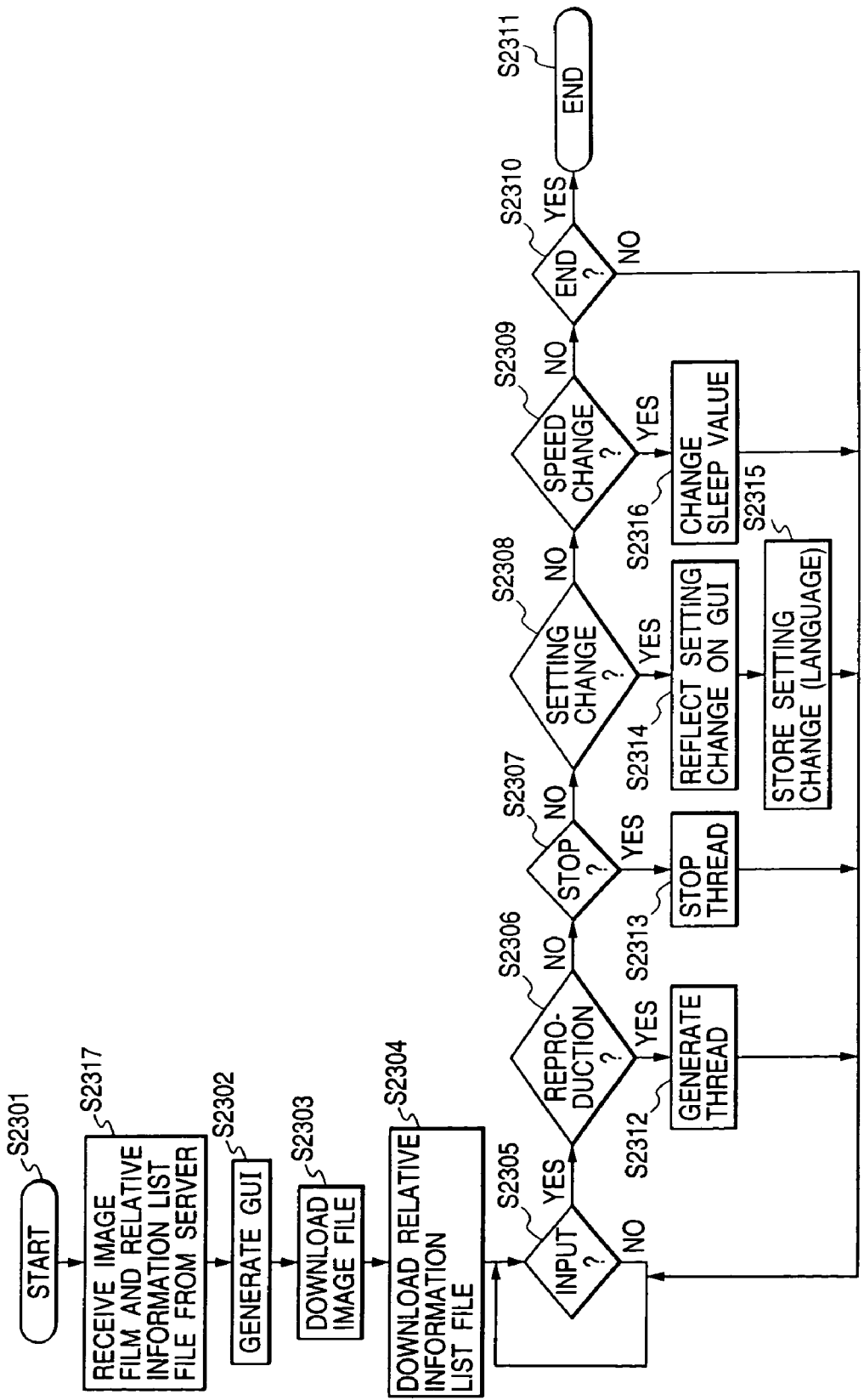

IMAGE PROCESSING SYSTEM, IMAGE PROCESSING METHOD, IMAGE UPLOAD SYSTEM, STORAGE MEDIUM, AND IMAGE UPLOAD SERVER

BACKGROUND OF THE INVENTION

1. Field of the Invention

The present invention relates to an image transmission service in a computer network and an apparatus used for this image transmission service. Further, the present invention relates to a service which periodically captures or obtains an image of a video camera or the like, accumulates image data, and provides the accumulated image data to unspecified users.

2. Related Background Art

Computer networks such as the Internet, an intranet and the like have been spread rapidly by the appearance of the WWW (World Wide Web). Thus, it is possible by the WWW to provide information to a lot of unspecified people and to capture necessary information from a lot of unspecified people.

Ordinarily, it is possible by the WWW to provide previously prepared text, image (video) and voice (audio) to a lot of unspecified users. The diversification of applied form of the WWW caused a demand for capturing not the previously prepared data but the data representing the image, the voice and the like and publishing the captured data.

As one answer for such a need, an image upload system (also called an image upload service) has been designed and manufactured. In the image upload system, image data is captured periodically (or according to a predetermined schedule) from a video camera. Then, the captured image data is transmitted to an Web server, and an image file (or an HTML (Hypertext Markup Language) file in the Internet) is made. This process is called an upload.

However, in such the image upload system, since an image is always overwritten, a client side can refer only to the latest one image. Further, in the Internet world, a document made with a description language such as HTML or the like is stored in a server, and information representing a page desired by a user is then transmitted according to a client's transfer request. Even in this Internet world, to cope with access from all over the world, a page of the same contents is made in plural languages, and the respective pages are stored in the server. Namely, the plural pages which have the same contents and are expressed in the different languages are stored in the server.

Further, there are a lot of monitoring systems of the type for imaging by operating a camera. However, even in these systems, there are a lot of situations that it is not easy to guess the direction of the camera on the basis of the formed image. Even if image information representing the camera direction and the like is displayed together with the image itself on the client side, when such the image information is presented in the Internet, there is a possibility that worldwide users access it. In this case, if there is no function to select the appropriate language for such the information, there is some fear that the users who can not understand the meaning of this information arise.

FIG. 4 is a diagram showing the schematic of a general image upload service. An image upload host computer 401 (or image upload host) 401 is a computer which has a function to provide the image upload service. A video camera 402 is connected to the image upload host 401. The image upload host 401 captures (or obtains) an image from the video camera 402 in accordance with a predetermined schedule. Captured image data is then transmitted to a WWW host computer (or WWW host) 403 through a computer network 404. Such a series of processes is called an image upload process. The WWW host 403 records the transmitted image data in a hard disk or the like. Thus, users 406 of the image upload service can watch the image data recorded and accumulated in the WWW host 403, by using a Web browser, such as Internet Explorer (trademark: TM), on user device 405.

FIG. 5 shows an example of the image data which is displayed by the Web browser. One window 501 is being opened to display the image data. On the window 501, image data 502 and character information 503 and 504 relating to the image are displayed. Numeral 506 denotes contents of an HTML file which define how the data should be displayed on the window 501. Namely, a line 507 in the contents 506 designates display content and style of the character information 503 on the window 501, and a line 509 designates display content and style of the character information 504. The image data 502 is defined by a line 508.

However, in the conventional upload system, the user can watch the latest image but can not watch the previously taken image.

Further, there is a demand for displaying when, where and how the uploaded image data was captured (taken). Also, there is a demand for displaying the past image data in the form of list or the like.

However, such the HTML file 506 for displaying the image data must be previously made in the WWW host 403. This does not especially become a problem when the information such as the character information 503 or 504 which can be previously prepared (e.g., information such as photographing position information which does not change according to the image itself) is provided.

However, there is information of which value can not be found until the image data is recorded in the WWW host 403. For example, such the information represents an image data capture time (a capture end time), an image data size, peripheral voice, a peripheral noise and the like. Such the information can not be embedded in the previously prepared HTML file. Thus, in order to display such the information, an administrator must purposely update an HTML document after capturing the image. Further, although it is possible to provide a photographing date or so by incorporating it into an image when photographing the image with a camera, in this case, a character enters the image without fail. Thus, it is impossible to purely provide the image alone.

Namely, since the conventional upload service merely uploads the image data file, it is necessary to previously prepare the page for displaying the uploaded image data in the WWW server. Thus, since such the page must be previously prepared, there is a drawback that it is impossible to display (provide) information (e.g., image data capture date information, data size information, or the like) which can not be known until the image data is actually captured.

Further, since the number of image files capable of being displayed is fixed, it is impossible to watch the arbitrary number of images in the form of list. Further, it is impossible to increase the number of display images every time a new image file is uploaded.

Further, there is a need for editing of the image data captured, i.e., to embed date and message to image data, or to make a panoramic image by joining plural image data together.

Further, even if the past-photographed images can be watched, e.g., when image files are continuously accumulated in the hard disk of the WWW host by periodically uploading these image files, such the accumulated data finally exceeds the capacity of the hard disk. Thus, a new image can not be captured anymore.

Further, as the number of users who enjoy a WWW service increases, as a data quantity to be provided to the user increases, or as the number of provided services increases, it is anticipated not to be able to cope with such increment with the single WWW server.

However, the conventional upload service premises that the WWW server and the upload service are operated and controlled with the identical host. Even if it is not so, since the upload destination is fixed to be one, the conventional upload service can not deal with the complicated operation of the WWW server.

The present invention aims to provide an upload service which can be managed by the plural WWW servers.

In the above conventional system, only one image data is captured at a preset time and then uploaded.

In many cases, such the preset time is determined expecting some events to occur at that time. Thus, it is desirable not to upload a similar image every day but to upload an image with change to some extent day by day (e.g., to upload today an image which includes by chance a bird flying over the sky). However, in the conventional example that only one image data is captured at the specific time, it is necessary to relay on chance to achieve such an effect as above, whereby it is actually easy to continuously provide substantially the same image.

However, it is complicated for the administrator (or a manufacturer) to prepare beforehand the pages of the plural languages as in the conventional case. On the other hand, when the client side wishes to change a Japanese page to an English page, after the download of the Japanese page the client side must again download the English page of which contents are substantially the same as those of the Japanese page, whereby it takes time to finally confirm the contents of the English page.

SUMMARY OF THE INVENTION

An object of the present invention is to solve all or a part of the above conventional problems.

Another object of the present invention is to provide an upload system which provides new service by which previously photographed images can be watched, and further provide an upload system which can easily provide information representing an image photographing time and cope with various display form and editing requests.

In order to achieve the above object, the present invention discloses an image processing system comprising: a capture means for capturing image data from an image input apparatus disposed on a network; a storage means for storing the plural image data captured by the capture means and, beside the image data, information at the image capture time; a creation means for creating display image control data from the image data captured by the capture means and the information at the image capture time, the display image control data being the data to control an image for display; and a transmission means for transmitting the display image control data created by the creation means.

Still another object of the present invention is to reduce providing of the same image and increase freedom degree of selection of an image to be uploaded.

In order to achieve the above object, the present invention discloses an image processing system comprising: an image data capture means for capturing image data according to a previously set schedule; a creation means for creating from the plural image data captured by the image data capture means an image to be uploaded to a network, on the basis of a predetermined estimate standard; and a transmission means for transmitting the image created by the creation means, through the network.

Still another object of the present invention is to provide an image processing apparatus and an image processing method which can smoothly change a displayed language and do not store data wastefully in a server.

In order to achieve the above object, the present invention discloses an image processing apparatus comprising: a download means for downloading from a server relative information being relative to an image and capable of being selected and displayed from plural languages, together with the image; a storage means for storing the information downloaded by the download means; a reproduction means for reproducing the image from the storage means; a display means for displaying the image reproduced by the reproduction means; a selection means for causing a user to select any of the plural languages; and a display control means for reading from the storage means the relative information of the language selected by the selection means, and causing the display means to display the read relative information together with the image.

Other objects and features of the present invention will become apparent from the following detailed description and the attached drawings.

BRIEF DESCRIPTION OF THE DRAWINGS

FIG. 8 is a diagram showing an example of a template file;

FIG. 34 is a flow chart showing an operation procedure according to the fifth embodiment;

DETAILED DESCRIPTION OF THE PREFERRED EMBODIMENTS

First Embodiment

Figure 1:
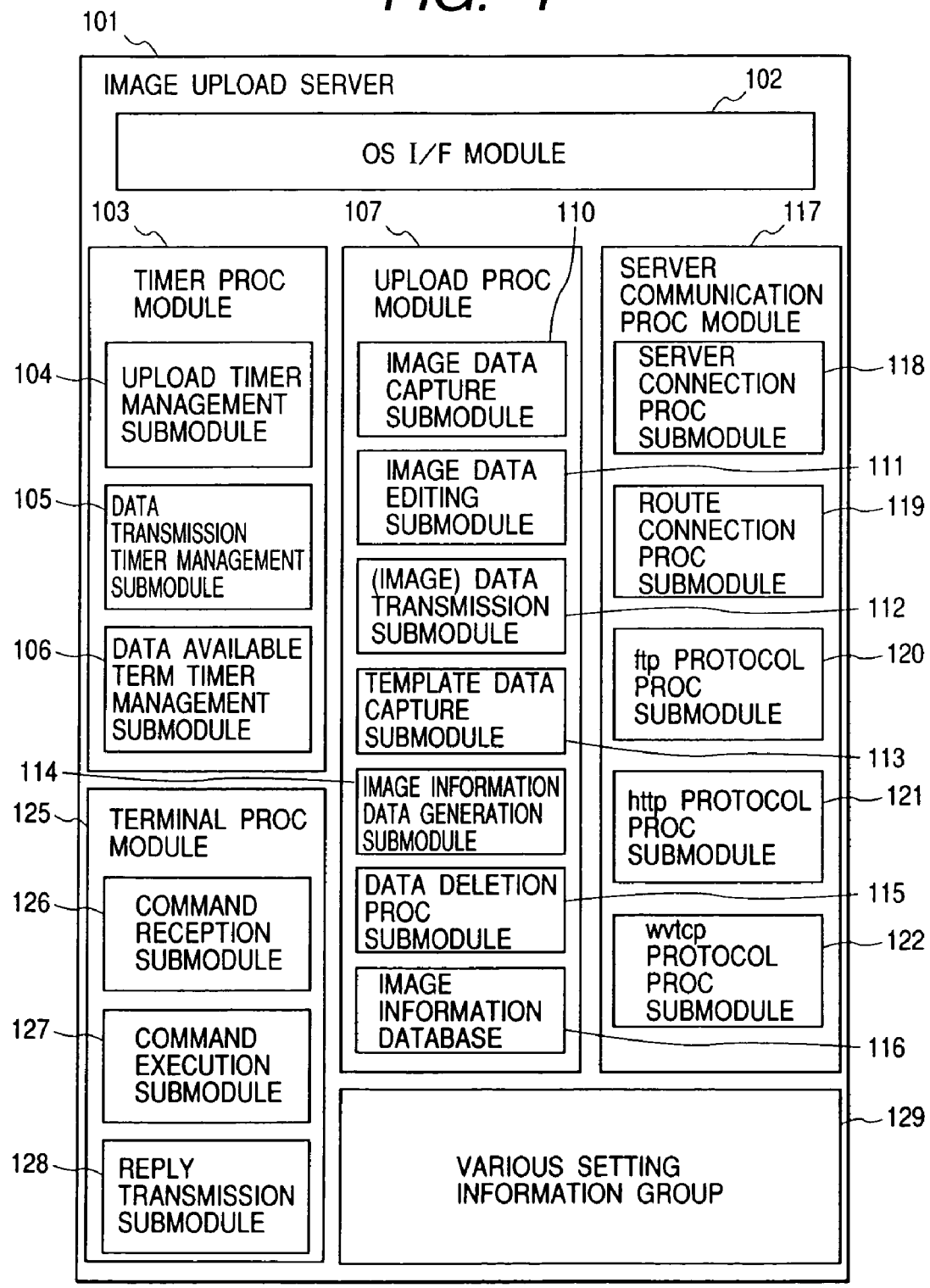
FIG. 1 is a diagram showing a software structure according to the first embodiment of the present invention.

Hereinafter, an image upload server according to the first embodiment will be explained. First, terms and the like which are used in the following explanation will be briefly explained.

(Image Upload)

Image upload image data is captured from a video camera or the like, and the captured data is transmitted to a host (host computer) such as WWW host which is convenient for a user. The host which received the data performs a process to, e.g., store the image data in a secondary storage.

(Point)

The term "point" represents one point on a time axis (i.e., one point in time) which can be designated or defined by date and time. The "point" sometimes includes a day of the week. Ordinarily, the term "date" or "time" itself represents one point in one case, and represents the date or the time as a structural component of the point in the other case. In order to avoid confusing, in the following explanations, the terms "date" and "time" must respectively represent the date and the time as the structural components of the "point".

(Object Management)

The term "object management" represents a process that one group of objects is managed or controlled. Namely, in the object management, a process to add an object to the group, a process to delete an object from the group, a process to capture or obtain from the group an object satisfying a certain condition, or a process to apply an appropriate process to an object in the group (e.g., to rewrite an attribute value) is performed if necessary.

In implementation, the object management can be easily realized by holding an object ID of the object belonging to the group in a list, a table or the like. A module which is named "management module" surely has such a function of the object management.

(Object/Object ID/Object Area)

The term "object" represents a configuration when data is set in a main memory. The object is referred with "object ID", and an area on the memory where the object is set is called "object area". In many cases, a head address of the memory area on which the object is set is used as the object ID.

(Object Attribute/Attribute Value)

When each of data constituting the object is referred, such the data is called "attribute of object" or simply "attribute". For example, it will be described that a file object has a file name as the attribute. When the concrete value of the attribute is referred, such the value is called "attribute value". It should be noted that, in implementation, the attribute value corresponds to an instance variable and its value in an object directive language.

(Software Module/Submodule)

The term "software module" which is also called "module" simply represents a logical structural component of software. In implementation of software, the module corresponds to (one) function, aggregation of plural functions (i.e., a function group), a source file, a class of the object directive language, and the like.

The module is sometimes constituted by smaller structural components. In this case, such the structural component of the module is called "inferior module" or "submodule".

(Module Entry Point)

The term "entry point of module" represents an interface which causes one module to perform some process. In implementation, the entry point of the module corresponds to a global function, a global procedure and the like. When appropriate data is given to the entry point to call it, the module performs an appropriate process. When the process at the called module side ends, the processed result is given to the side (ordinarily another module) which called the entry point.

Such a series of the above processes is represented "an entry point a of a module A is called". When there is only one entry point published by the module A, it is possible to represent "the entry point of the module A is called" or "the module A is called".

(Gateway/Gateway Host)

In case of connecting two computer networks, they are sometimes connected to each other through a gateway host. Namely, the gateway host is the host computer which limits or restricts data exchange between the connected computer networks. For example, it is assumed that two computer networks A and B are connected to each other, and that a computer a connected to the network A communicates with a computer b connected to the network B. When any gate host is not disposed between the networks A and B, the computer a can directly communicate with the computer b. However, when a gateway host G is disposed between the networks A and B, the communication must be performed in the following procedure. Namely, (1) the computer a communicates with the host G, (2) the computer a requests the host G to transfer communication contents to the computer b, and (3) the host G checks the contents and then transfers them to the computer b if there is no problem.

Further, when a reply for the contents transmitted from the computer a is returned, the following procedure is necessary. Namely, (4) the computer b starts communicating with the host G to transmit the reply to the computer a, (5) the computer a requests the host G to transfer communication contents to the computer b, and (6) the host G checks the contents and then transfers them to the computer a if there is no problem.

The term "gateway" represents software which causes an ordinary computer to act as the gateway host. The gateway is sometimes called "gateway server".

(Communication Between Processes/Message/Reply/Host Name/Port Number/Socket)

When two programs mutually exchange data, a communication mechanism between processes is used. Generally, the communication mechanism between processes is incorporated in an operating system. Especially, the communication mechanism between processes in which a socket interface is applied is widely used.

In order to perform the communication between the processes with the socket interface, it is necessary to first prepare the following data, i.e., a name ("host name") of a computer in which software of a communication partner is running, and an ID of a data reception port which has been provided by the software of the communication partner for the communication between the processes. Such the data reception port is simply called "port", and such the ID of the port is called "port number".

When the host name and the port number are prepared, the communication between the processes can be performed in the following procedure. Namely, (1) a socket is made. Here, the socket corresponds to "communication path" established between the communication origin and the communication partner. However, at this time, the communication path is merely pro form a and thus can not be used for the communication as it is. Then, (2) the socket is initialized by using the host name and the port number. By these processes, the above "communication path" functions as an actual communication path.

The process composed of the above processes (1) and (2) is called "connection process". When the connection process succeeds, it is possible to transmit the data by using the socket. At this time, the data exchanged by using the socket is called "message". When the word representing the content of the message is added, the message is sometimes called "request message" or "return message". Further, the return message is sometimes called "reply message" or simply "reply".

(Communication Protocol)

When the communication between the processes is performed, there is a case where the program of the communication partner accepts only a specific-pattern message. The term "communication protocol" defines the pattern of such the message. The communication control is sometimes called simply "protocol". The protocols used normally are enumerated as follows. It should be noted that following protocols are used in the first embodiment.

<ftp Protocol>

The acronym "ftp" represents "file transfer protocol". This ftp protocol is used when a file is exchanged between programs. A server dedicated to process the ftp protocol is called "ftp server". Refer to Request for Comments 765 (simply called RFC765 hereinafter) for the details of the ftp protocol.

<http Protocol>

The http protocol is used for the WWW service. Mainly the http protocol is used when the Web browser captures or acquires data from the WWW server. Refer to RFC1945 and RFC2068 for the details of the http protocol.

(WWW (World Wide Web) Service)

The WWW service is the service which is provided by the server called the WWW server or the Web server. A user can capture or obtain various information from the WWW server by using the Web browser such as Internet Explorer™ or the like. The WWW server and the Web browser exchange the message with the http protocol. Thus, the WWW server is sometimes called "http server".

Figure 6:
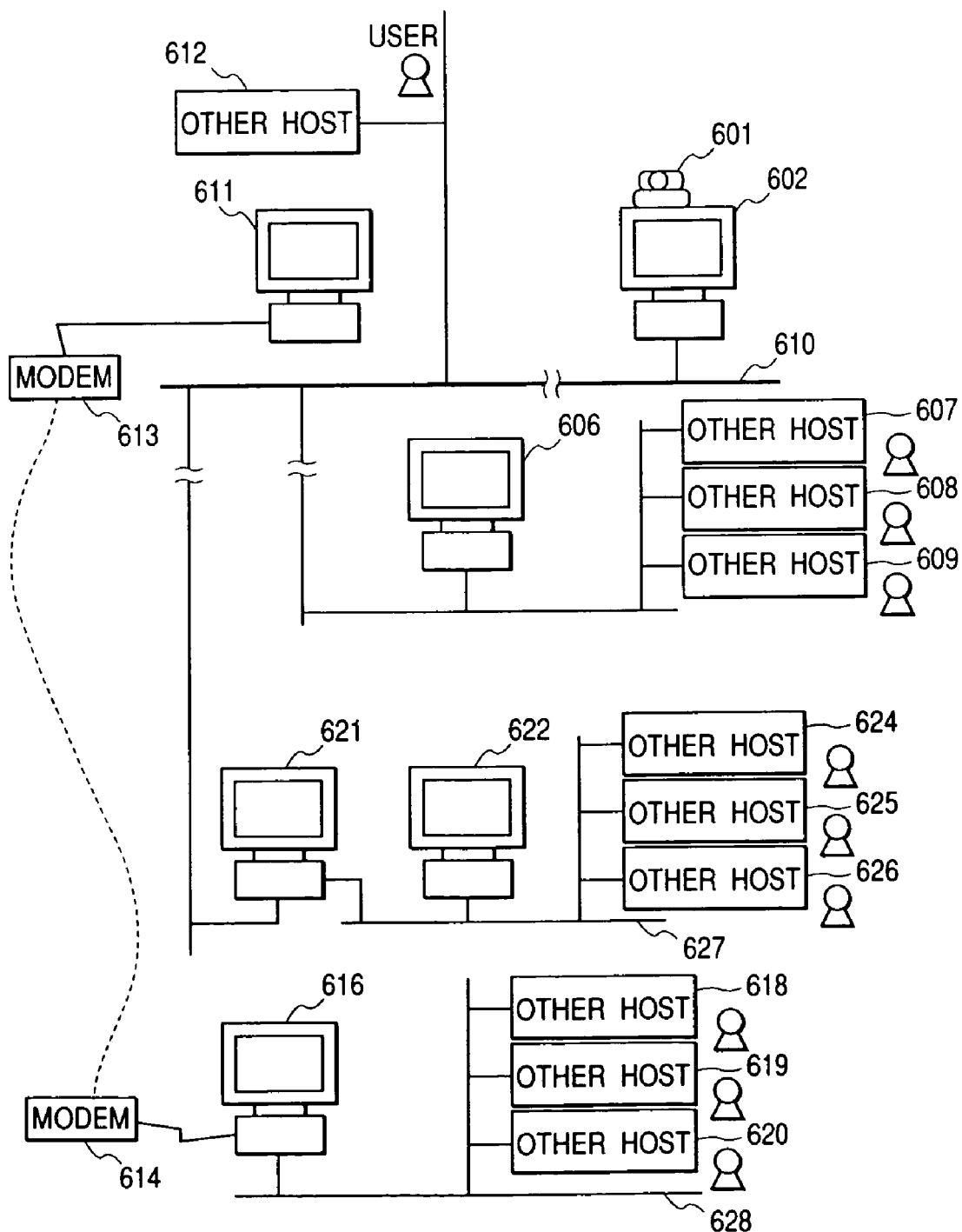
FIG. 6 is a block diagram showing the schematic of the first embodiment.

FIG. 6 is a block diagram showing the schematic of the first embodiment.

A camera server host 602 gives service to provide image data to a user through a computer network 610.

Since a video camera 601 is connected to the camera server host 602, the host 602 captures or obtains an image from the video camera 601 The host 602 can capture, in one frame, the image data of 10 KB or so corresponding to maximum ten sheets for one second. An image upload host 611 is one of clients of the camera server host 602. The host 611 periodically captures the image data from the camera server host 602, e.g., one frame every ten minutes. Also, the host 611 can capture an animation for a certain time and then manage it as a group of data.

The image data is transmitted to a general WWW host 606. The host 606 stores the received image data in a hard disk or the like such that a user can refer to the data by using the Web browser. In FIG. 6, three users use the Web browser by other hosts 607, 608 and 609 respectively.

The image upload host 611 performs an upload process of the image data and simultaneously generates (or creates) information (image information data) concerning the image data. Thus, also the image information can be uploaded. An HTML file for displaying the image data can be considered as one of the image information data. Also, it is possible to generate the different-content HTML file for each image data.

The image upload host 611 can upload the image data to a WWW host such as a WWW host 616 connected to a forward computer network 628, through modems 613 and 614. Further, the image upload host 611 can upload the image data to a WWW host such as a WWW host 622 connected to a forward computer network 627, through a gateway host 621.

Also, the host 611 can perform the upload process to the WWW hosts 606, 616 and 622 simultaneously. Namely, the host 611 can upload the same image to these three WWW hosts and capture images respectively from different camera servers.

Ordinarily, the upload host 611 is set to periodically perform an image upload process. By using a terminal client, it is possible to immediately perform the image upload process regardless of the setting. Such a function is used to check whether or not the periodical setting of the upload process operates without any trouble. In FIG. 6, one user starts the terminal client one other host 612.

Figure 5:
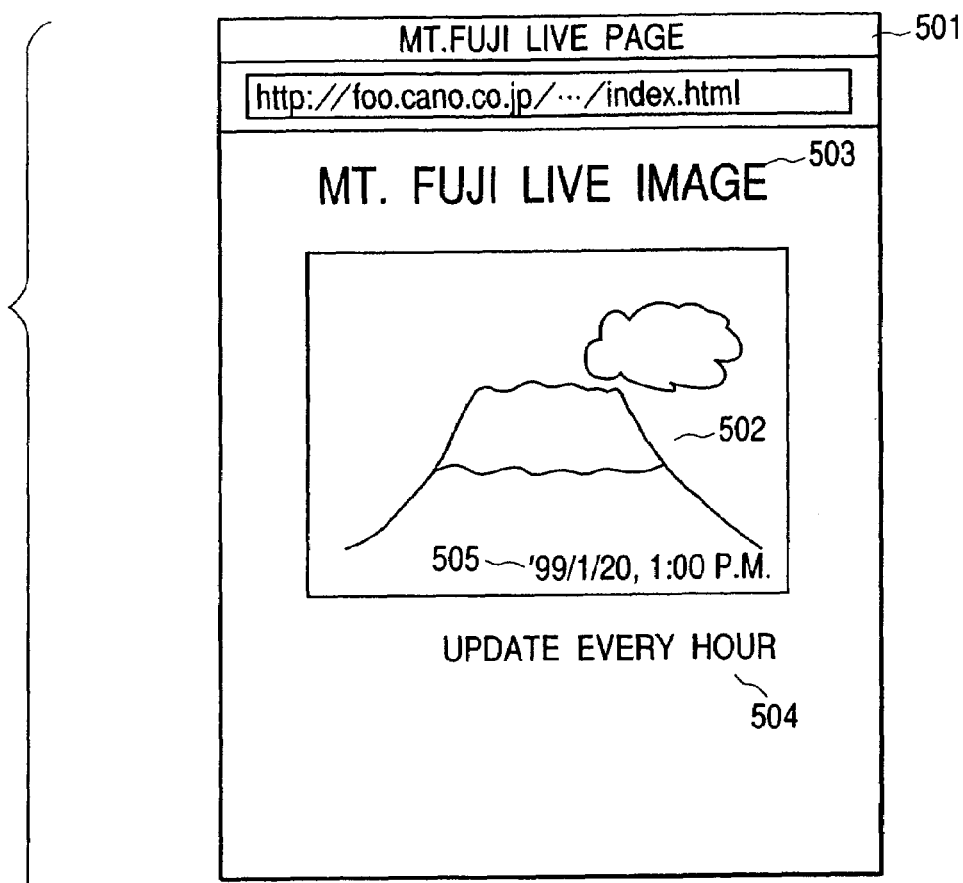
FIG. 5 is a diagram showing a user interface in the conventional example.
Figure 7:
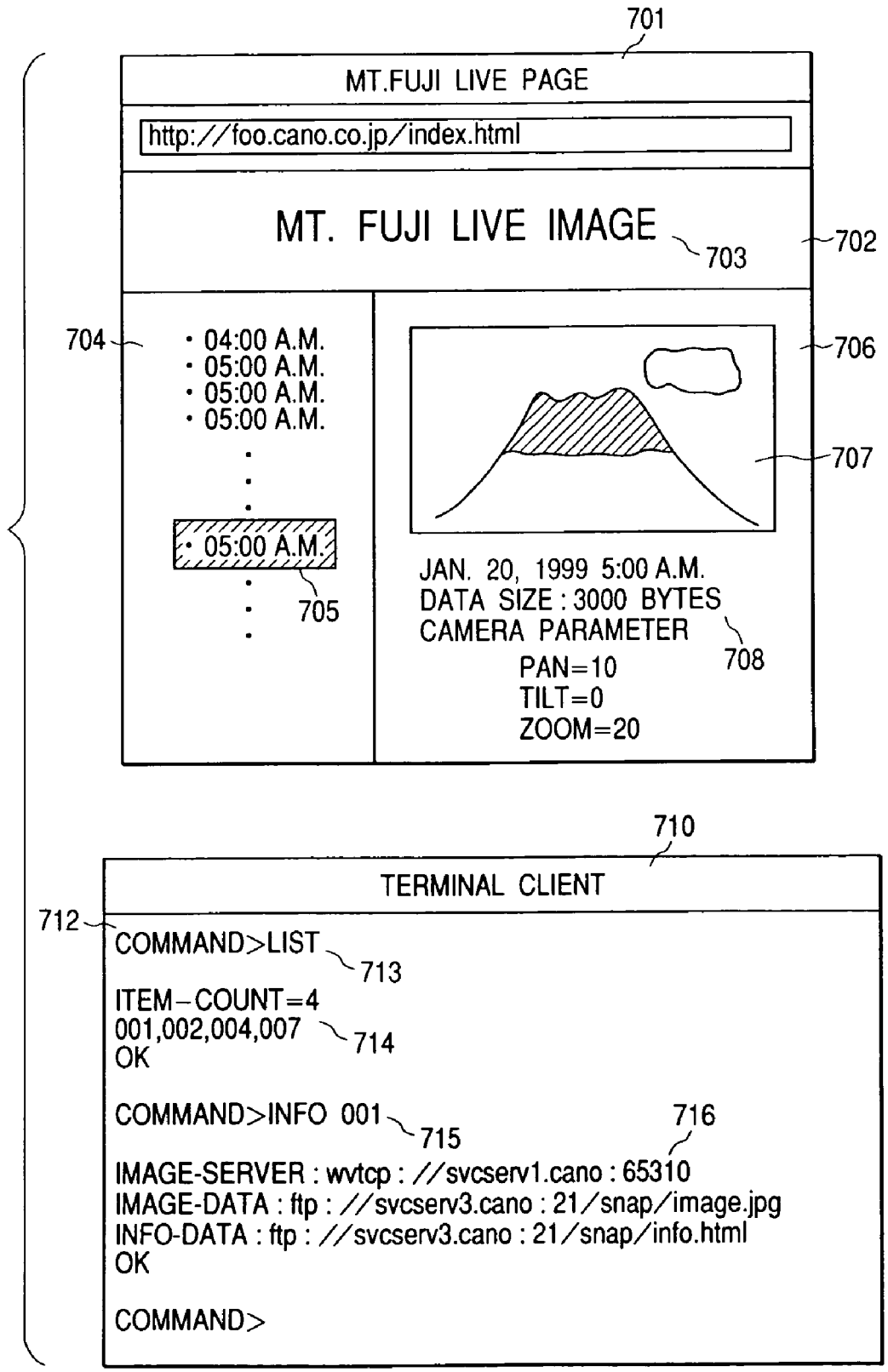
FIG. 7 is a diagram showing an example of a user interface according to the first embodiment.

FIG. 7 is a diagram showing an example of a user interface which is provided according to the first embodiment. Numerals 701 to 708 denote examples of image data display areas (contents) respectively. Like FIG. 5, the window 701 is being opened. The window 701 is divided into the three display areas 702, 704 and 706.

The display area 702 displays information such as the page title 703 which can be prepared beforehand. The display area 704 displays a list of the images files which can be watched by the user. A character string in each item represents a time when the corresponding image was captured from the video camera. In FIG. 7, the image data 705 which was captured at 05:00 a.m. is selected.

The display area 706 displays the image data 707 and the image information data 708. The image information data 708 includes the image data capture date, the image data capture time, the size of the captured image data, and the information concerning the video camera (e.g., pan, tilt and zoom values representing the camera direction in FIG. 7).

In the present embodiment, such the information which changes according to the image data can be provided to the user.

Numerals 710 to 716 are directed to an example of the terminal client. Namely, the window 710 displays a general terminal program such as Telnet (telecommunication network) or the like. The user inputs a command after the prompt 712 displayed on the window 710. The input command is transmitted to the image upload host and then processed. Then, the processed result is returned to the terminal program and displayed on the window 710.

In FIG. 7, the two commands, i.e., LIST 713 and INFO001 715, are executed, and the respectively corresponding results 714 and 716 are displayed.

The LIST command 713 inquires how many upload setting there is in the image upload host. The result 714 displays the four upload settings which are added with ID's 001, 002, 004 and 007 respectively.

The INFO001 command 715 requests displaying the content of the upload setting 001. The result 716 represents that a camera server "IMAGE-SERVER" gives a service at a host "svcserv1.cano.co.jp" and with a port number "65310" and uses a communication protocol "wvtcp" for image capture. The protocol "wvtcp" is used to capture an image from a camera server "WebView/Livescope"™.

Otherwise, the following commands are available.

<ACTN>

The ACTN command has a format ACTN<timer setting object ID>.

When this command is transmitted to the image upload server, an upload process which should be performed at a previously designated point is immediately performed without waiting such the designated point. The timer setting object ID is added to the information concerning such the designated point, and the detail thereof will be explained later.

When this command is executed, a message which shows passage of the upload process is provided to the user. When the process succeeds, a character string "OK" is displayed. When the process fails, a character string "ERROR" and its reason are displayed.

An example in which the ACTN command is used will be shown as follows.
>LIST
ITEM-COUNT=4
001, 002, 004, 007
OK
>INFO001
IMAGE-SERVER:wvtcp://svcserv1.pc.cano.co.jp:65310
IMAGE-DATA:ftp://svcserv3.xpc.cano.co.jp:21/Upload/images/image_001.jpg
INFO-DATA:ftp://svcserv3.xpc.cano.co.jp:21/Upload/images/info_of_image_001.txt
OK
>ACTN001
CapturingImagefrom:wvtcp://svcserv1.xpc.cano.co.jp:65310 . . . done.
UploadinganImageFile:ftp://svcserv3.xpc.cano.co.jp:21/Upload/images/image_001.jpg . . . done.
UploadinganInfoFile:ftp://svcserv3.xpc.cano.co.jp:21/Upload/images/info_of_image_001.txt . . . done.
OK
>ACTN004
Capturing_Image_from:wvtcp-vc://svcserv1.xpc.cano.co. jp:65310 . . . done.
Uploading_an_Image_File:_
ftp://svcserv4.xpc.cano.co.jp:21/Upload/images/image_001.jpg . . .
ERROR
Failed_to_upload_an_ImageFile:_
ftp://svcserv4.xpc.cano.co.jp:21/Upload/images/image_00.jpg
Failed_to_connect_to_the_server:ftp://svcserv4.xpc.cano.co.jp:21

In the above example, the list of the timer settings available for the LIST command is displayed, and the two timer settings from among the displayed timer settings are executed by the ACTN command.

In the reply to the LIST command, the number of timer numbers displayed at the head is displayed in the following format.

ITEM-COUNT=<the number of timer numbers>

In the above example, the number of timer numbers is "4".

Next to ITEM-COUNT, the available timer number is displayed one by one. In the above example, "001", "002", "004" and "007" are displayed. Finally, "OK" is displayed to represent that the execution of the LIST command succeeded. In the INFO command, the setting contents of the timer number "001" is displayed.

IMAGE-SERVER:"image capture setting"
IMAGE-FILE:"transmission destination of image data"
INFO-FILE:"transmission destination of image information data"

The "image capture setting" is the character string of the following format.

<protocol name>://<host name>:<port number>

The protocol name represents the name of the protocol which is used by the image upload server to capture image data from the camera. For example, when the camera server provides an image capture interface based on the http protocol, "http" can be designated for the protocol name. The host name represents the name of the camera server host. The port number represents a TCP (transmission control protocol) port number which is available to transmit the message to the camera server. When the WebView/Livescope camera server is used, a default port number is "65310".

The "transmission destination of image data" and "transmission destination of image information" are the character string of the following format.

<protocol name>://<host name>: <port number>/<file path>

The protocol name represents the name of the protocol which is used by the image upload server to upload the file. Since the file is ordinarily uploaded by communicating with an FTP (file transfer protocol) server, "http" is often used.

The host name represents the name of the WWW host. The port number represents the port number of the server acting as the transmission destination on the WWW host. Ordinarily, the port number of the FTP server is used. The file path represents the position (file name) on which the transmission data is set.

The above format is pursuant to URL (Uniform Resource Locator). Refer to RFC1738 for the details of URL.

The timer number "001" is executed by the first ACTN command. The upload of the image file, the upload of the image information file, and the update of the image information list all end normally.

The timer number "004" is designated by the second ACTN command. In this case, the image capture has succeeded, but the image file upload has failed, whereby the character string "ERROR" is displayed. As displayed to be "Failed_to_connect_to_the_server:ftp://svcserv4.xpc.cano.co.jp:21", the reason of this error is based on the fact that the connection process to the FTP server on the upload-destination computer failed.

FIG. 8 shows an example of template data and image information data generated from the template data. When the image information data is generated from the template data, a keyword is first searched in the template data, and the searched keyword is replaced by actual image information. Thus, the image information data is generated.

In the present embodiment, a character string sandwiched by "@@" is processed as the keyword. In FIG. 8, numerals "802", "803", "804" and "805" denote keyword character strings, but numeral "801" does not denote a keyword character string. For this reason, as shown by "806", the character string 801 is not changed but incorporated in the image information data. The keywords represented by the character strings 802 and 805 are respectively "IMAGE_CAPTION" and "IMAGE_FILE". The keyword "IMAGE_CAPTION" is replaced by a character string 807 "VIDEO OF MT. FUJI" (or "IMAGE OF MT. FUJI") for explaining the image as it is, and the keyword "IMAGE_FILE" is replaced by a file name 810 "mt_Fuji.jpg" of the image data on the WWW host.

The same keyword "DATE_STAMP" is designated at the character strings 803 and 804. This keyword represents the date and time when the image was captured. However, a character string sandwiched by brackets "[" and "]" is set immediately after this keyword, and the content of 803 is different from that of 804. The character string sandwiched by the brackets [ ] designates the format used to replace the keyword by the actual value.

The format designation of 803 is "% Y YEAR % m MONTH % d DATE(% a)". The symbol "% Y" denotes the designation to display an year, the symbol "% m" denotes the designation to display a month, the symbol "% d" denotes the designation to display a date, and the symbol "% a" denotes the designation to display a day of the week. As a result, as shown by a character string 808, the replaced information "1999 YEAR 1 MONTH 21 DATE TUE. DAY OF THE WEEK" is given.

Further, the format designation of 804 is "% H:% M". The symbol "% H" denotes the designation to display an hour, and the symbol "% M" denotes the designation to display a minute. As a result, as shown by a character string 809, the replaced information "10:00 A.M." is given.

The keywords which can be designated and their meanings are enumerated as follows. These keywords can be given from the date, the time, the location of the camera server, the setting of the device, and the camera control information which have been set in the image capture schedule.

@@IMAGE_FILE@@//name added to image data
@@CHAR_SET@@//character code of generated image information data//(any one of ASCII, JIS, SJIS, EUC, //UNICODE, and UTF-8)
@@TIMER_CAPTION@@//document for point designation explanation
@@DATE_STAMP@@//image capture date and time
@@LANGUAGE@@//language of generated image information data//(English, Japanese, etc . . . )
@@TIME_STAMP@@//time stamp of image capture (second number from 1970)
@@IMAGE_CAPTION@@//document for image data explanation
@@PAN@@//right and left direction of camera
@@TILT@@//vertical direction of camera
@@ZOOM@@//zooming magnification of camera
@@IMAGE_WIDTH@@//lateral size of image data
@@IMAGE_HEIGHT@@//longitudinal size of image data
@@TARGET_HOST@@//host name of transmission destination
@@HTTP_HOST_AND_PORT@@//host name and port number of http server
@@CAMERA_SERVER_HOST@@//host name of camera server
@@SEQ_NUMBER@@//the number of execution of image capture process
@@INFO_FILE@@//name added to image information data By setting the above format to the template, for example, when the WWW server is requested by the network user to transmit the image data, this WWW server can transmit the image control data for display such as an HTML document or an XML (extensible Markup Language) document by automatically embedding the information at the image capture time in such the template as above.

Namely, it is possible to provide to the network user the image data to which the image data capture date and time, the image data size, the title, the camera control information such as pan, tilt, zoom and the like were added, without manually updating the image control data for display such as the HTML document or the like or incorporating such the data in the image.

(Explanation of Structural Diagrams)

Figure 2:
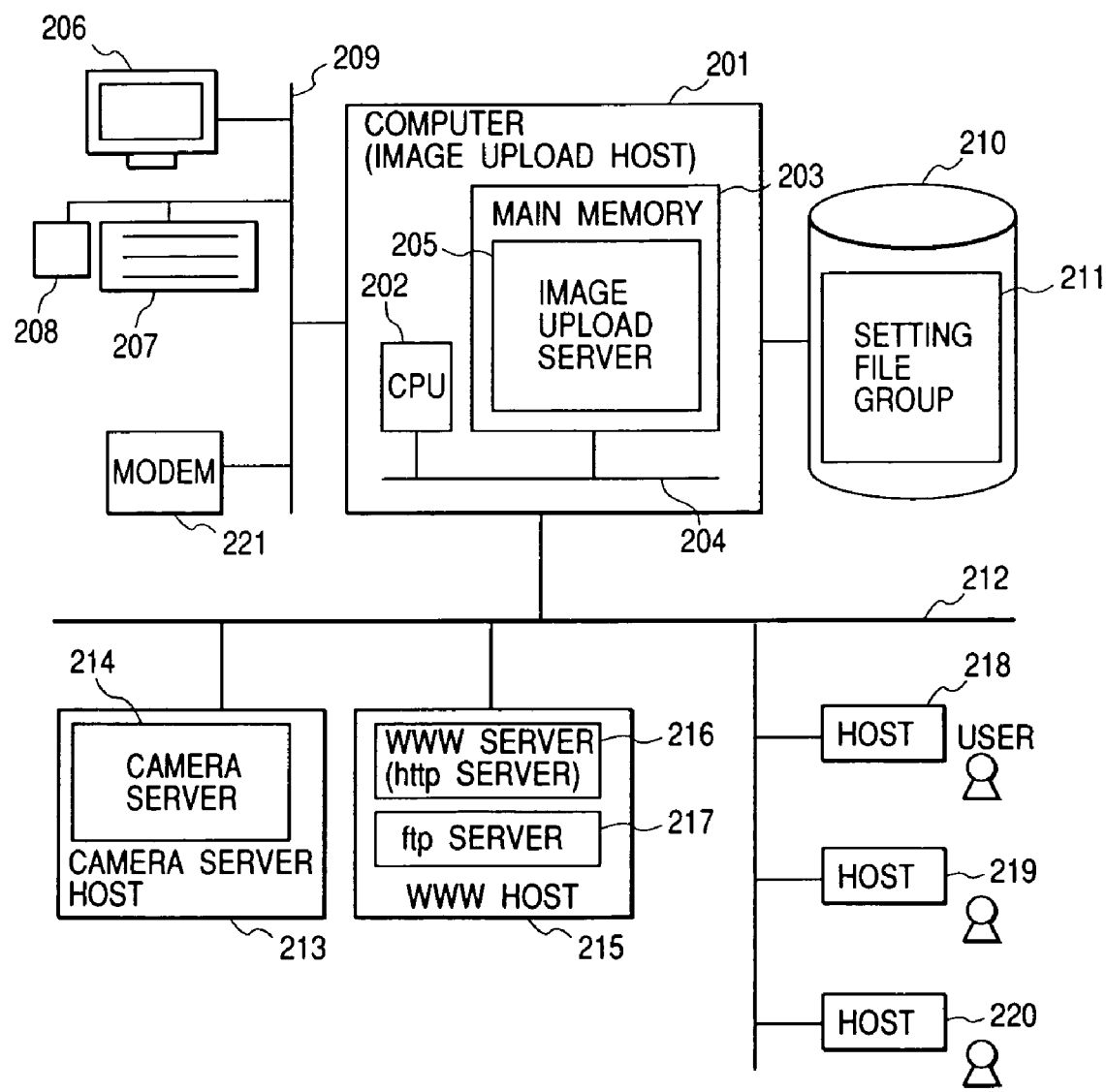
FIG. 2 is a block diagram showing a hardware structure according to the first embodiment.

FIG. 2 is a block diagram showing a hardware structure in the present embodiment. In FIG. 2, a computer 201 acts as an image upload host. The image upload host 201 is composed of a CPU 202 and a main memory 203. The CPU 202 and the main memory 203 are connected to each other by a bus 204.

An image upload server 205 for actually performing the upload process has been loaded in the main memory 203. A display 206, a keyboard 207, a mouse 208 and a modem 221 are installed in the image upload host 201 through an external interface 209 such as RS232C or the like. However, in the present embodiment, it should be noted that the display 206, the keyboard 207 and the mouse 208 are not essential. In such a case, it is necessary to operate or handle the image upload host 201 from another computer through a computer network 212.

A secondary storage (hard disk) 210 is installed to the image upload host 201. A various setting file group 211 which includes various information for an initialization process to the image upload server 205 is stored in the hard disk 210.

The image upload host 201, a camera server host 213, a WWW host 215, and other hosts 218 to 220 are interconnected through the computer network 212.

A camera server 214 operates on the camera server host 213. A not shown microphone is disposed in the camera server host 213. Thus, for example, it is possible to measure the loudness of a noise, relate an input voice before and after photographing to the image data and then store the obtained data, and transmit the stored data to the upload host. The camera server 214 is the server program for capturing the image data from the video camera and transmitting the captured data to the image upload server 205. The hardware structure of the camera server host 213 is the same as that of the image upload server 201. Thus, it is possible to operate the camera server 214 on the image upload host 201.

On the WWW host 215, an http server 216 and an ftp server 217 operate. The http server 216 is the server program having a function by which the data stored in the storage apparatus such as the memory of the WWW host, the hard disk or the like can be referred by the Web browser. In FIG. 2, it is assumed that the Web browser is used in the client hosts 218, 219 and 220. The http server communicates with the Web browser by using the http protocol.

The ftp server 217 is the server program having a function by which the image data transmitted from the image upload server 205 is stored in the memory of the WWW host 215. The image upload server 205 communicates with ftp server 217 by using the ftp protocol. It should be noted that some http servers have the same function as that of the ftp server. When such the http server is used, the ftp server is not necessary. The hardware structure of the WWW host 215 is the same as that of the image upload server 201. Thus, it is possible to operate the http server 216 and the ftp server 217 on the image upload host 201 and the camera server host 213.

Other hosts 218, 219 and 220 are the computers for operating the WWW browser. Although the structure of each of these hosts 218, 219 and 220 is the same as that of the image upload host 201, these hosts do not have any capability of operating the servers 205, 214, 216 and 217. Therefore, each of these hosts 218, 219 and 220 may be a computer which has relatively low-speed CPU and bus, and a small-capacity main memory, but does not have a mouse, a keyboard and a secondary memory. In FIG. 2, although the three hosts 218, 219 and 220 are shown, there is actually no limitation in the number of such the hosts.

When the image data is exchanged through the Internet, it is most effective at present to exchange the file in the HTML format. However, data compatibility rises further if the file is described in the XML format with high compatibility in various applications, whereby it becomes convenient.

FIG. 1 is a diagram showing an internal structure of an image upload server 101.

The image upload server 101 is composed of plural software modules, i.e., an OS interface (I/F) module 102, a timer process module 103, an upload process module 107, a server communication management module 117 and a terminal process module 125.

<OS Interface Module 102>

This module provides an interface to use a function of an OS (operating system). Other modules such as the timer process module 103 and the like can use the function of the OS through the OS interface module 102. In the present embodiment, the file management, the communication between the processes, and the like are performed with the OS interface module 102.

<Timer Process Module 103>

When an appropriate point is set, the timer process module 103 starts operating at the set point. In the image upload server, an upload process, a data deletion process at the runout of a data available term, and an image and image information data transmission process are started from a timer process.

These processes are managed by an upload timer management submodule 104, a data available term timer management submodule 106 and a data transmission timer management submodule 105 respectively.

Further, the calling destination of the upload timer management submodule 104 corresponds to an upload process of the upload process module 107 (corresponding to submodules 110 to 114), the calling destination of the data transmission timer management submodule 105 corresponds to a data transmission process of the data transmission submodule 112, and the calling destination of the data available term timer management submodule 106 corresponds to a data deletion process of a data deletion process submodule 115.

<Upload Process Module 107>

The upload process module 107 performs the upload process for the image data and the image information data. In the present embodiment, the upload process includes an image data capture process and an image data editing process. In the image data capture process, the image data is captured from the camera server. In the image data editing process, the size of the captured image data is changed, and the plural image data are synthesized. Namely, in this process, the image data is edited on the basis of a user's instruction or predetermined setting.

For example, the image data editing process includes a process to embed a date and a message to image data, a process to make a panoramic image by joining plural image data together, and a process to generate thumbnail data by reducing an image size.

The upload process further includes an image data transmission process to transmit the edited image data to the WWW host, and an image information data generation process to generate the image information data including the information concerning the image data.

It should be noted that the image information includes various information such as an image data size, an image data capture date, a camera direction at the image capture time, and the like. In the present embodiment, although the image information data is generated as text data, such the data can be generated as other-type data. It should be noted that the following explanation is applicable to the case where the data other than the text data is generated.

The image information data generation process is composed of a template data capture process, a keyword replacement process, an image information data transmission process and a data deletion process.

In the template data capture process, template data being a model of the image information data is captured. Ordinarily, the template data is stored as a file in the secondary memory of the image upload host. Also, it is possible to store the template data on the camera server side or the WWW host side.

The keyword replacement process corresponds to the image information data generation process in a strict sense. In this process, image information data is generated according to the following procedure. Namely, (1) it is first checked whether a predetermined keyword has been embedded in the template data, (2) when the keyword is found, the part corresponding to the found keyword is replaced by an image size value or the like, and (3) these processes are continued up to the end of the template data. In any case, the detail of the keyword replacement process will be again explained with reference to FIG. 19 and following drawings.

In the image information data transmission process, the generated image information data is transmitted to the WWW host.

In the data deletion process, a request for deleting the data transmitted to the WWW host is transmitted to the WWW host.

The image data capture submodule 110 performs the image data capture process, the image data editing submodule 111 performs the image data editing process, the data transmission submodule 112 performs the image data transmission process, the template data capture submodule 113 performs the template data capture process, the image information data generation submodule 114 performs the image information data generation (or creation) process, the data deletion submodule 115 performs the data deletion process, and the data transmission submodule 112 performs the image data transmission process and the image information data transmission process.

How one upload process is performed is determined based on how the above submodules are combined and called. The description of such combination is called "upload setting". The upload setting is included in a various setting information group 129 which will be described later.

When a process start is notified from the upload timer management submodule 104, the upload process module 107 causes the respective submodules 110 to 114 to operate according to the contents of the upload setting.

An image information database 116 is the database in which image data and information concerning the image data are temporarily stored. Such the information is set by the image data capture submodule 110 and the image data editing submodule 111, and the set information is used when, e.g., the image information data generation submodule 114 generates the image information data.

<Server Communication Process Module 117>

When the image data capture submodule 110 captures the image data and the data transmission submodule 112 transmits the data, these submodules must perform communication among the processes respectively to the camera server and the WWW host through the network. The server communication process module 117 is the module which performs a communication process for the camera server and the WWW host (i.e., the http server and the ftp server). Also, the server communication process module 117 is composed of plural submodules, i.e., a server connection process submodule 118, a route (path) connection process submodule 119, an ftp protocol process submodule 120, an http protocol process submodule 121, and a wvtcp protocol process submodule 122.

The server connection process submodule 118 is the module which manages information (server information) necessary to communicate with the servers such as the camera server, the http server, the ftp server and the like, and controls connection processes to the servers.

In order to actually communicate with the server designated by the server information, the information concerning by which route (path) the communication is possible is necessary. This information is called "route (path) information". The route information is composed of modem relative information (representing an available modem port, a partner's telephone number, etc.) and gateway relative information (representing a gateway host name, a kind of receivable protocol, etc.).

The route connection process submodule 119 is the module which manages the route information and controls the connection process based on the designated route (path).

When the connection process to the server succeeds, it is possible to exchange the information by using the communication protocol receivable by the server of the communication partner.

The ftp protocol process submodule 120 is the module which processes the data communication using the ftp protocol. This submodule is mainly used to transmit the image data and the image information data to the WWW host.

The http protocol process submodule 121 is the module which process the data communication using the http protocol. This submodule is mainly used to capture the template data. Also, this submodule is sometimes used to transmit the image data and the image information data to the WWW host.

The wvtcp protocol is the protocol for capturing the image from CANO WebView/Livescope™. The wvtcp protocol process submodule 122 is the module which is used to capture the image data by using the wvtcp protocol.

When a camera server other than CANO WebView/Livescope is used as the camera server, or when the image data is transmitted by using Gopher protocol, a dedicated protocol process module is added. Even in such a case, the following achievement method of the present embodiment is applicable as it is.

<Terminal Process Module 125>

The terminal process module 125 is the module which processes the user operation as explained in FIG. 7 by the terminal client.

The command which was input by the user at the terminal client is first received by a command reception submodule 126. The communication between the terminal client and the command reception submodule 126 is also realized by the mechanism of the communication between processes provided by the OS interface module 102. The command which was received by the command reception submodule 126 is interpreted and executed by a command execution submodule 127. It should be noted that the term "execution" merely represents that appropriate parameters are given to the upload process module 107 and its submodules 110 to 114 to call them. This execution is processed in the quite same manner as that in the calling by the timer process module and the like. Refer to the calling process by the timer process module for the details. The execution result is returned to the terminal client by a reply transmission submodule 128. Then, the terminal client displays the obtained result as shown in FIG. 7.

<Various Setting Information Group 129>

The various setting information group 129 is the aggregation of timer setting, upload setting, server information, route (path) information and the like. The contents of the various setting information group 129 will be explained later with reference to FIG. 3.

Figure 3:
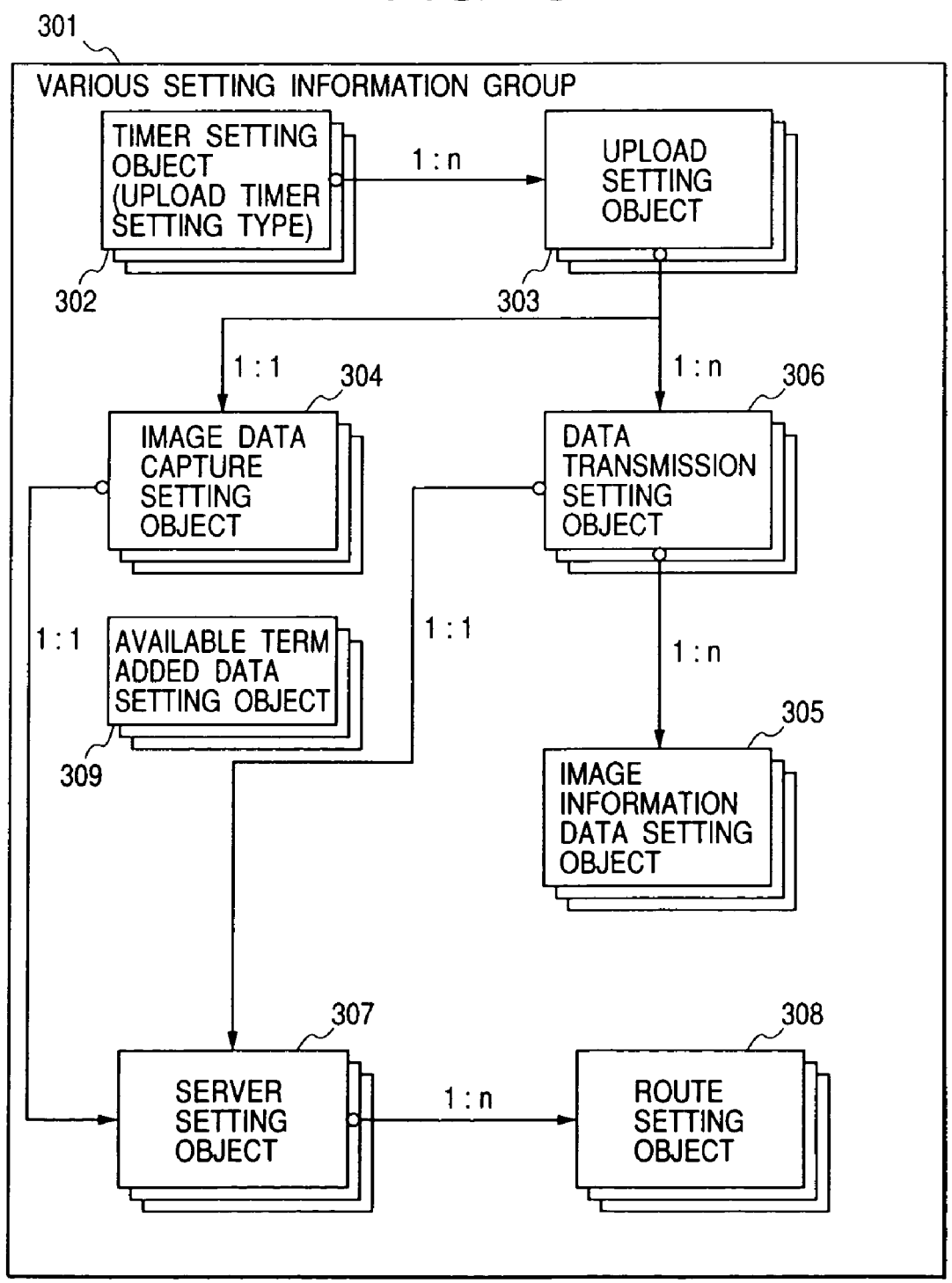
FIG. 3 is a block diagram showing a data structure according to the first embodiment.
Figure 4:
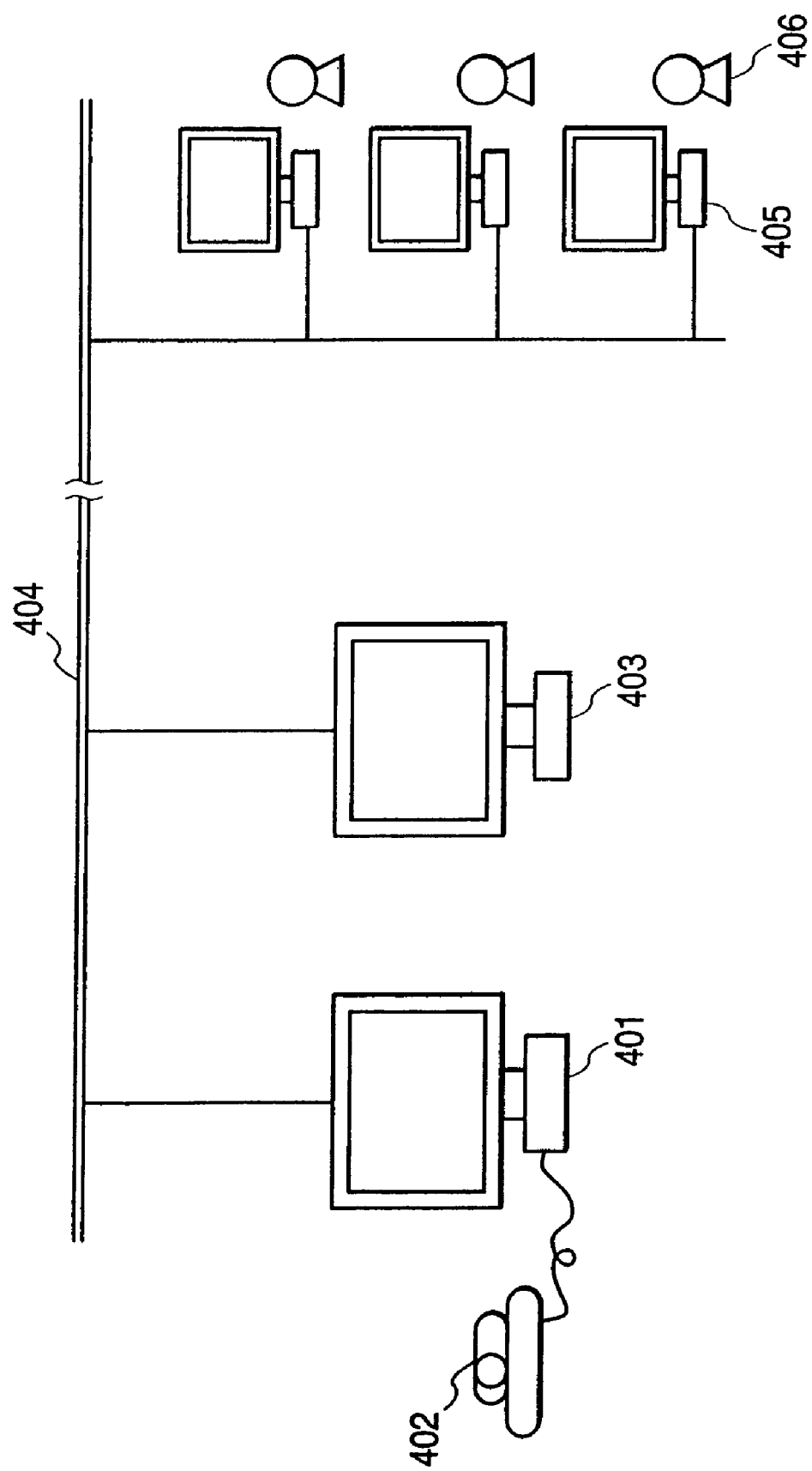
FIG. 4 is a block diagram showing the schematic of a conventional example.

FIG. 3 is a block diagram for explaining the detail of the various setting information group (129 in FIG. 1) and especially shows the case where the upload process is performed.

A various setting information group 301 is used by each module as a part of the image upload server 101. Such the information is initialized based on the information of the setting file group 211 in the hard disk 210 when the image upload server 101 is started. Hereinafter, the setting information in the state that this information is being written in the file is called "setting file". Further, the setting information in the state that this information has been read into the image upload server 101 is called "setting object".

The various setting information group 301 is composed of a timer setting object 302, an upload setting object 303, an image data capture setting object 304, an image information data setting object 305, a data transmission setting object 306, a server setting object 307, and a route (path) setting object 308. It should be noted that the arrows in FIG. 3 represent that each object includes ID information concerning the object indicated by the arrow.

<Timer Setting Object 302>

The timer setting object 302 is the setting object which is used by the timer process module 103. According to the processes on the side of the timer process module 103, three types, i.e., an upload timer setting type, a data transmission timer setting type and a data available term timer setting type, are prepared as the timer setting object.

These three types are used for the point setting of the upload timer management submodule 104, the data transmission time setting submodule 105, and the data available term timer management submodule 106, respectively.

Further, attributes constituting the timer setting object are stored as follows.

A type attribute is stored. The type attribute is the setting item which is used to designate which type among the upload timer setting type, the data transmission timer setting type and the data available term timer setting type is used for the timer setting.

One of three values "upload/copy/file" can be designated. In these values, the value "upload" represents the upload timer setting type, the value "copy" represents the data transmission timer setting type and the value "file" represents the data available term timer setting type.

A point setting attribute is stored. This point setting attribute is used to designate the point (time point) when the upload process or the like should be started. This attribute is composed of the three items "date setting", "day (of the week) setting" and "time setting". It is possible by the date setting to designate the date part of the point intended to be designated. There are three kinds of designation methods (1) to (3) as follows.

The designation method (1) is the single date designation method. In this method, one date is designated. The format is given as <the year of grace>:<month>:<date>, e.g., "1999: 01:20". This example designates Jan. 20, 1999. This designation method is the base of date designation.

The designation method (2) is the term date designation method. In this method, the term from one date to the other date is designated. The format is given as <single date designation of beginning date>-<single date designation of end date>, e.g., "1999:01:01–1999:12:31". This example designates the term from Jan. 1, 1999 to Dec. 31, 1999.

The designation method (3) is the interval-added date designation method. In the term date designation, all dates in the designated term are the designated dates. On the other hand, in the interval-added date designation, it is possible to perform the process every other date or every third date. The format is given as <term date designation>/<month interval>/<date interval>, e.g., "1999:01:01–1999:12:31/00:00: 02" designates every third date in the term from Jan. 1, 1999 to Dec. 31, 1999, "1999:01:01–1999:12:31/00:01:00" designates every other month in the term from Jan. 1, 1999 to Dec. 31, 1999, and "2000:01:01–2999:12:31/01:00:00" designates every other year in the term from Jan. 1, 2000 to Dec. 31, 2999.

Internally, the entire date designation is processed as the interval-added date designation. Namely, the term date designation can be managed as the interval-added date designation of which date interval is zero. Further, the single date designation can be processed as the interval-added date designation of which beginning date and end date are the same.

Similarly, "single time designation", "term time designation" and "interval-added time designation" are possible as the time designation method. The formats of such the designation are the same as those of the above date designation. For example, "13:00" designates the time "one p.m.", "07:00–18:00" designates the time "every minute in the term from seven a.m. to six p.m.", "07:00–18:00/00:30" designates the time "every 30 minutes in the term from seven a.m. to six p.m.", and "05:00–20:00/02:00" designates the time "every two hours in the term from five a.m. to eight p.m.".

In the day (of the week) designation, the days of the week intended to be designated are enumerated, e.g., "Mon. Wed. Fri." designates Monday, Wednesday and Friday.

A list of relative setting object ID's are stored. When the point which was designated by the timer process module comes, in order to perform the certain process (i.e., the upload process or the data transmission process), the object ID is exchanged among the objects to call the relative module. In the list of the relative setting object ID's, the object ID's of the setting objects to be called are determined and listed according to the above type attribute.

For example, when the setting of the timer setting object is the upload timer setting type, an ID representing the upload setting object 303 is held. When such the setting is the data transmission timer setting type, an ID representing the data transmission setting object 306 is held. Further, when such the setting is the data available term timer setting type, an ID representing an available term added data setting object 309 is held.

For example, in FIG. 3, since the timer setting object 302 is the upload timer setting type, the upload setting object 303 is called based on the list. Such the relation is shown as the arrow from the object 302 to the object 303.

In the present embodiment, when the plural upload processes are designated, each upload process is sequentially performed one by one. However, the respective upload processes can be also performed simultaneously.

<Upload Setting Object 303>

The upload setting object 303 is the setting object which is used to designate the contents of the upload process. Namely, the object 303 designates how the image data should be captured, and how the captured data should be transmitted to the WWW host. Such the information is held in the image data capture setting object 304 and the a data transmission setting object 306 respectively, the object ID's of the setting objects of them are designated in the upload setting object 303.

However, the image data capture setting object 304 capable of holding one upload setting object 303 is only one (a ratio 1:1 in FIG. 3 means this matter). On the other hand, it is possible to designate the plural data transmission setting objects 306 (a ratio 1:n in FIG. 3 means this matter). This reflects that one image data can be transmitted to the plural WWW hosts.

<Image Capture Setting Object 304>

The image capture setting object 304 is used to hold the following attribute values necessary to capture the image data.

An image parameter (a remote image parameter) is held. A parameter can be set to the captured image data, in accordance with the camera server. In the present embodiment, since WebView/Livescope is used as the camera server, it is possible to designate the image data size and the video camera direction when the image data is captured. Such the information is called the image parameter. It should be noted that, in order to distinguish the image parameter from "local image parameter" next described, the image parameter is sometimes called "remote image parameter".

The local image parameter is held. Even if the camera server does not provide any means for designating the image parameter, it is possible to previously prepare the information concerning the image on the side of the image upload server 101. For example, when the camera server by which the camera direction can not be changed is used, it only has to previously prepare the information concerning the camera direction on the side of the image upload server 101. Also, information such as text data for explaining the image data content or the like which is not generally provided by the camera server is conceived as the local image parameter. Such the information is called the local image parameter which can be set in the upload setting file.

An object ID of the server setting object is held. This object ID is the ID for the server setting object which is used in the communication process to the camera server from which the image data is captured.

An object ID list of the data transmission setting object is held. Namely, the ID's of the plural data transmission setting objects are held. These objects are referred when the image data is transmitted to the WWW host.

<Data Transmission Setting Object 306>

The transmission setting object 306 is the setting object which is used to transmit the image data and the image information data to the WWW host. Since the data to be transmitted is divided into two types, there are prepared two types of data transmission setting objects, i.e., an image data transmission setting type and an image information data transmission setting type.

Like the timer setting object 302, each of these types is distinguished based on the type attribute. The object of the image data transmission setting type is characterized not only by transmitting the data but also by holding the information concerning the image data editing. Further, such the object can hold the ID's of the plural image information data setting objects 305. Thus, it is possible to edit unique data and generate the image information data in accordance with the WWW server being the data transmission destination.

Further, the image data transmission setting type can have an image editing parameter as the attribute value. This parameter is used to designate the process to be performed by the image data editing submodule 111, for the image data captured from the camera server. Concretely, it only has to designate an external command (program) to be called for the image editing and the format of an argument used in such the call. As an example of the image editing, image size reduction or image data synthesis can be conceived.

Except the above, there is no difference between these two types. Namely, the common attributes are enumerated as follows.

There is an ID of the server setting object. Namely, the ID of the server setting object concerning the http server or the ftp server being the data transmission destination is held.

There is a transmission parameter. The transmission parameter is the information which is added when the data is transmitted. Ordinarily, a kind of data, and a name of a file or a directory where the data is set are designated. Further, the data storage method on the reception side such as "to replace old data by transmitted data" or "to add transmitted data to the end of old data" is designated here.

There is a list of the ID's of the image information data setting objects. Namely, the ID list of the image information data setting objects is held. The image information data setting object designated here is used to generate the image information data.

There is a batch (collective) transmission flag. The data transmission setting object is sometimes referred from the timer setting object of data transmission timer setting type, because of achievement of a batch transmission method. Ordinarily, the data transmission process is performed subsequent to the data editing and the data generation process, as the final step in the upload process. On the other hand, in the batch transmission method, the data transmission process is reserved for a while, and then this process is performed at a preset point. While the batch transmission flag is being ON, this means that the data setting object is the target of the batch transmission process.

<Image Information Data Setting Object 305>

The image information data setting object 305 is the setting object for holding the information necessary to generate the image information data. Namely, the information concerning the position where the template file being the model of the image information data is set, and the kind of data to be generated are held.

Concretely, a template file name is held. The template file name is the name of the file which holds the template data of the information data.

Further, a data generation parameter is held. The data generation parameter is used when the information data is generated. In the present embodiment, the information data is generated as text data. Thus, as the data generation parameters, a language of the text data and designation of a code system are used.

Further, a transmission parameter is held. The contents of the transmission parameter are the same as those of a "transmission parameter" attribute in the data transmission setting object. The image information data is transmitted to the WWW host based on these contents. However, since the transmission destination has been designated on the side of the data transmission setting object 306, the transmission destination can not be designated by the image information data setting object.

<Available Term Added Data Setting Object 309>

After the image upload server 101 performs the data transmission process to the WWW host, the server 101 can perform a process to request the WWW host to delete the transmitted data when a certain term passes. In order to prevent a lack of memory capacity of a storage medium, such a function is used to limit an available term of the uploaded data. The available term added data setting object 309 holds the information which concerns the data being the target of deletion for such a data deletion process. Further, in order to cause the WWW host to perform the data deletion process, it is possible to set only one reference to the server setting object.

Further, there is a method of not accumulating the image data till the available term but of overwriting a new image file as for an old image file. However, the fault of such the method is in the loss of past image data because of the overwriting.

<Server Setting Object 307>

The server setting object 307 is the setting object for holding the information concerning the communication partner's server such as the camera server, the WWW host or the like. Concretely, this object 307 holds the following attribute values.

Namely, a host name which is the name of the host by which the painter's server operates is held. Further, a port number which is the number of a TCP port used as the service interface by the server is held. A protocol name which can be received by the server is held. Further, a connection parameter which is the parameter necessary for the communication with the server is held. For example, the ftp server requests a user name and a password in case of communicating with the server. Thus, when the communication with the ftp server is performed, it is necessary to register beforehand the user name and the password as the connection parameters. Further, a list of the object ID's of the route setting objects is held. This list includes the ID's of the route setting objects which hold route (path) information necessary to connect to the server. However, these route setting objects can not be used simultaneously, but only one of these objects can be used. When a trouble occurs in the communication on one route, processing of trying communicating again by using another route is possible.

<Route (Path) Setting Object 308>

The route setting object 308 is the setting object which holds the information concerning the modem and the gateway necessary to communicate with the camera server and the WWW host. The contents which can cope with use in the Internet or a LAN (local area network) include a modem port, a telephone number, a gateway host name, a gateway port number and a protocol name. a modem port, a telephone number, a gateway host name, a gateway port number and a protocol name. Concretely, the modem port which connects the modem to the image upload host is designated, and the telephone number of the communication partner's modem which is necessary to connect the modem is registered. Ordinarily, the user name and the password are registered as the connection parameters. The gateway host name is the name of the host which is used as the gateway, the gateway port number is the number of the TCP port through which the gateway performs service, and the protocol name is the name of the protocol which can be received by the gateway.

(Explanation of Flow Charts)

Figure 9:
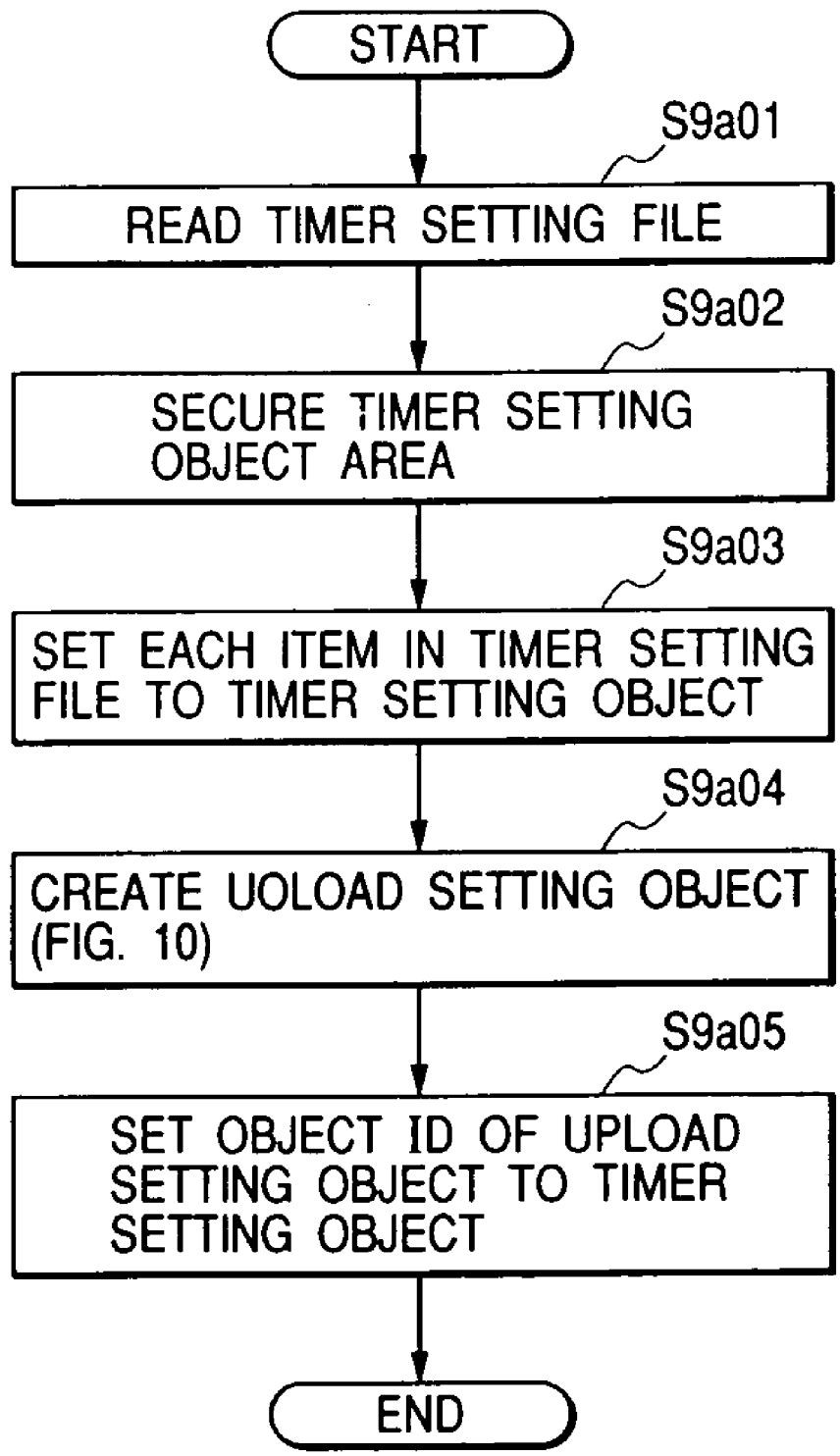
FIG. 9 is a flow chart showing a timer setting object formation process.

FIG. 9 is a flow chart showing the process in which the setting object is generated or formed from the setting file. As shown in FIG. 3, the setting objects are sequentially connected from the timer setting information under the reference relation. Namely, the setting objects are just configured such that, when the timer setting information is picked up, other setting objects are dragged like a string. Therefore, for example, since initialization processes of the setting objects start from the initialization process of the timer setting information, then the setting objects of the reference destinations are sequentially initialized.

Steps S9a01, S9a02, S9a03, S9a04 and S9a05 represent the timer setting object generation and initialization process. First, the content of the timer setting file is read onto the memory (S9a01). Next, the object area of the timer setting object is secured on the main memory (S9a02). The actual timer setting information is not held in the timer setting object at this time. Namely, this object area merely acts as a data holding area secured on the memory. Thus, the value of each item read from the timer setting file is set to the timer setting object (S9a03). Concretely, the values of the type attribute, the date designation attribute, the day (of the week) designation attribute and the time designation attribute are captured and then set to the timer setting object. At this time, a data type is converted if necessary. For example, the time setting in the timer setting file is held as the character string representing the time setting. It is not efficient to use this setting in the timer setting object as it is. Thus, it is possible to effectively perform the process by converting the time setting into an integer value (e.g., passing minutes from 0:0). Hereinafter, it is assumed that, when each setting item is set to the setting object side, appropriate data conversion is performed.

Figure 10:
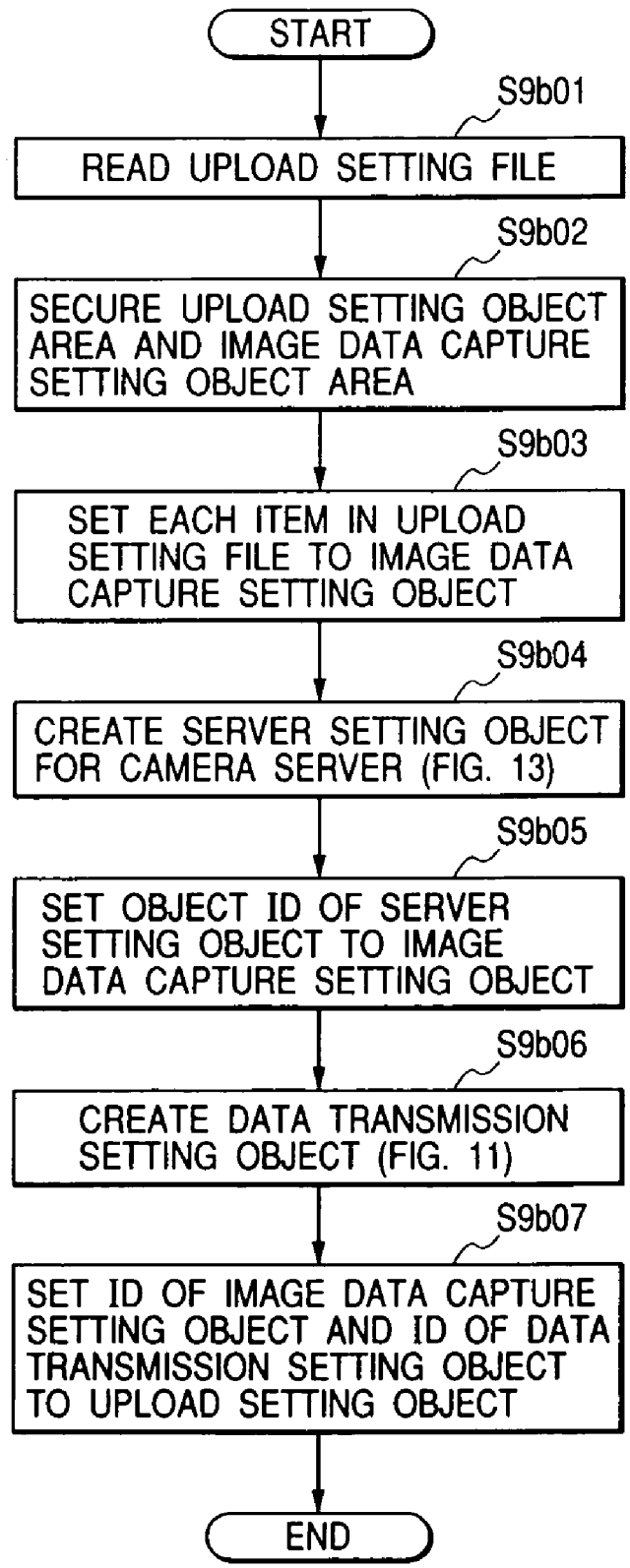
FIG. 10 is a flow chart showing an upload setting object formation process.

Next, the list of the relative setting files is taken out from the content of the timer setting file, and the setting objects are created or generated from the respective files (S9a04, FIG. 10). In an initial state, only the timer setting object of the upload timer setting type is generated. For this reason, the setting object generated here is the upload setting object. The generation and initialization process of the upload setting object is performed in a step S9b01 and following steps.

Finally, the object ID of each setting object generated in the step S9a04 is set to the timer setting object (S9a05).

The process in the steps S9a01 to S9a05 is repeated until all the timer setting files included in the setting file group 211 of the hard disk 210 are processed.

Next, the generation and initialization process of the upload setting object shown in FIG. 10 will be explained.

Like the timer setting, the content of the upload setting file is read onto the memory (S9b01). Next, the upload setting object area and the image data capture setting object area are formed (S9b02). In the present embodiment, the upload setting object and the image data capture setting object are generated from one setting file.

The value of each item read from the upload setting file on the main memory is set to the image data capture setting object (S9b03). Concretely, the setting values of the image parameter and the local image parameter are taken out and set to the image data capture setting object. It should be noted that the upload setting object is the object which holds only the object ID's of other setting files and does no have any other attribute value.

Figure 13:
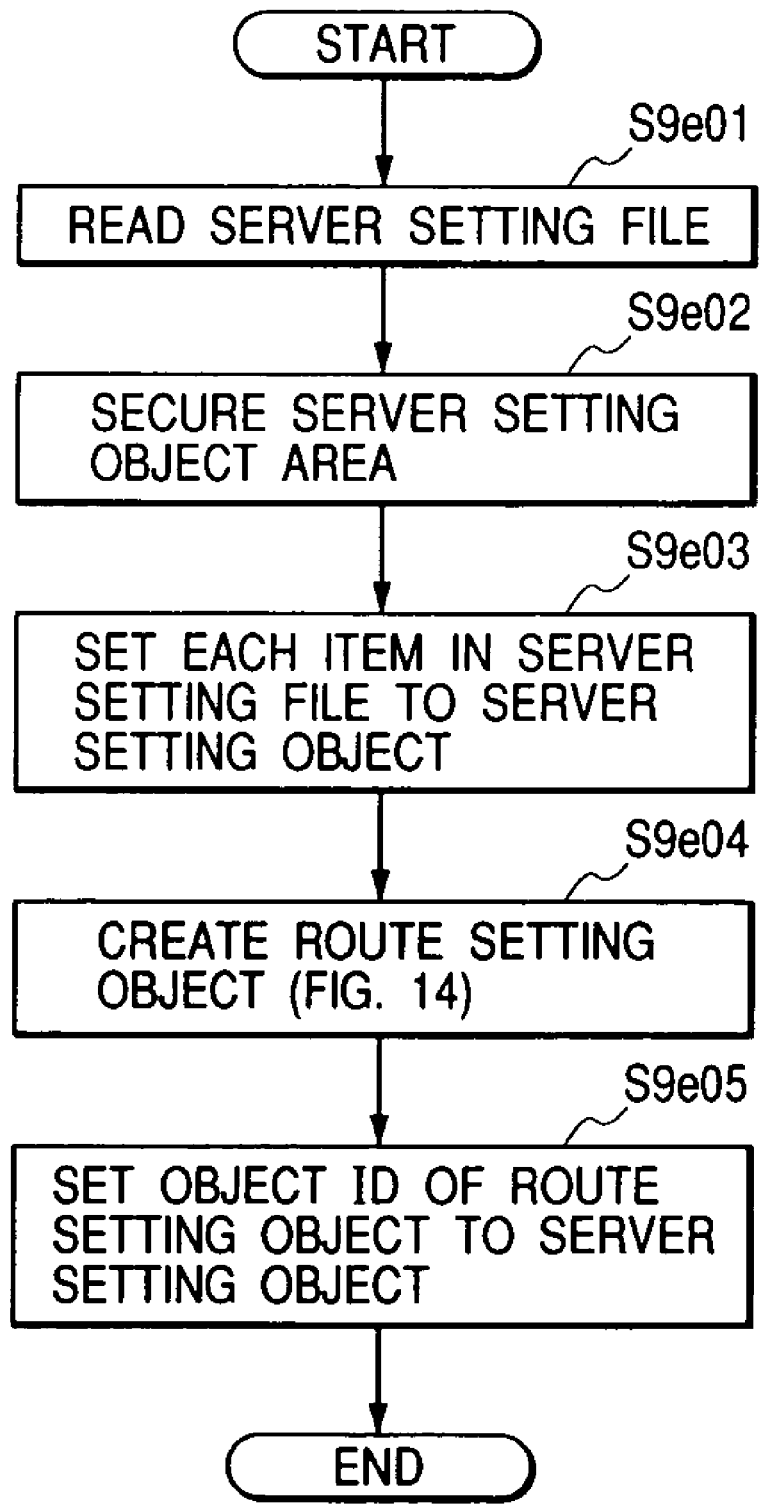
FIG. 13 is a flow chart showing a transmission destination server or camera server setting object formation process.

Further, the file name of the server setting file is taken out from the content of the upload setting file, and the server setting object is created or generated and initialized based on this server setting file (S9b04, FIG. 13). This server setting object holds the information of the camera server from which the image data is captured. The generation and initialization process of the server setting object is performed in the process shown in FIG. 13. Then, the object ID of the generated server setting object is set in the image data capture setting object (S9b05).

Figure 11:
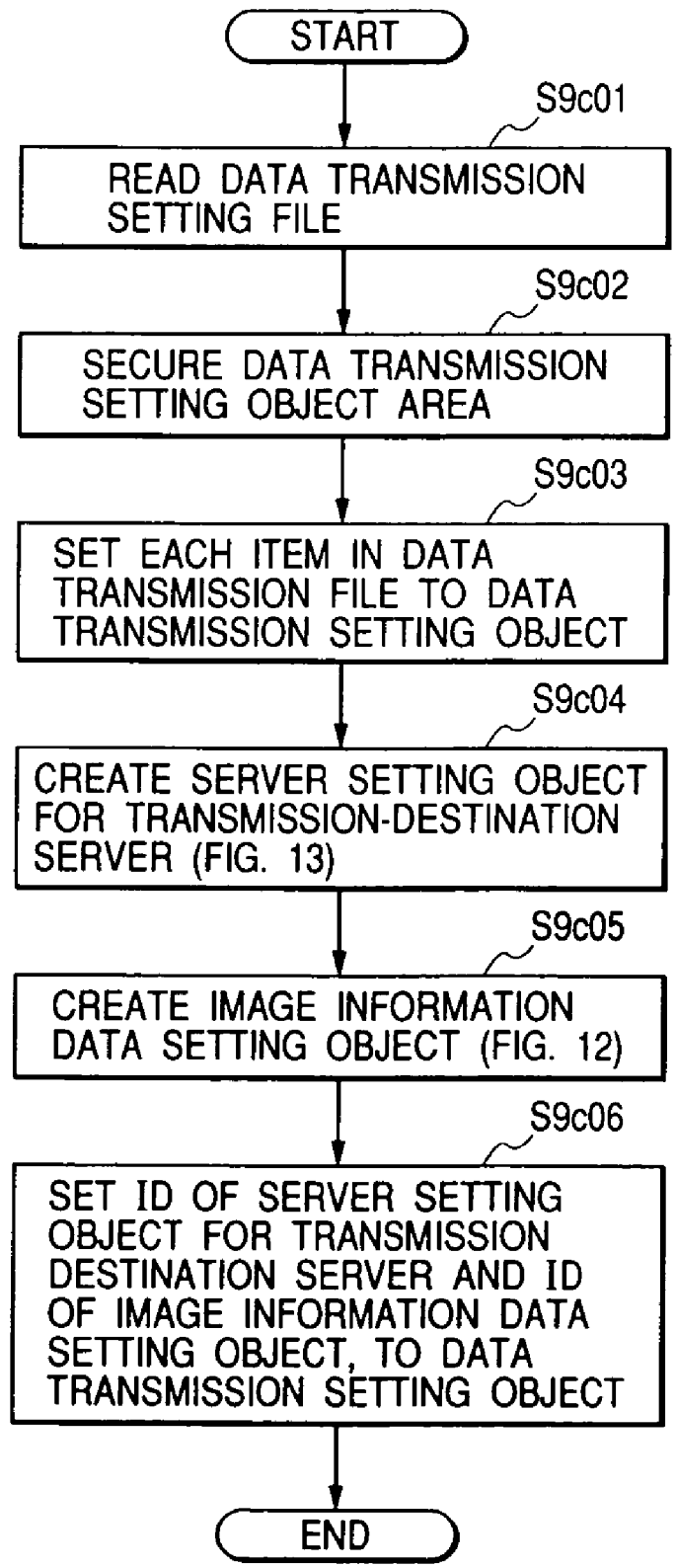
FIG. 11 is a flow chart showing a data transmission setting object formation process.

Next, the list of the data transmission setting files is taken out from the content of the upload setting file, and the data transmission setting objects are generated from the respective files (S9b06, FIG. 11). In this part, the generation and initialization process of the data transmission setting object shown in FIG. 11 is performed.

Finally, the object ID of the data transmission setting object generated in the step S9b06 is set to the upload setting object. Further, the object ID of the image data capture setting object to which the initialization ends at the same time is set in the upload setting object (S9b07).

FIG. 11 shows the generation and initialization process of the data transmission setting object.

The content of the data transmission setting file is read onto the memory (S9c01), and the data transmission setting object is generated (S9c02). Then, each attribute value obtained from the content of the data transmission setting file on the memory is set in the data transmission setting object (S9c03). Concretely, the values of the transmission parameter and the image editing setting are set.

Next, the server setting object is created or generated from the server setting file representing the data transmission destination (S9c04, FIG. 13). Here, the process shown in FIG. 13 is performed. Further, the image information data setting object is generated from the list of the image information data setting file names (S9c05, FIG. 12). Finally, the object ID of the server setting object and the object ID of the image information data setting object are registered to the data transmission setting object, and the process ends (S9c06).

Figure 12:
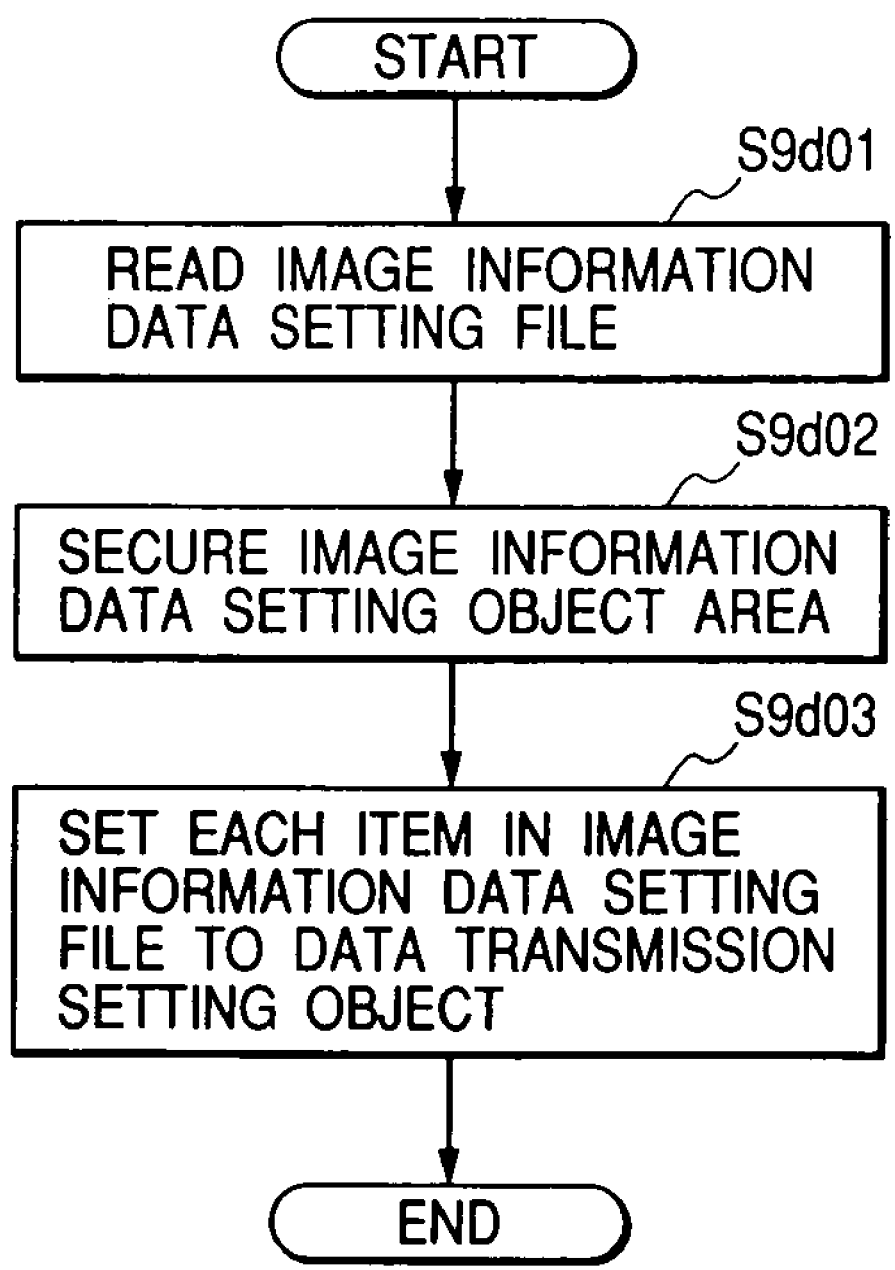
FIG. 12 is a flow chart showing an image information data setting object formation process.

FIG. 12 shows the generation and initialization process of the image information data setting object.

First, the content of the image information data setting file is read onto the memory (S9d01), and the area of the image information data setting object is secured (S9d02). Finally, each attribute value is captured from the content of the image information data setting file on the memory and then set in the image information data setting object (S9d03). The attribute values set here are the template file name and the data generation parameter value.

FIG. 13 shows the generation and initialization process of the server setting object for the camera server or the transmission destination's server in the step S9b04 or S9c04.

Like other setting objects, the content of the server setting file is read onto the memory (S9e01), and the server setting object is generated (S9e02). Then, each attribute value obtained from the content on the memory is set in the server setting object (S9e03). Concretely, the host name, the port number, the protocol name and the connection parameter value are set.

Figure 14:
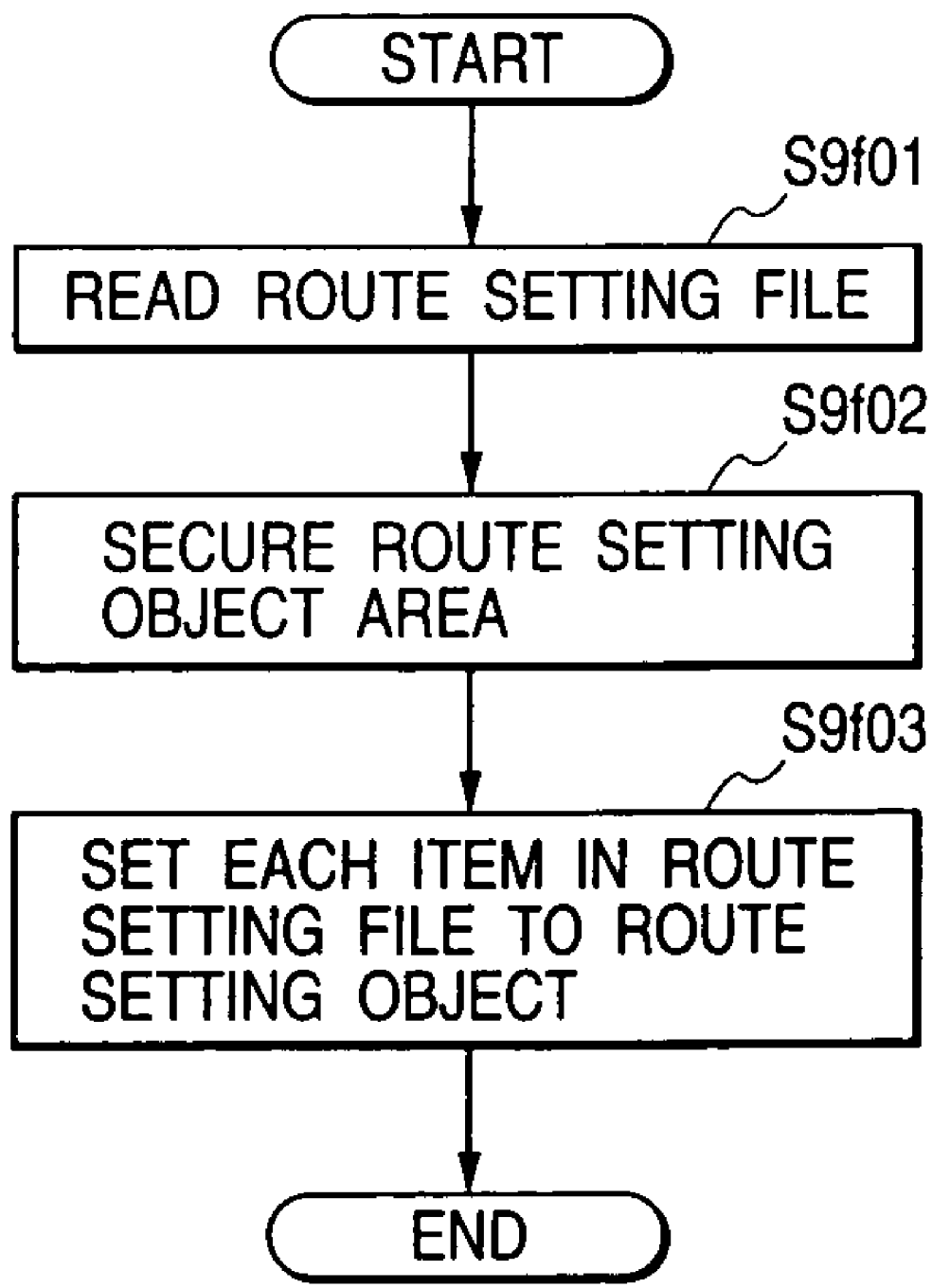
FIG. 14 is a flow chart showing a route setting object formation process.

In a step S9e04, the route setting object is generated and initialized from the route setting file name. Here, the process shown in FIG. 14 is performed. Finally, the object ID of the generated route setting object is set in the server setting object (S9e05).

FIG. 14 shows the generation and initialization process of the route setting object in the step S9e04.

First, the content of the route setting file is read onto the memory (S9f01), and the route setting object is generated (S9f02). Next, each attribute value obtained from the content on the memory is set to the route setting object (S9f03). Concretely, the modem port, the telephone number, the modem connection parameter, the gateway host, the gateway port number and the protocol name are set.

Figure 15:
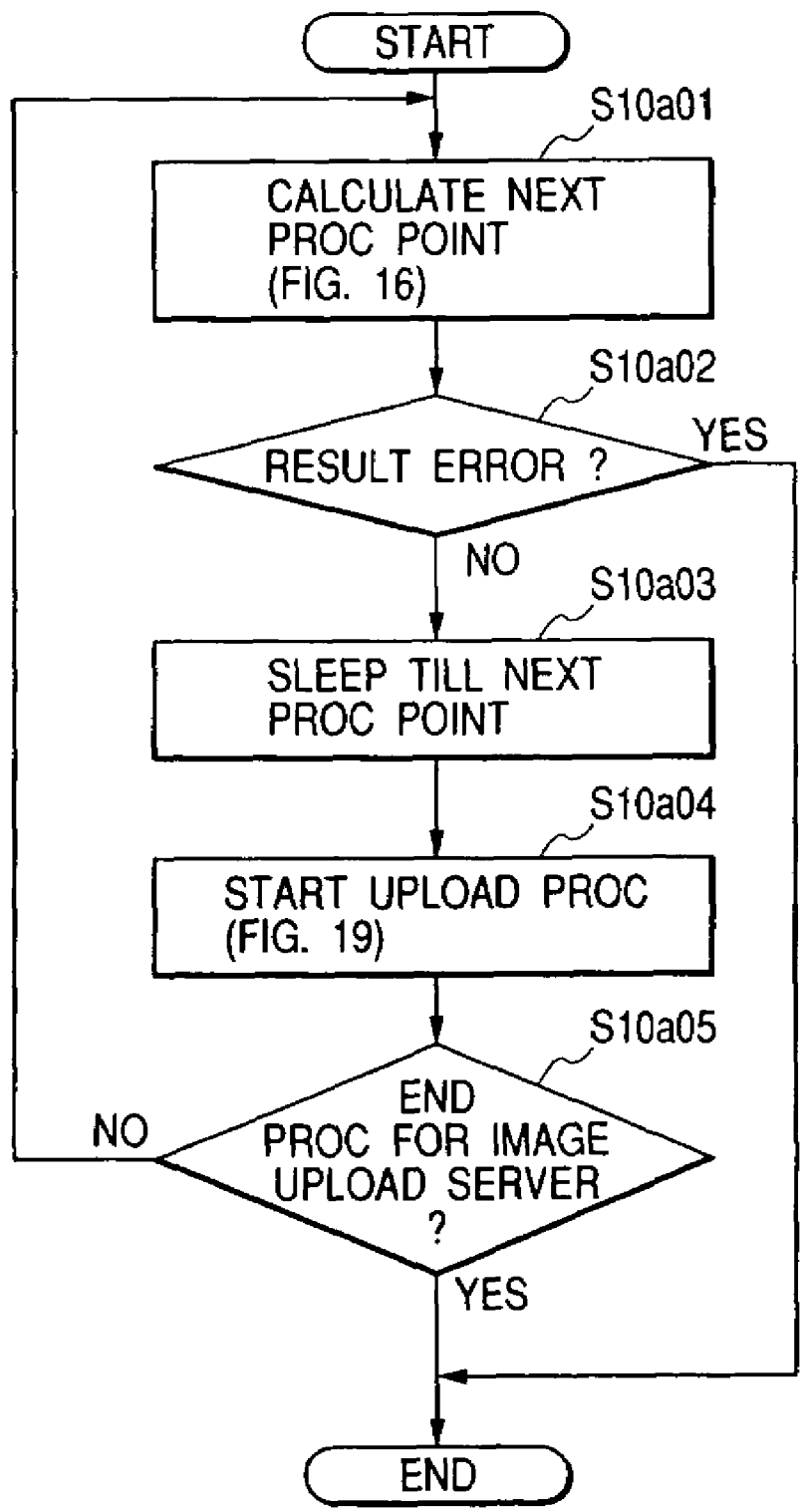
FIG. 15 is a flow chart showing a timer process.

FIG. 15 explains a flow of the timer process by the timer process module 103.

The following process which is irrelative to the type of the timer setting object (i.e., the upload timer setting type, the data transmission timer setting type or the file available term timer setting type) is the common process. In the following, the process to the timer setting object of the upload timer setting type will be explained. This process is of course performed in the upload timer management submodule 104.

The basic flow of this process can be explained with reference to a compact flow chart including steps S10a01, S10a02, S10a03, S10a04 and S10a05. First, from the information concerning the point setting (i.e., the date setting, the day (of the week) setting, and the time setting) in the timer setting object, a "designated point" in the nearest future is calculated based on the current point (S10a01, FIG. 16). This designated point in the nearest future is called "next process point". For example, it is assumed that the point setting is designated "every 30 minutes from 00:00 a.m.". In this case, when the current point (time) is 02:10 p.m., the next process point (time) is given as 02:30 p.m. Algorithm for calculating the next process point will be explained later.

The result of the calculation for the next process point is judged (S10a02). If the result does not make an error, this timer process sleeps until the next process point comes (S10a03). If another timer setting object to be processed exists in the upload timer management submodule 104, such the another timer setting object can be executed while the above timer process is sleeping. If it is judged in the step S10a02 that the result makes an error, the timer process ends as it is (S10a02).

Figure 19:
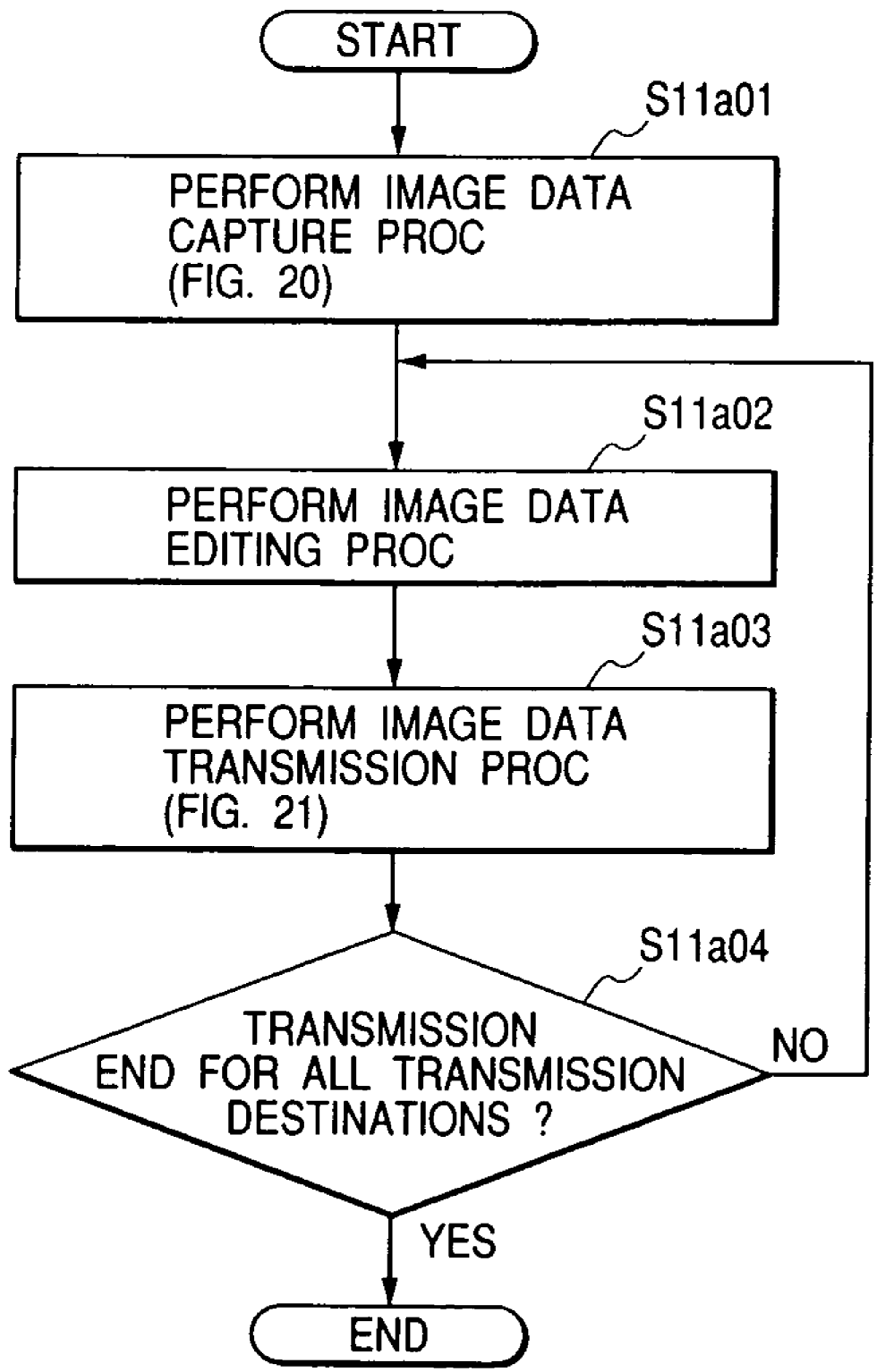
FIG. 19 is a flow chart showing an upload process.

When the sleep ends and the next process point comes, the upload process to all the upload setting objects set in the timer setting object are performed (S10a04, FIG. 19). Concretely, the upload setting object to be executed is given to the upload process module 107, and the upload process is started. The details of such the process will be later explained with reference to FIG. 19. It should be noted that the upload process can be performed in parallel with the timer process, or the timer process can be stopped until the upload process ends. In the present embodiment, the timer process is stopped until the upload process ends.

When the upload process ends, it is checked on the timer process side whether or not an end process of the image upload server 101 is performed (S10a05). In order to perform such the check, a flag for the end process of the image upload server 101 is prepared on the main memory, whereby the check is performed by actual checking the value of this flag.

When the end process is performed (S10a05), the timer process ends. Conversely, when the end process is not performed (S10a05), the process is restarted from the calculation of the next process point (S10a01).

Figure 16:
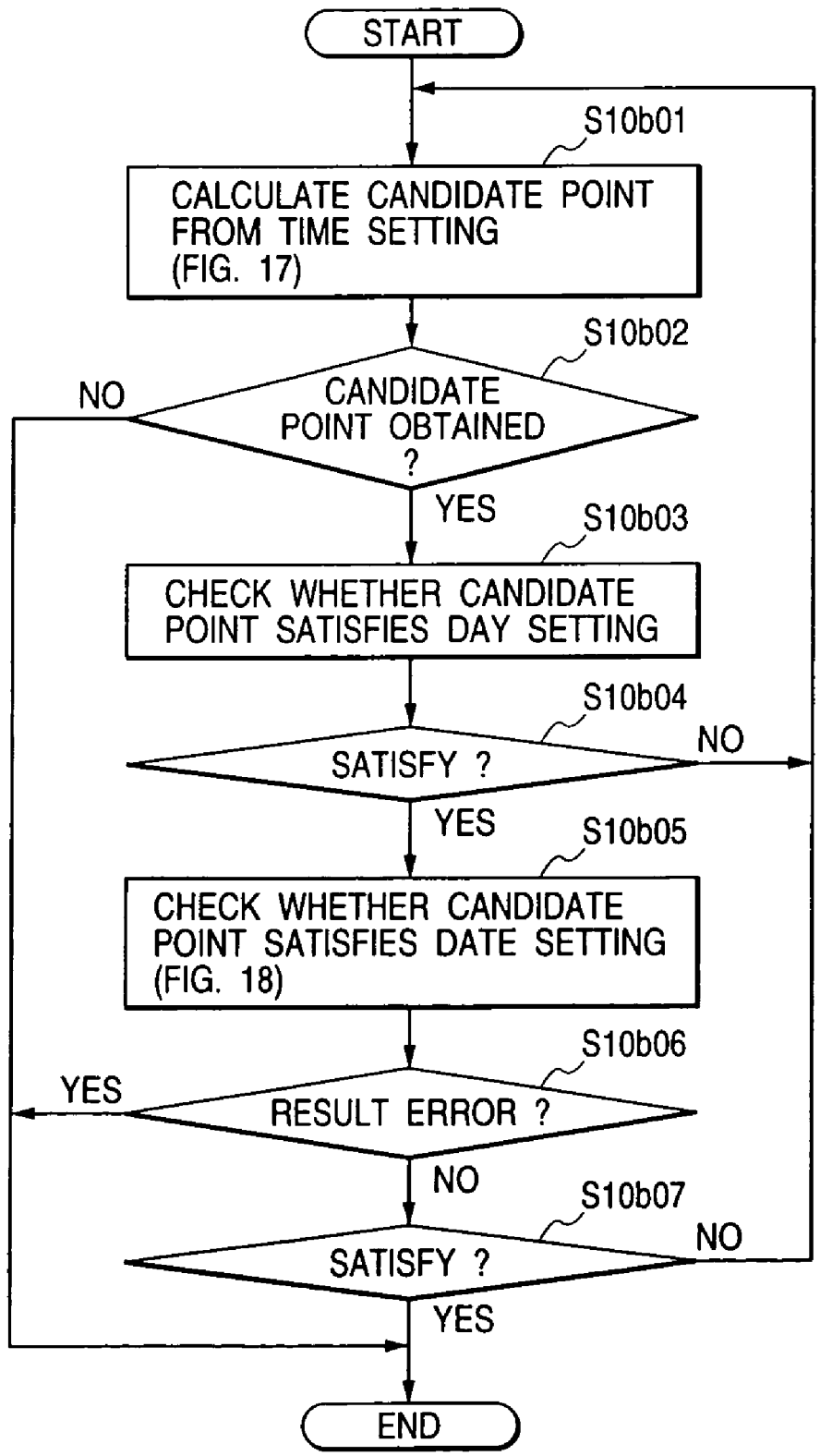
FIG. 16 is a flow chart showing a next process point calculation process.

Next, the calculation process of the next process point will be explained with reference to FIG. 16.

Since the point setting in the timer setting object consists of the three items, i.e., the date setting, the day (of the week) setting and the time setting, the calculation process of the next process point is performed as follows.

Figure 17:
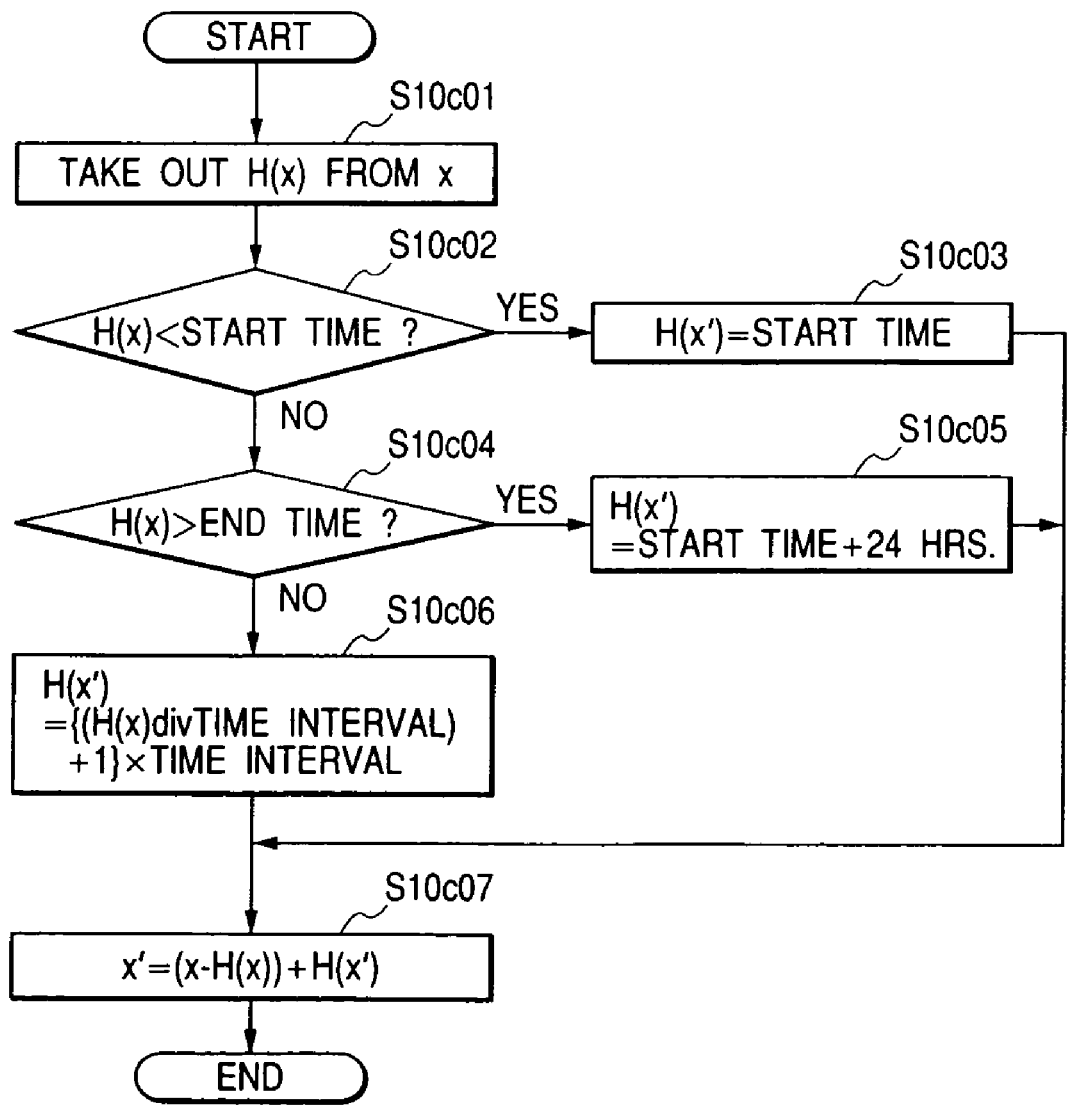
FIG. 17 is a flow chart showing a candidate point calculation process.

First, the candidate point which is expected for the next process point is calculated from the current point, on the basis of the time setting (S10b01, FIG. 17). The details of this process will be later explained with reference to FIG. 17. When the calculation succeeds and thus the candidate point can be obtained (S10b02), the process in a step S10b03 and following steps is performed. Conversely, when the candidate point can not be obtained (S10b02), the process ends and an error message is returned to a caller's side. For example, when a time interval is not set in the time setting, since there is no next job in this schedule, the process ends.

When the candidate point can be obtained, it is checked whether or not the candidate point satisfies the day (of the week) setting (S10b03). If the candidate point does not satisfy the day setting (S10b04), the candidate point is calculated again by using the candidate point instead of the current point (S10b01).

Figure 18:
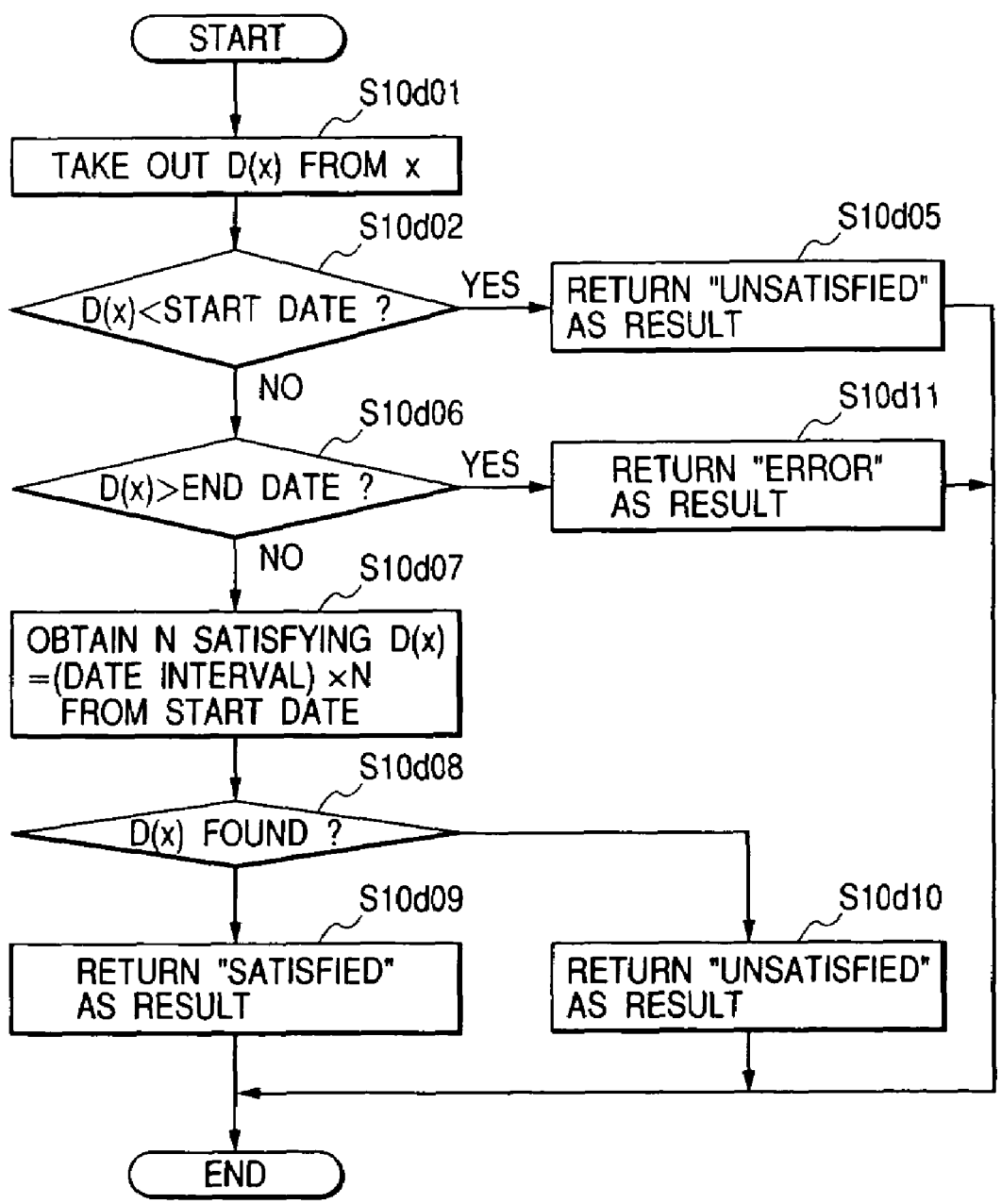
FIG. 18 is a flow chart showing a date setting check process for a candidate point.

When the candidate point which satisfies the day setting can be obtained, then it is checked whether or not the candidate point satisfies the date setting (S10b05, FIG. 18). The details of this process will be later explained with reference to FIG. 18.

In this check, the three kinds of results can be obtained, i.e., "satisfy", "not satisfy" and "error". When the result is "error" (S10b06), it represents that the candidate point can not satisfy the date setting even if it is calculated again. Thus, when the result is "error", the process ends and the error message is returned to the caller's side (S10a02). When the result is "satisfy" (S10b07), the obtained candidate point is returned to the caller's side (S10a02) as the value of the next process point. When the result is "not satisfy", the process in the steps S10b01 to S10b07 is repeated by using the candidate point instead of the current point.

FIG. 17 is a flow chart showing the calculation process of the candidate point from the time setting.

In FIG. 17, it is assumed that the current point or the candidate point being the target of recalculation is named "x" (in implementation, the point x corresponds to a name of variable). The substance of the point x may be a character string such as "February 1, 1999 01:10" or expressed with elapsed minutes from January 1, 0001 A.D. 00:00. In the present embodiment, according to general style, the candidate point is managed as the elapsed minutes from January 1, 1970 00:00.

First, the part representing the time is extracted from the point x and named H(x) (S10c01). This H(x) can be obtained by an expression H(x)=xmod(24×60). Here, it should be noted that "AmodB" represents the calculation to obtain the remainder when A is divided by B, and "24×60" represents 24 hours a day by minutes.

If H(x) is smaller than the start time (S10c02), the start time is named H(x') (S10c03). Conversely, if H(x) is larger than the start time (S10c02), then H(x) is compared with the end time.

If H(x) is larger than the end time (S10c04), "start time+(24×60)" is set to H(x') (S10c05). This corresponds to a start time on the morrow.

If H(x) is smaller than the end time (S10c04), the time which elapsed from the start time by "(time interval)×N" (N is an integer of zero or more) and is immediately subsequent to H(x) is set to H(x') (S10c06). At this time, this H(x') can be obtained by an expression H(x')={(H(x)div(time interval))+1}×(time interval). Here, "div" represents division in an integer calculation. Thus, the value of the division "3div2" is not "1.5" but "1".

Finally, the candidate point x' is calculated by an expression x'=(x−H(x))+H(x') (S10c07).

In the check of the day setting, the day at the candidate point is first calculated. The day of the week can be easily calculated by using a Zeller's formula or the like. Unlike other setting, the day setting holds the list of the set days. Thus, it is checked whether or not the day calculated from the candidate point exists in the list, and the checked result is returned to the caller's side.

FIG. 18 shows the check process based on the date setting in the step S10b05. Like the time setting, the start date, the end date and the date interval are set in the date setting. Therefore, the check method is similar to the method that calculates the candidate point from the time setting.

First, the part representing the date is extracted from the point x and named D(x) (S10d01). This D(x) can be calculated by an expression D(x)=xdiv(24×60).

If D(x) is smaller than the start date (S10d02), the message "not satisfy" is returned, and the process ends (S10d05). If D(x) is larger than the end date (S10d06), the message "error" is returned, and the process ends (S10d11).

If D(x) is not smaller than the start date and not larger than the end date, it is checked whether or not the date coincident with D(x) exists in the dates passing "(date interval)×N" (N is an integer of zero or more) from the start date (S10d07).

If the date coincident with D(x) exists, the message "satisfy" is returned (S10d08, S10d09). Conversely, if the date coincident with D(x) does not exist, the message "not satisfy" is returned (S10d08, S10d10).

FIG. 19 explains the upload process.

When the upload process module 107 is called from the timer process module 103 or the command execution submodule 127, the following process is performed on the basis of the content of the upload setting object designated at the calling time.

The entire process flow is as follows. First, the image data is captured from the camera server (S11a01, FIG. 20), and the image data is then edited (S11a02). Such the editing process is performed by an external command (program). Then, the image data is transmitted to the WWW host (S11a03, FIG. 21). The process in the steps S11a02 and S11a03 is performed to the all the data transmission setting objects referred by the upload setting object (S11a04).

Figure 20:
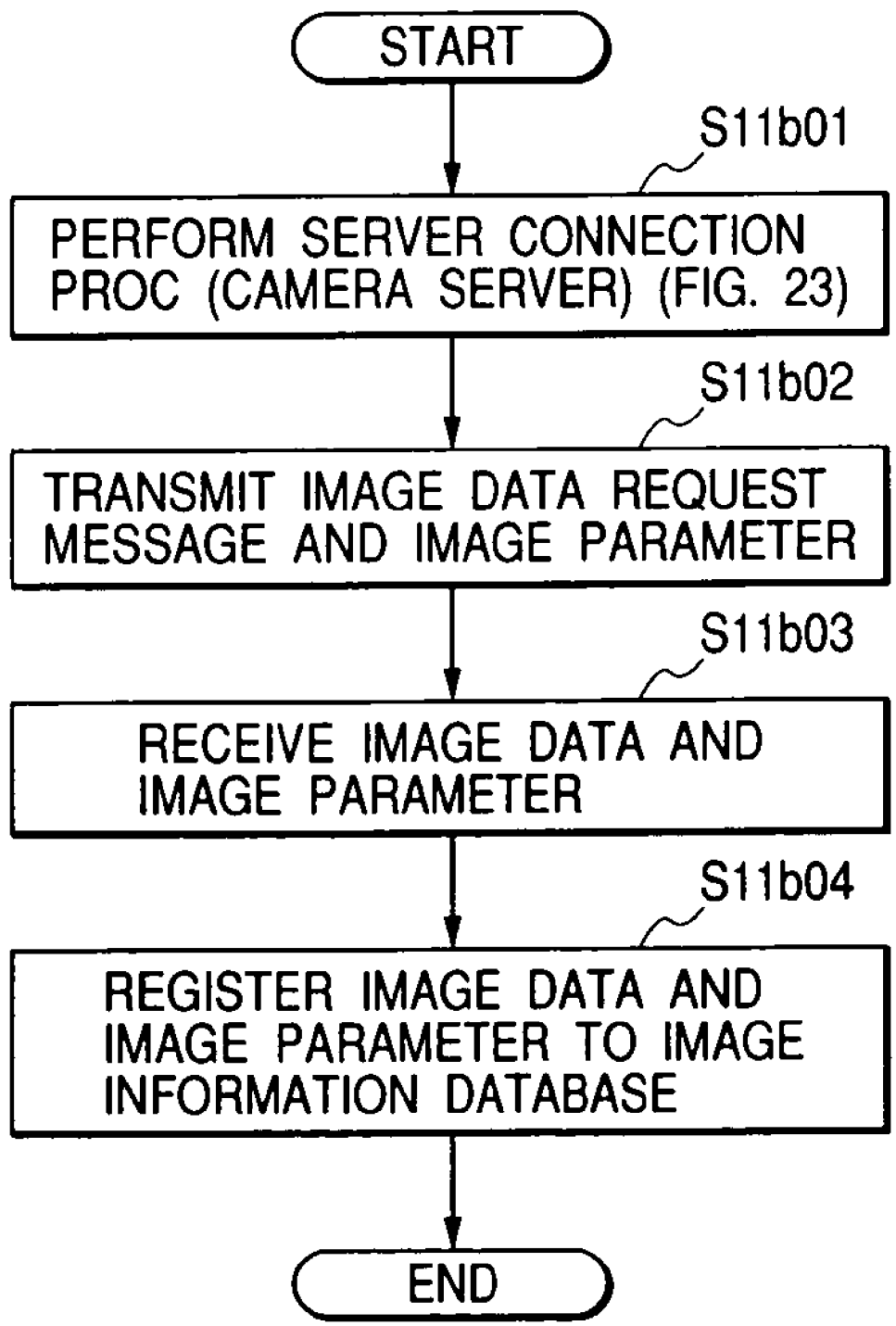
FIG. 20 is a flow chart showing an image data capture process.

FIG. 20 shows the image data capture process of the step S11a01 in detail.

Figure 23:
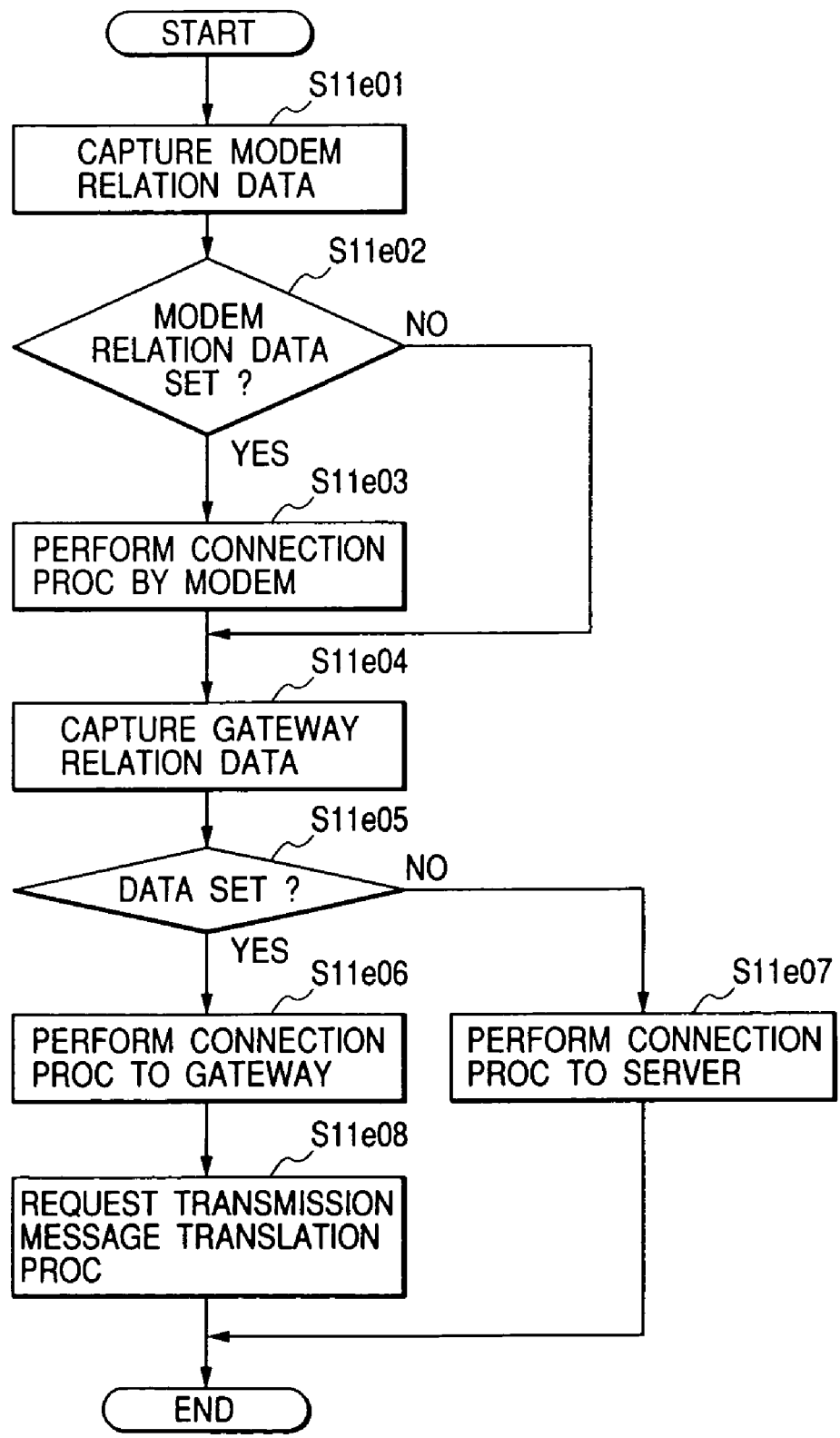
FIG. 23 is a flow chart showing a server connection process.

First, the server setting object referred is taken out from the image capture setting object, and the server connection process is performed (S11b01, FIG. 23). In the server setting object, the information concerning the camera server is set. Thus, it requests the server setting management module to perform the camera server connection process.

When the server connection process is performed, then the image parameter is given to the server setting management module to request this module to capture the image from the camera server (S11b02). Such the request is processed by the wvtcp protocol process submodule in the server setting management module, converted into the message format (i.e., an image capture message of the wvtcp protocol) processible by the camera server, and then transmitted to the camera server.

According to the request, the camera server transmits the image data to the wvtcp protocol process submodule, and returns the transmitted image parameter. At this time, when the value of the requested image parameter can not be satisfied, the value of the image parameter is changed to the actual value and then returned. For example, when the value of the image display size is designated to 320×240 dots but the image data of 240×180 dots is transmitted due to circumstances on the camera server side, the value of the image display size in the returned image parameter is changed to 240×180 dots. According to the kind, it is possible to think about existence of the camera server which does not have the function to return the changed parameter. In this case, the server communication process module 117 assumes that there is no change in the parameter and performs the process.

The received image data is temporarily held by the server communication process module 117. At this point, since the image parameter transmission process (S11b02) ends, the control is returned to the image data capture submodule 110. The image control submodule receives the image data and the image parameter from the server communication process program (S11b03). Then, the image data and the information in the image parameter are registered in the image information database 116 (S11b04, FIG. 22).

Figure 21:
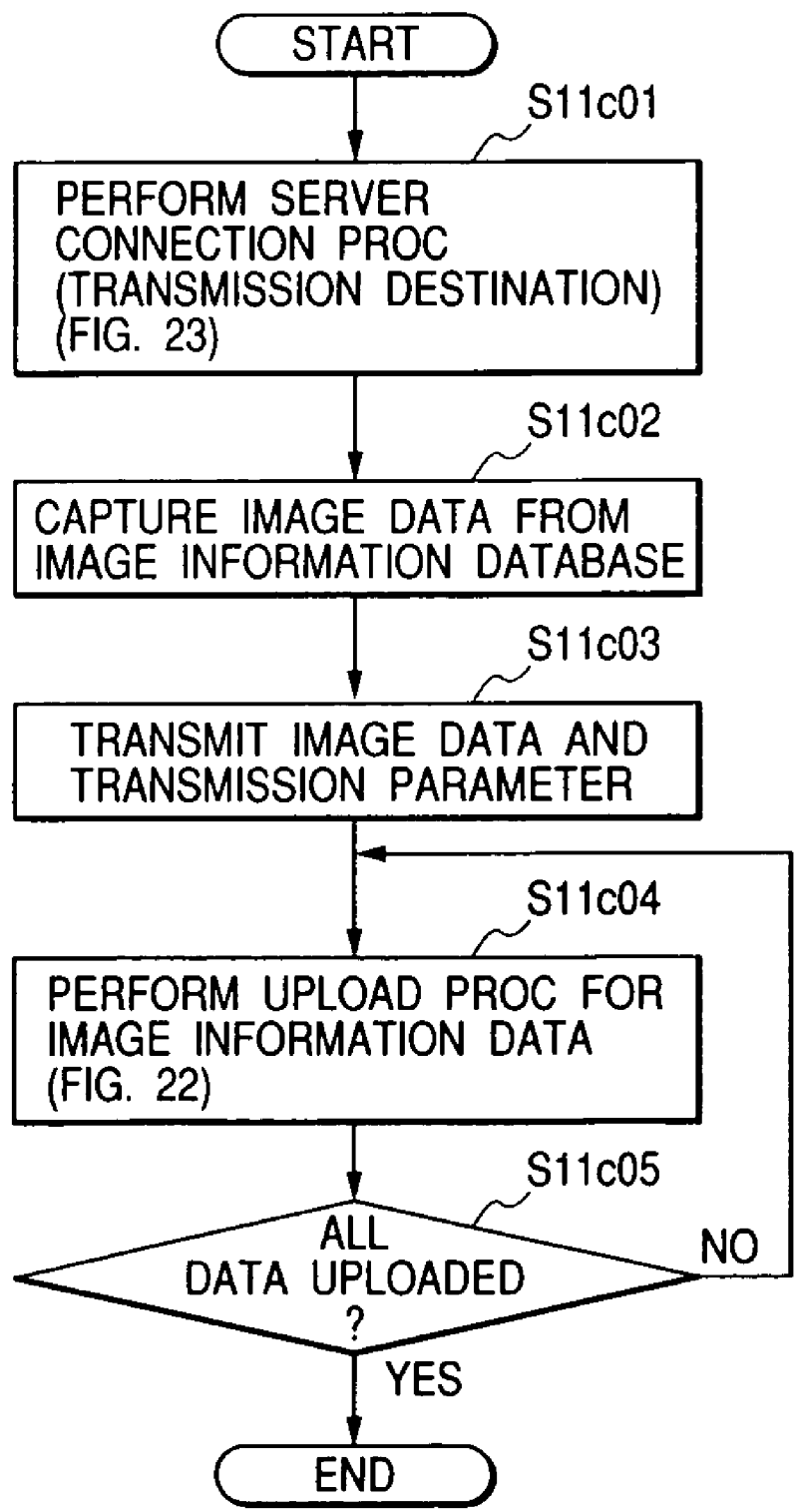
FIG. 21 is a flow chart showing an image data transmission process.

FIG. 21 shows the content of the data transmission process in the step S11a04.

First, the server setting object of the reference destination is taken out from the data transmission setting object, and the server connection process is performed (S11c01). It should be noted that the information concerning the server of the transmission destination is set in the server setting object.

When the connection process to the server ends, the image data is captured from the image information database 116 (S11c02). Here, it is assumed that the image editing process performed by the external command is the process to register the edited image data to the image information database 116.

Then, the transmission parameter captured from the data transmission setting is given to the server communication process module 117 together with the image data for the data transmission to the WWW host (S11c03). The server communication process module 117 transmits the image data to the WWW host through the ftp protocol process module and the http protocol process module.

Figure 22:
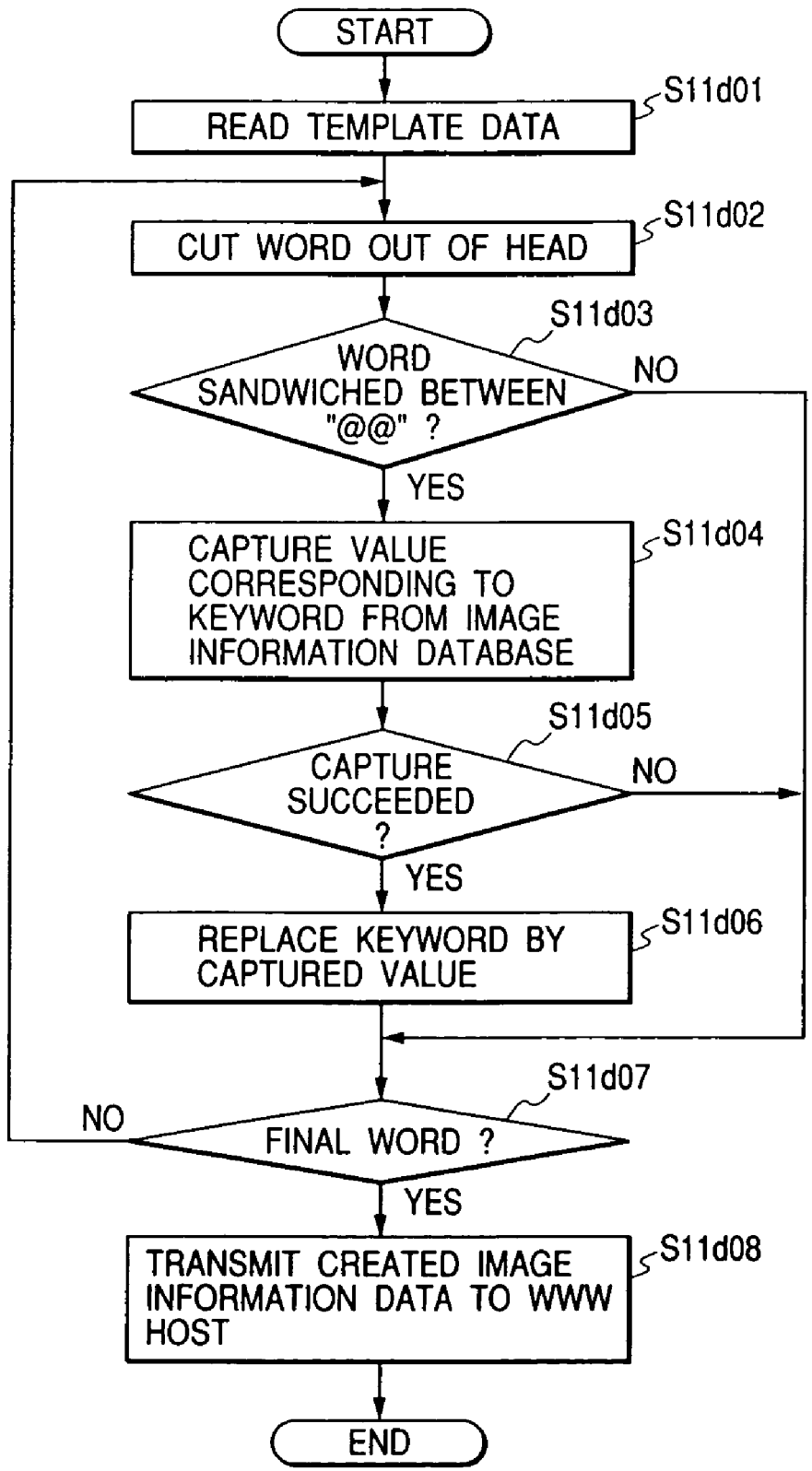
FIG. 22 is a flow chart showing an image data upload process.

When the transmission process ends, the image information data upload process (i.e., the generation and transmission process) is performed (S11c04, FIG. 22). This process will be explained in detail with reference to FIG. 22. This process is performed from the data transmission setting up to the process of all the image information data setting objects capable of being referred (S11c05).

FIG. 22 is a flow chart showing the upload process for the image information data.

First, the template data is read from the template file in the image information data setting object to the memory (S11d01).

Then, a word is extracted from the head of this template data (S11d02), and it is checked whether or not the extracted word is sandwiched by "@@" (S11d03). If this word is not sandwiched by "@@" (S11d03), this word is not the keyword and thus written in the memory area for information data generation as it is. Conversely, if this word is sandwiched by "@@" (S11d03), the value in the image information database 116 is searched by using the keyword (S11d04). When the value can be searched (S11d05), the searched value is written in the memory area for image information data generation (S11d06). Conversely, when the value can not be searched (S11d05), the keyword is written in the memory area for image information data generation as it is.

The process in the steps S11d02 to S11d06 is repeated until all words in the template data are checked (S11d07).

Finally, the image information data generated by using the data transmission submodule 112 is transmitted to the WWW host (S11d08). The detail of this process is quite the same as that of the image data transmission process.

FIG. 23 is a flow chart showing the server connection process performed in the server communication process module 117 in the step S11b01. In the process of FIG. 23, the connection to the camera server and the connection to the WWW server will be concurrently explained.

When the server connection process is called, the server setting object which should be surely referred is designated. First, a modem relative attribute value (a modem port, a telephone number, and a modem connection parameter) is taken out from the route information object to which the server setting object refers (S11e01).

When the modem relative attribute value is being set (S11e02), the connection process by the modem is performed with use of such the setting (S11e03). Since this process is performed by the OS, the necessary parameter is designated, and the OS interface module 102 is called.

Next, the setting value concerning the gateway is captured from the route information object (S11e04). When the gateway information is set (S11e05), the connection process to the gateway is performed (S11e06). Also, this process is performed with use of the OS interface. Finally, the server information (i.e., the host name, the port number, and the protocol name) is transmitted to the gateway on the connection destination to request a translation process of the transmission message (S11e08). After then, it becomes possible to exchange the message in the quite same manner as that in case of performing direct connection to the server.

When the gateway information is not set (S11e05), the connection process to the server set in the server setting information is performed (S11e07). This process is performed by using the communication mechanism between processes such as the socket or the like through the OS interface.

According to the present embodiment, the timer process to start the appropriate process at the previously set point is performed. Namely, it is possible to capture the image by controlling the camera and transfer the image data to the predetermined server, in accordance with the previously set schedule. Thus, automatic upload service can be provided.

Further, by storing the image information captured according to the schedule in the plural storage means such as the memory, the hard disk and the like, it is possible to upload and distribute the past images.

Further, since the image data captured by the camera is processed and edited to generate the data of which format is suitable for upload to the Internet, it is possible to easily upload and distribute the image data through the Internet.

Further, there is the model as the template information to display at least one of the image data capture date and time, the image data size, the title, and the camera control information, together with the image data. Thus, it is possible to provide together with the image data the information which is understandable only after the image is captured, to the user without laboriousness.

Further, by receiving the user's processing and editing request and thus controlling the application program to process and edit the image data, it is possible to perform the diversified editing process according to user's desire.

Further, by enabling the schedule setting with time designation, date designation and day (of the week) designation, it is possible to highly increase the degree of freedom for the schedule setting.

Further, since the arbitrary server can be designated and transferred, it is possible to structure a system of which functions are divided. For example, such the system includes a server only for photographing an image with a camera, a server only for accumulating image data, and a server for uploading images to the Internet. Thus, it is possible to flexibly cope with the various operation forms for providing the image upload service.

Further, by managing the data transfer route (or path), for example, it is possible to avoid the route with the trouble and transfer the image data, and to arbitrarily set the modem connection and the gateway host connection.

Further, by managing the available term of the image data stored in the storage means and thus deleting from the storage means the image data of which available term expired, it is possible to prevent that the capacity of the storage means becomes full and thus the image can not be captured.

Further, by preparing various kinds of template information, it is possible to flexibly cope with the various display forms and provide the abundant expressive image upload service.

Further, since the instruction from the user on the network is received to control the camera, it is possible to capture the image data at arbitrary timing. Thus, it is possible to cope with user's various and sudden requests.

In the present embodiment, the available term of the image data is managed, and the data of which available term expired is deleted. However, it is possible to permit overwriting of a new image for the image data of which available term expired. Further, in a case where the available term of the image data expired and the remaining capacity of the storage means is a little, if the apparatus uses a detachable storage means, it is possible to exchange the storage means. Further, in the present embodiment, the information corresponding to the keyword is stored in the image information database 116, for example, it is possible to store such the information in a file different from the image file, a header portion of the image file, or the like.

It should be noted that the phrase "beside the image data" described in the appended claims indicates that it only has not to embed the information in question at least into the image data.

Second Embodiment

Figure 24:
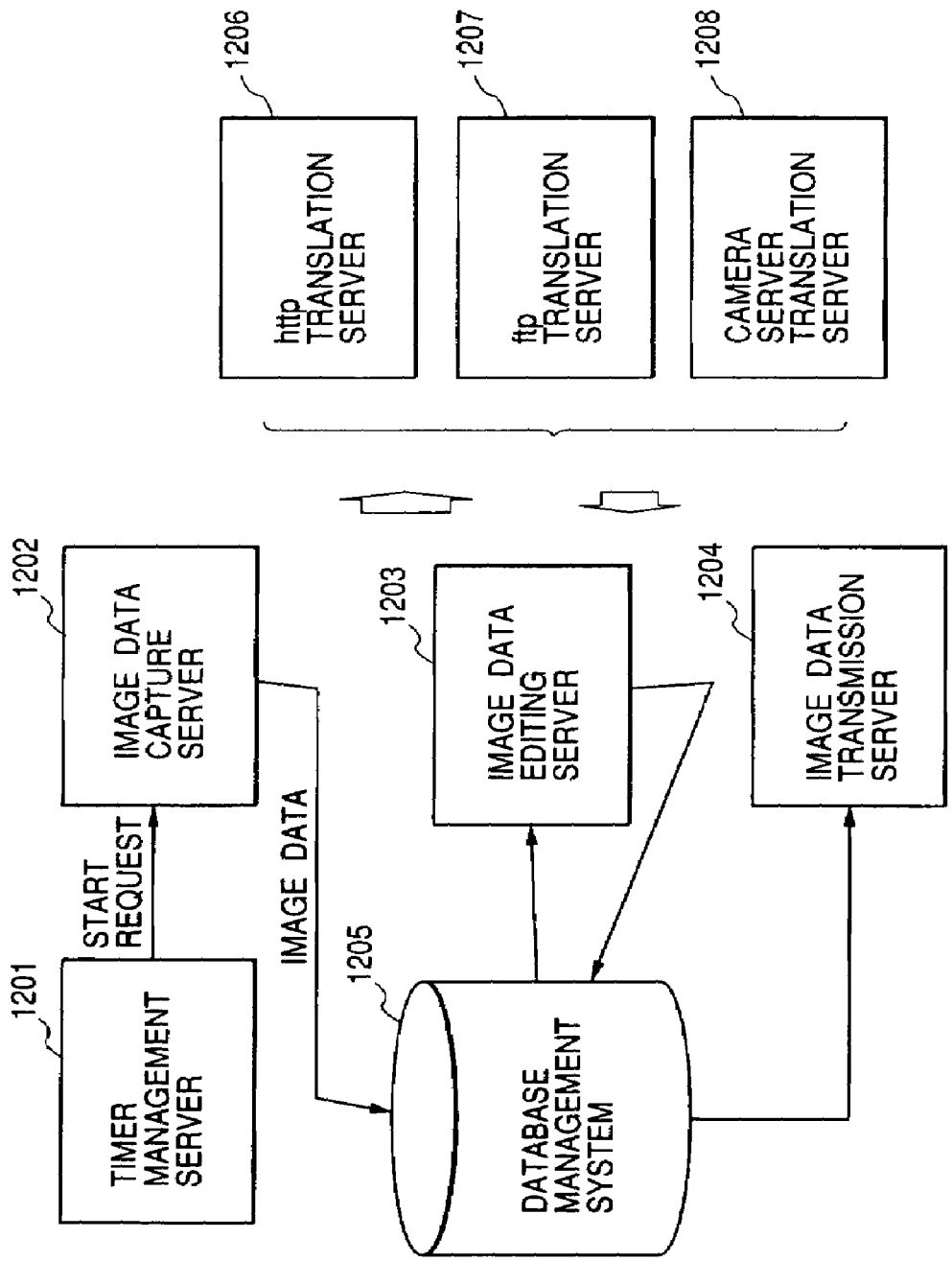
FIG. 24 is a diagram showing a schematic structure according to the second embodiment of the present invention.

FIG. 24 is a diagram showing a schematic structure according to the second embodiment of the present invention. In the present embodiment, only the points different from the first embodiment will be explained hereinafter. In FIG. 24, the function corresponding to the image upload server 101 is divided into plural server programs. These programs are executed in one computer or computers connected through the network, respectively.

The hardware structures of these computers are the same as that of the image upload host 201 shown in FIG. 2. A timer management server 1201 is the server program which provides the function corresponding to the timer process module 103. An image capture server 12022 is the server program corresponding to the image capture submodule 110. An image editing server 1203 is the server program corresponding to the image data editing submodule 111. An image transmission server 1204 is the server program corresponding to the data transmission submodule 112, the template data capture submodule 113 and the information data generation submodule 114.

The function corresponding to the image information database 116 is executed by the database management system 1205. It is assumed that the server communication process module 117 is incorporated in all the servers. The respective servers mutually exchange the data with the server communication process module 117. However, the functions respectively corresponding to the ftp protocol process submodule 120, the http protocol process submodule 121 and the wvtcp protocol process submodule 122 are given as independent servers, i.e., an ftp translation server 1207, an http translation server 1206 and a camera server translation server 1208, respectively. The process content of each server and the content of the setting data are substantially the same as those in the first embodiment. However, data exchange between the modules is performed in the form of communication between processes through the server communication process module.

In the present embodiment, by setting each module as the independent server, load dispersion can be easily achieved. For example, the image editing server and the image transmission server of which processes are relatively complicated can be operated by a high-speed CPU, and other servers can be operated by a low-speed but low-cost host.

Further, when modification to capture the image from a new-type camera server is thought, there is a peculiar advantage in the present embodiment. Namely, in the first embodiment, it is necessary to remake the image upload server 101 to add the protocol process submodule. On the other hand, in the present embodiment, it only has to make a server for a new protocol process and operate it.

As described above, according to the first and second embodiments, the timer process to start the appropriate process at the previously set point is performed. Namely, it is possible to capture the image by controlling the camera and transfer the image data to the predetermined server, in accordance with the previously set schedule. Thus, the automatic upload service can be provided.

Further, by storing the image information captured according to the schedule in the plural storage means such as the memory, the hard disk and the like, it is possible to upload and distribute the past images.

Further, since the image data captured by the camera is processed and edited to generate the data of which format is suitable for upload to the Internet, it is possible to easily upload and distribute the image data through the Internet.

Further, there is the model as the template information to display at least one of the image data capture date and time, the image data size, the title, and the camera control information, together with the image data. Thus, it is possible to provide together with the image data the information which is understandable only after the image is captured, to the user without laboriousness and surprint on the image.

Further, by receiving the user's processing and editing request and thus controlling the application program to process and edit the image data, it is possible to perform the diversified editing process according to user's desire.

Further, by enabling the schedule setting with the time designation, the date designation and the day designation, it is possible to highly increase the degree of freedom for the schedule setting.

Further, since the arbitrary server can be designated and transferred, it is possible to structure a system of which functions are divided. For example, such the system includes the server only for photographing the image with the camera, the server only for accumulating the image data, and the server for uploading the images to the Internet. Thus, it is possible to flexibly cope with the various operation forms for providing the image upload service.

Further, by managing the data transfer route, for example, it is possible to avoid the route with the trouble and transfer the image data, and to arbitrarily set the modem connection and the gateway host connection.

Further, by managing the available term of the image data stored in the storage means and thus deleting from the storage means the image data of which available term expired, it is possible to prevent that the capacity of the storage means becomes full and thus the image can not be captured.

Further, by preparing the various kinds of template information, it is possible to flexibly cope with the various display forms and provide the abundant expressive image upload service.

Further, since the instruction from the user on the network is received to control the camera, it is possible to capture the image data at arbitrary timing. Thus, it is possible to cope with the user's various and sudden requests.

Third Embodiment

Figure 27:
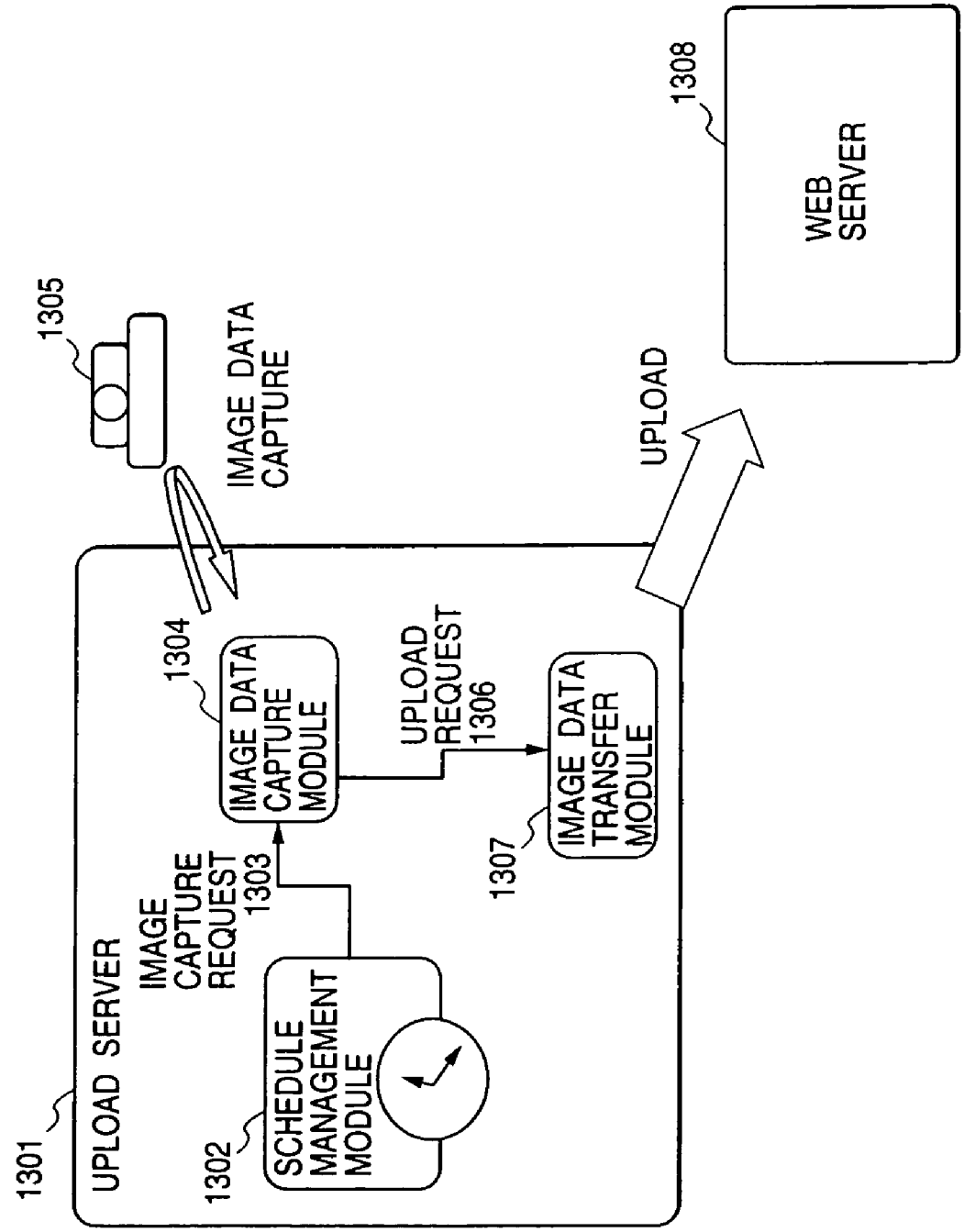
FIG. 27 is a diagram for explaining a basic operation flow in the embodiment.

First, a basic structure of a system to which the third embodiment of the present invention is applied will be explained with reference to FIG. 27. It is of course possible to use the present embodiment alone. Besides, it is also possible to use the present embodiment by incorporating the points different from the first and second embodiments into these embodiments.

An upload server 1301 is composed of following three modules, i.e., a schedule management module 1302, an image data capture model 1304 and an image data transfer module 1307.

The schedule management module 1302 is the module which manages data and time when the upload process to the Web server should be performed. For example, on the basis of setting (called schedule setting) such as "the image is captured from the camera 1 at 10 a.m. every day, and uploaded to the Web server A", "the image is captured from the camera 2 every 30 minutes from 2 to 5 p.m. every day, and uploaded to the Web server B", or the like, an image capture request 1303 is sent to the image data capture module 1304 when the designated time comes.

The schedule management module 1302 which has an internal timer observes the time and performs the above process.

The image data capture module 1304 which received the image capture request 1303 captures image data from a video camera 1305 which is designated in this request 1303. At this time, in order to reduce the size of the image data, data conversion into jpeg format or gif format is frequently performed. The captured image data is combined with the information of the Web server being the upload destination, and transmitted as an upload request 1306 to the image data transmission module 1307.

The image data transmission module 1307 which received the upload request 1306 uploads the image data to a designated Web server 1308. In such the upload process, the ftp protocol or the http protocol which is a general file transfer protocol is used.

Hereinafter, the system of the present embodiment will be explained.

Figure 26:
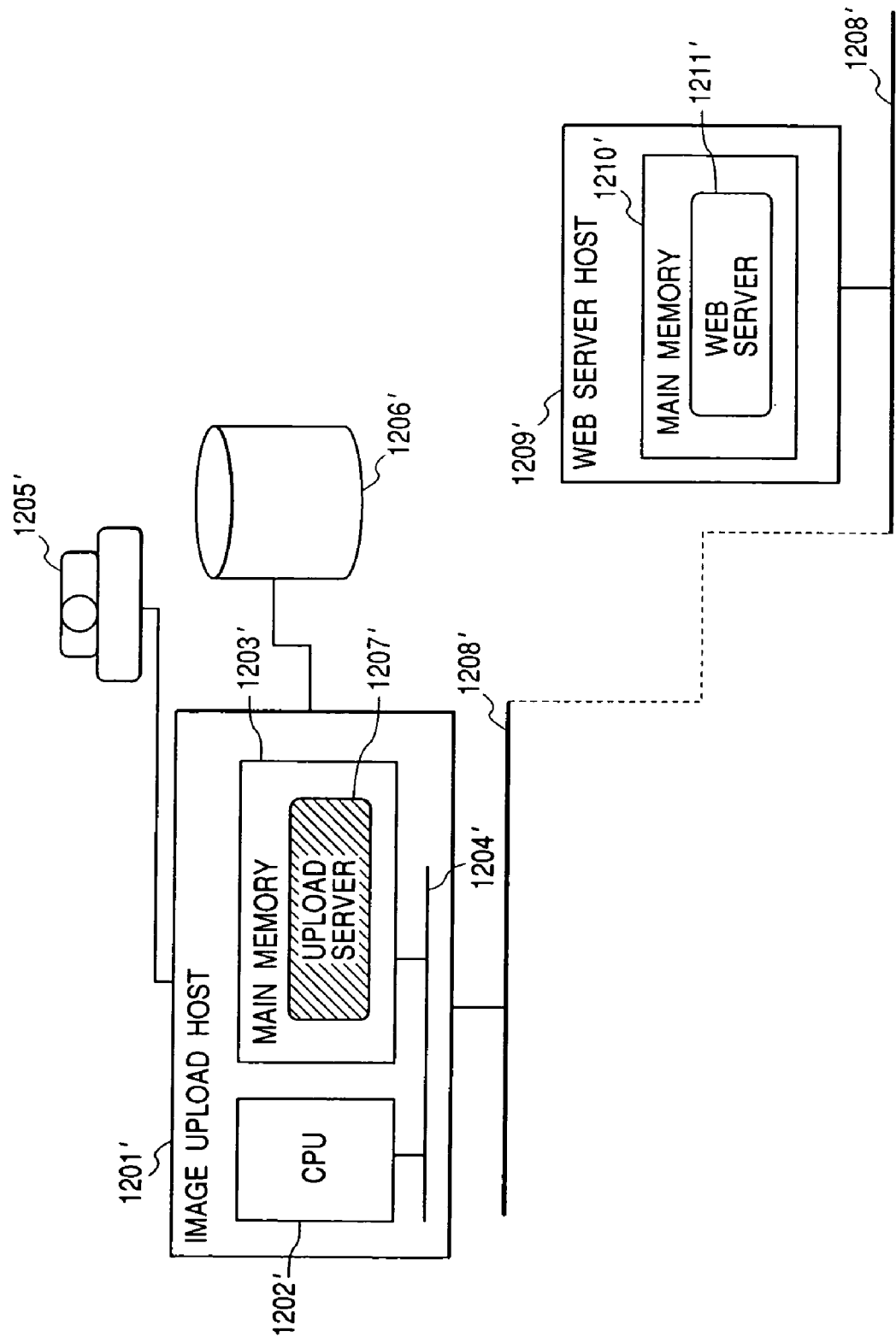
FIG. 26 is a block diagram showing a hardware structure according to the third embodiment.

FIG. 26 is a block diagram showing the hardware structure of the image upload system according to the present embodiment.

In FIG. 26, an image upload host 1201' is the computer in which an upload server program 1207' being the main of the image upload system runs. The image upload host 1201' contains a CPU 1202' and a main memory 1203' which are connected to each other through a calculator bus 1204'. The running upload server program 1207' is held in the main memory 1203'.

A video camera 1205' for capturing image data and a secondary storage (a hard disk 1206' in FIG. 26) for holding execution files and various setting information are connected to the image upload host 1201'.

The image upload host 1201' itself is connected to a computer network 1208'. Also, an Web server host 1209' being the other computer is connected to the computer network 1208'.

The Web server host 1209' contains a CPU, a main memory 1210' and a calculation bus, and the main memory 1210' holds a running Web server program 1211'. In the drawing, only the main memory and the Web server program are added with the numerals.

FIG. 26 only shows one video camera and one Web server host. However, in actual operation, plural video cameras might be provided for the image upload host 1201', and plural Web server hosts being the upload destinations might be connected to the computer network 1208'.

Figure 25:
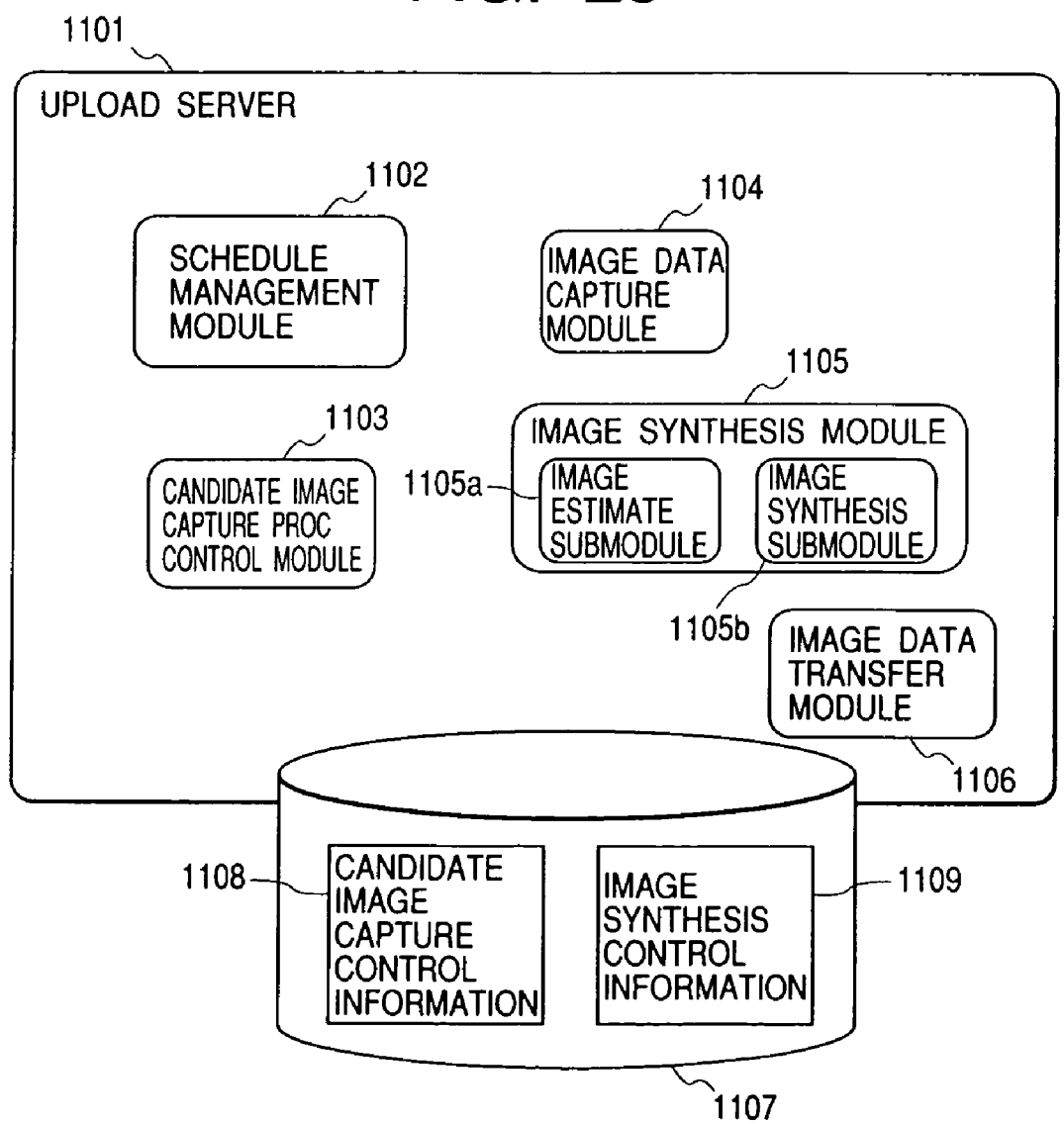
FIG. 25 is a diagram showing a software structure according to the third embodiment of the present invention.

FIG. 25 is a diagram showing a structure of an upload server program to which the present invention is applied. An upload server (program) 1101 is composed of a schedule management module 1102, a candidate image capture process control module 1103, an image data capture module 1104, an image synthesis module 1105, and an image data transfer module 1106. In these modules, the modules 1102, 1104 and 1106 have substantially the same functions and roles as those of the same-named modules explained in FIG. 27, respectively. However, an image data compression process is not performed by the module 1104 but is performed by the image synthesis module 1105.

The candidate image capture process control module 1103 is the module which is used, when the schedule management module 1102 starts the image capture process, not to capture one image data but to be able to capture plural image data (such the image data are called candidate (or expectant) images hereinafter).

The image synthesis module 1105 is the module which is used to generate from the plural candidate images captured the image data (called an upload image hereinafter) to be finally uploaded. The schedule management module 1102 transmits the image capture request to the image data capture module 1104 at a certain interval for a certain time from the start of the image capture process, whereby the image data is captured.

The image synthesis module 1105 is further composed of two submodules, i.e., an image estimate submodule 1105a and an image synthesis submodule 1105b.

The image estimate submodule 1105a is the module which estimates each candidate image and calculates a degree of importance (or a value) of this candidate image. It should be noted that the degree of importance is simply called importance hereinafter. In the present embodiment, a degree of similarity (or a resemblance) to a predetermined image is used as the estimate standard. It should be noted that the degree of similarity is simply called similarity hereinafter.

The image synthesis submodule 1105b creates the upload image from the candidate images on the basis of the result estimated by the image estimate submodule 1105a.

The candidate image capture process control module 1103 and the image synthesis module 1105 are controlled respectively based on candidate image capture control information 1108 and image synthesis control information 1109 both stored in a hard disk 1107.

The candidate image capture control information 1108 includes two items, i.e., a candidate image capture time and a candidate image capture interval. By the candidate image capture time, it is set how many seconds (or minutes) the schedule management module 1102 captures the candidate images from the start of the image capture process.

The candidate image capture interval is the item which is used to set at what interval of seconds (or milliseconds) the candidate image is captured during the candidate image capture time.

The image synthesis control information 1109 includes following items, i.e., sample image setting, a sample image capture method, a sample image file name, a comparison area (x, y, width, height), importance information, maximum coincident importance, minimum coincident importance, and other importance.

The sample image setting is the information of the image used as the estimate standard for each candidate image. This information is composed of the sample image capture method, the sample image file name and the comparison area. The sample image capture method is the setting for a method to capture the sample image. In the present embodiment, one of following three methods is selectable as the sample image capture method.

Figure 29:
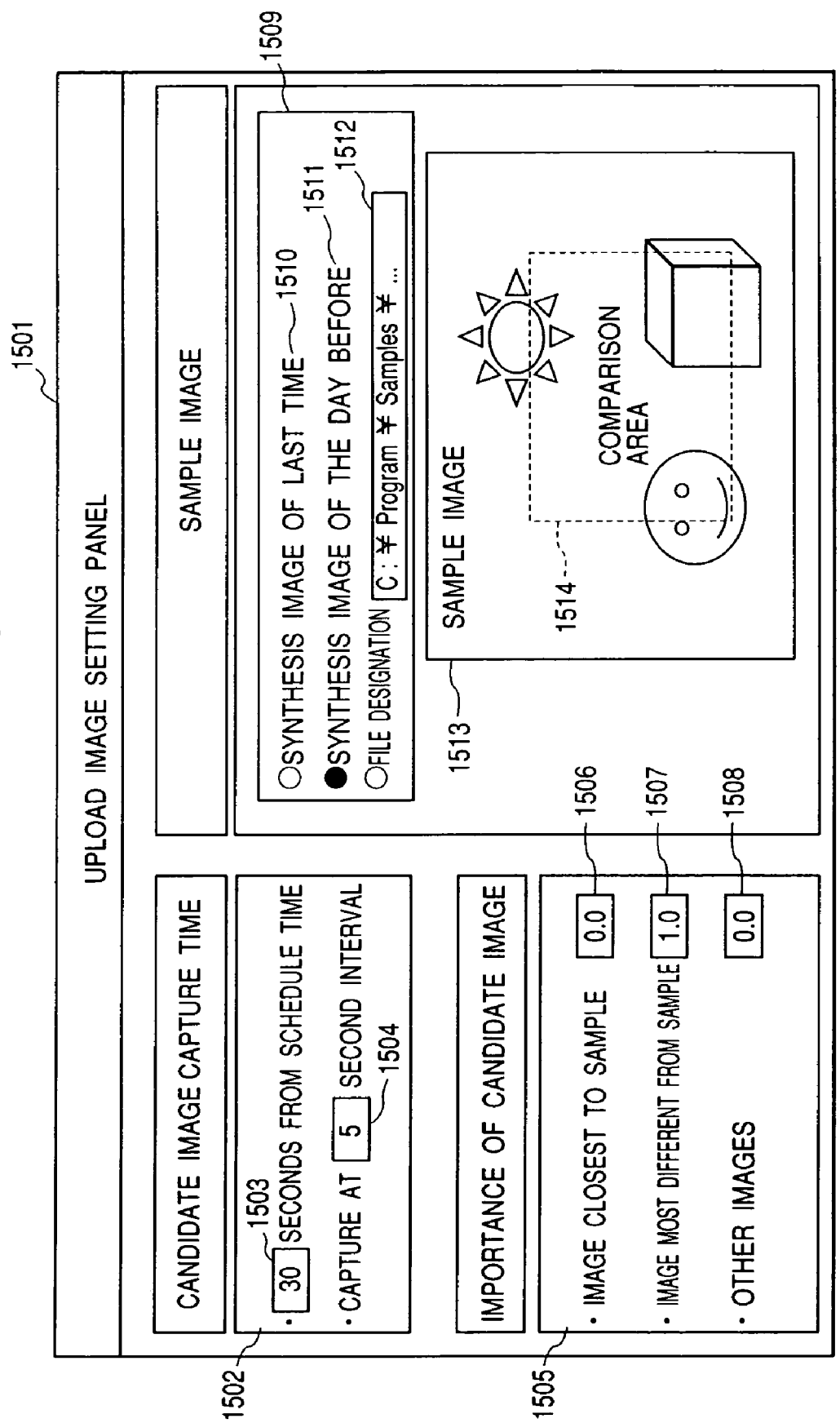
FIG. 29 is a diagram showing a user interface according to the third embodiment.

In a method (a), the sample image is captured from the upload image in the process of the last time (1510 in FIG. 29). In a method (b), the sample image is captured from the upload image in the process at the same time on the day before (1511 in FIG. 29). In a method (c), the sample image is captured from a predetermined image file to be designated (1512 in FIG. 29).

Namely, in the method (a), the upload image which was obtained as a result of the one-before schedule execution is used as the sample image. In the method (b), the upload image which was obtained as a result of the day-before (not one-before) schedule execution is used as the sample image. In the method (c), the path and the file name of the image file being the sample image are designated as the sample image file name. Also in the methods (a) and (b), the path and the file name used to store the sample image are necessary. However, in these methods, since the image to be designated can be known from the schedule information, such the image is automatically set as the sample image file name.

The comparison area represents the item which is used to set which parts of the sample image and the candidate image should be estimated. Concretely, this area is set as the rectangle information composed of the x coordinate of the left edge of the estimate target part, the y coordinate of the lower edge of the estimate target part, the lateral size of the estimate target part, and the longitudinal size of the estimate target part.

The importance information is the information represents how to give the importance for each candidate image according to the estimate standard. In the present embodiment, the importance is set for the maximum coincident importance, the minimum coincident importance and the other importance, respectively. At this time, the sum of the maximum coincident importance, the minimum coincident importance and the other importance must be set to "1.0".

The maximum coincident importance represents the importance which is allocated to the candidate image of which coincidence to the sample image is highest (i.e., the image closest to the sample image). The maximum coincident importance can be set up to two digits below decimal point within the range from "0" to "1.0".

The minimum coincident importance represents the importance which is allocated to the candidate image of which coincidence to the sample image is lowest (i.e., the image most different from the sample image). The minimum coincident importance can be also set up to two digits below decimal point within the range from "0" to "1.0".

The other importance represents the importance which is allocated to other candidate image. The other importance can be also set up to two digits below decimal point within the range from "0" to "1.0". Here, it should be noted that, e.g., the most average image can be set. According to implementation, it is thought that the other importance can be set more in detail. For example, the importance is changed if the coincidence exceeds a certain value. Even in this case, the following process method is applicable as it is.

(User Interface of Embodiment)

FIG. 29 shows the user interface by which the user sets the candidate image capture control information 1108 and the image synthesis control information 1109.

In FIG. 29, an upload image setting panel 1501 is displayed as one window. This upload image setting panel 1501 is roughly divided into three areas, i.e., a setting area 1502 for "candidate image capture time", a setting area 1505 for "importance of candidate image", and a setting area 1509 for "sample image".

The setting area 1502 is the area for setting the candidate image capture control information 1108. In this area, a candidate image capture time is set in the unit of second in an input field 1503, and a candidate image capture interval is set in the unit of second in an input field 1504.

The setting area 1505 is the area for setting the importance information of the image synthesis control information 1109. In this area, the maximum coincident importance is set in an input field 1506, the minimum coincident importance is set in an input field 1507, and the other importance is set in an input field 1508.

The setting area 1509 is the area for setting the sample image of the image synthesis control information 1109. In this area, the sample image capture method is set by selecting one of the items 1510, 1511 and 1512. Concretely, the method (a) that the sample image is captured from the upload image in the process of the last time can be selected by selecting the item 1510, the method (b) that the sample image is captured from the upload image in the process at the same time on the day before can be selected by selecting the item 1511, and the method (c) that the sample image is captured from the predetermined image file to be designated can be selected by selecting the item file designation item) 1512.

When the item 1512 is selected, an appropriate path of the image file is input. In case of selecting other items, the sample image file name is not set by the user but set using the predetermined path and file name.

The selected sample image is displayed in an area 1513. When the item 1512 is selected, the designated image data itself is displayed in the area 1513. On the other hand, when the item 1510 or 1511 is selected, since there is no upload image at the setting time, a provisional image is displayed in the area 1513.

In the sample image of the area 1513, a comparison area 1514 is displayed with the dotted line. The user can change the position and size of the comparison area 1514 by dragging the dotted line with a mouse or the like.

Thus, it is possible to set the part which should be emphatically compared. For example, when the part where change appears frequently is known beforehand, such the dragging is effective.

(Process Flow of Embodiment)

Figure 28:
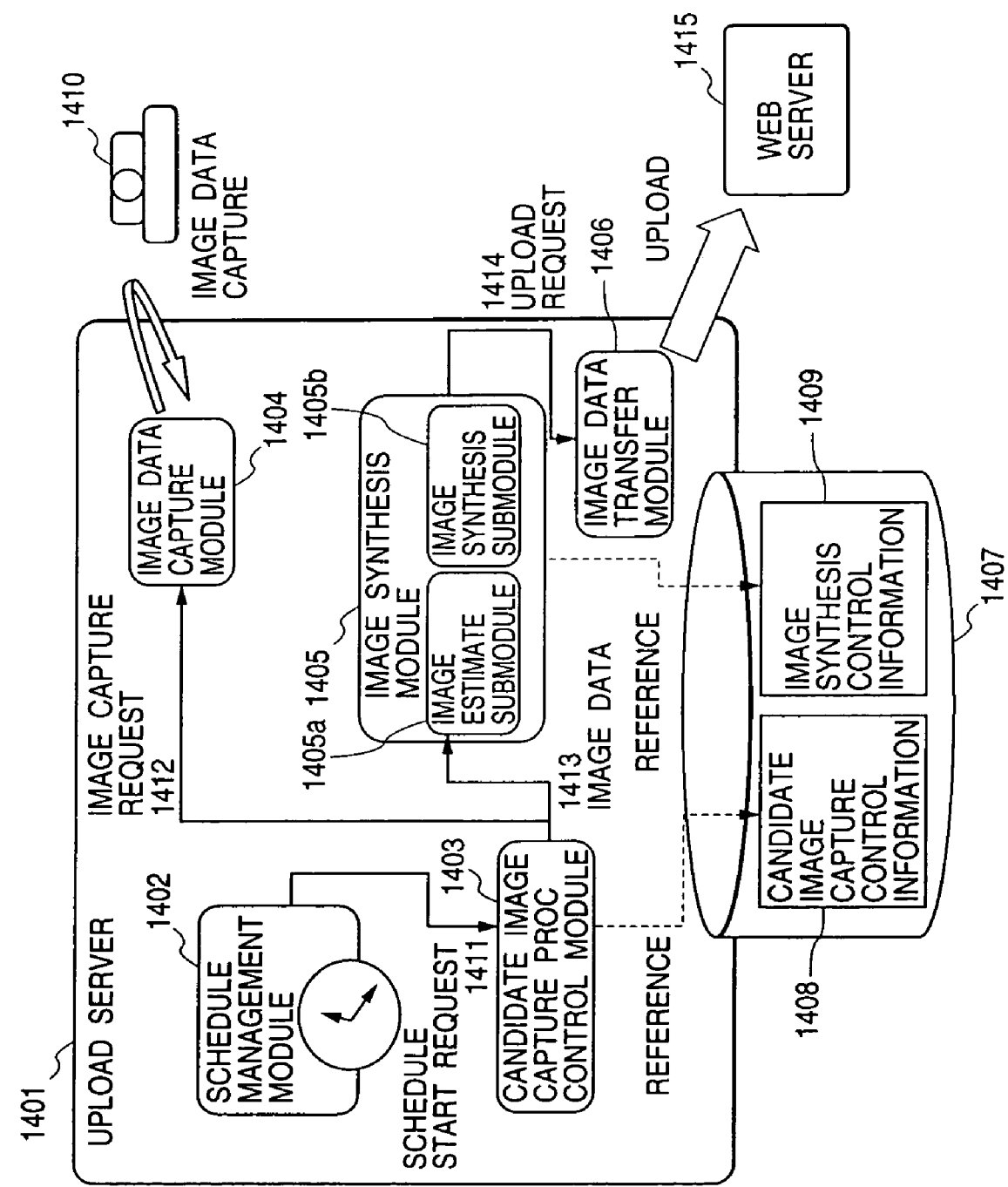
FIG. 28 is a diagram for explaining an operation flow according to the third embodiment.
Figure 30:
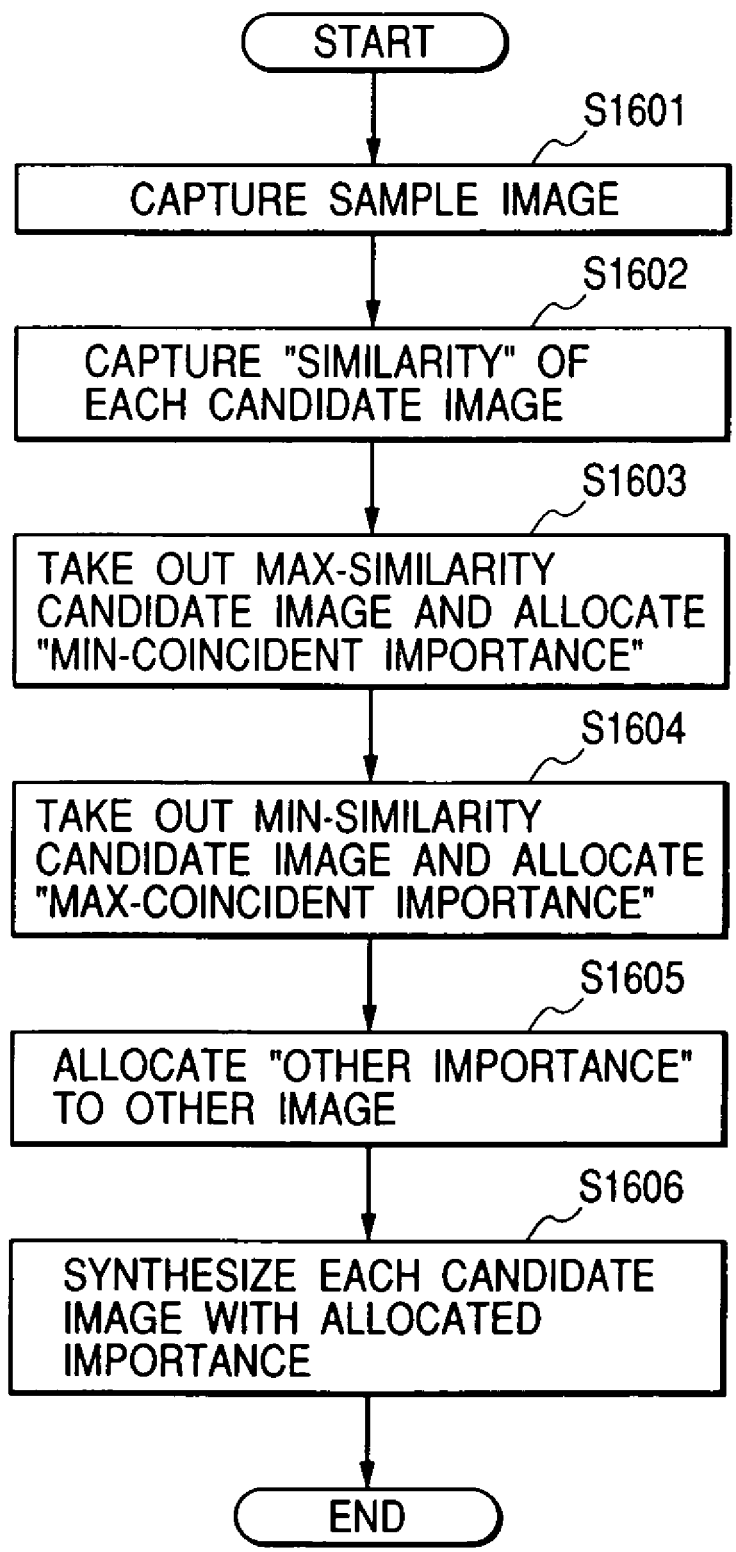
FIG. 30 is a flow chart showing an image synthesis process according to the third embodiment.

The flow of the upload server process in the present embodiment will be explained with reference to FIGS. 28 and 30. FIG. 28 is a schematic diagram of the upload server process flow, and FIG. 30 is a flow chart showing the process of an image synthesis module 1405.

The operation of an upload server 1401 is started by a schedule management module 1402. Then, a schedule start request 1411 is transmitted to a candidate image capture process control module 1403 at the time designated based on schedule setting set in the schedule management module 1402.

The candidate image capture process control module 1403 which received the schedule start request 1411 transmits plural image capture requests 1412 to an image data capture module 1404 at the candidate image capture interval during the candidate image capture time.

Every time the image data capture module 1404 receives the image capture request 1412, this module 1404 captures image data from a video camera 1410 and then transmits the captured data to the candidate image capture process control module 1403.

When the candidate image capture process control module 1403 receives the candidate image data corresponding to all the image capture requests 1412, this module 1403 transmits all candidate image data 1413 to the image synthesis module 1405.

The image synthesis module 1405 first starts the process in an image estimate submodule 1405*a*.

Then, the image estimate submodule 1405*a* takes out the sample image file name from an image synthesis control information 1409, and reads the content thereof to capture the sample image data (S1601).

Next, the similarity of each candidate image is calculated (S1602). In this calculation process, (1) the information representing the comparison area is extracted from the image synthesis control information 1409, and (2) the sum of pixel similarity (or pixel approximation) of all pixels within the comparison area is calculated on the candidate image. At this time, the pixel similarity=ABS{(color data of one pixel in the candidate image)−(color data of the same pixel in the sample image)}. Here, symbol ABS denotes a function to return the absolute value of argument.

The sum of the entire pixel similarity obtained in the above operations (1) and (2) is considered to be "similarity". In this case, the similarity represents that, as its value becomes close to "0", the similarity becomes high. Of course, the calculation of the similarity is not limited to this.

When the similarity of all the candidate images is calculated, the candidate image of which similarity is highest is taken out, and the setting value of the minimum coincident importance is allocated to this image (S1603).

Further, the setting value of the maximum coincident importance is allocated to the candidate image of which similarity is lowest (S1604).

The other importance is allocated to the remaining candidate images (S1605).

When the importance allocation ends, each candidate image is synthesized in the image synthesis submodule 1405*b*, whereby the upload image is created (S1606).

In the upload image creation, (1) in each pixel of each candidate image, a weighted pixel value is calculated according to an expression (weighted pixel value)=(color data of pixel)×(importance of candidate image), and (2) the sum of the weighted pixel values of all the candidate images is calculated for each pixel.

When the upload image creation ends, a compression process in the jpeg format or the like is performed, and then an upload request 1414 is transmitted to an image data transfer module 1406. In a case where the created upload image can be reused as the sample image, the file is stored in the hard disk or the like, and its path and file name are written at the sample image file name in the image synthesis control information 1409.

The image data transfer module 1406 which received the upload request 1414 transmits the upload image to an Web server 1415 with the file transfer protocol such as the ftp protocol or the like.

In the present embodiment, although the similarity to the predetermined image is used as the estimate standard, this standard is not limited to the similarity. Namely, the data (e.g., lightness information of obtained plural images) which can be determined for each image can be used as the estimate standard. In other words, the estimate standard can be appropriately determined according to what standard the image to be uploaded is selected on.

As described above, according to the present embodiment, it is possible to generate and upload the image data having a desirable feature. Especially, in the present embodiment, since the desirable feature is set based on the similarity between the sample image and the candidate image, the setting item itself is very simple. For example, in the case where the minimum coincident importance is set to "1.0" and the other importance is set to "0.0", if the sample image is set to "upload image on the day before", it is possible to upload the different image data every day.

In this case, it can be said that it is possible to select the image rather than to synthesize it.

Further, when the same value is set to all the importance, it is possible to upload the image data which is obtained by averaging all the candidate images.

Namely, it is possible to freely select what kind of image should be uploaded, in accordance with the setting of importance. Thus, it is possible to cope with extremely simple and various operations.

Fourth Embodiment

Figure 31:
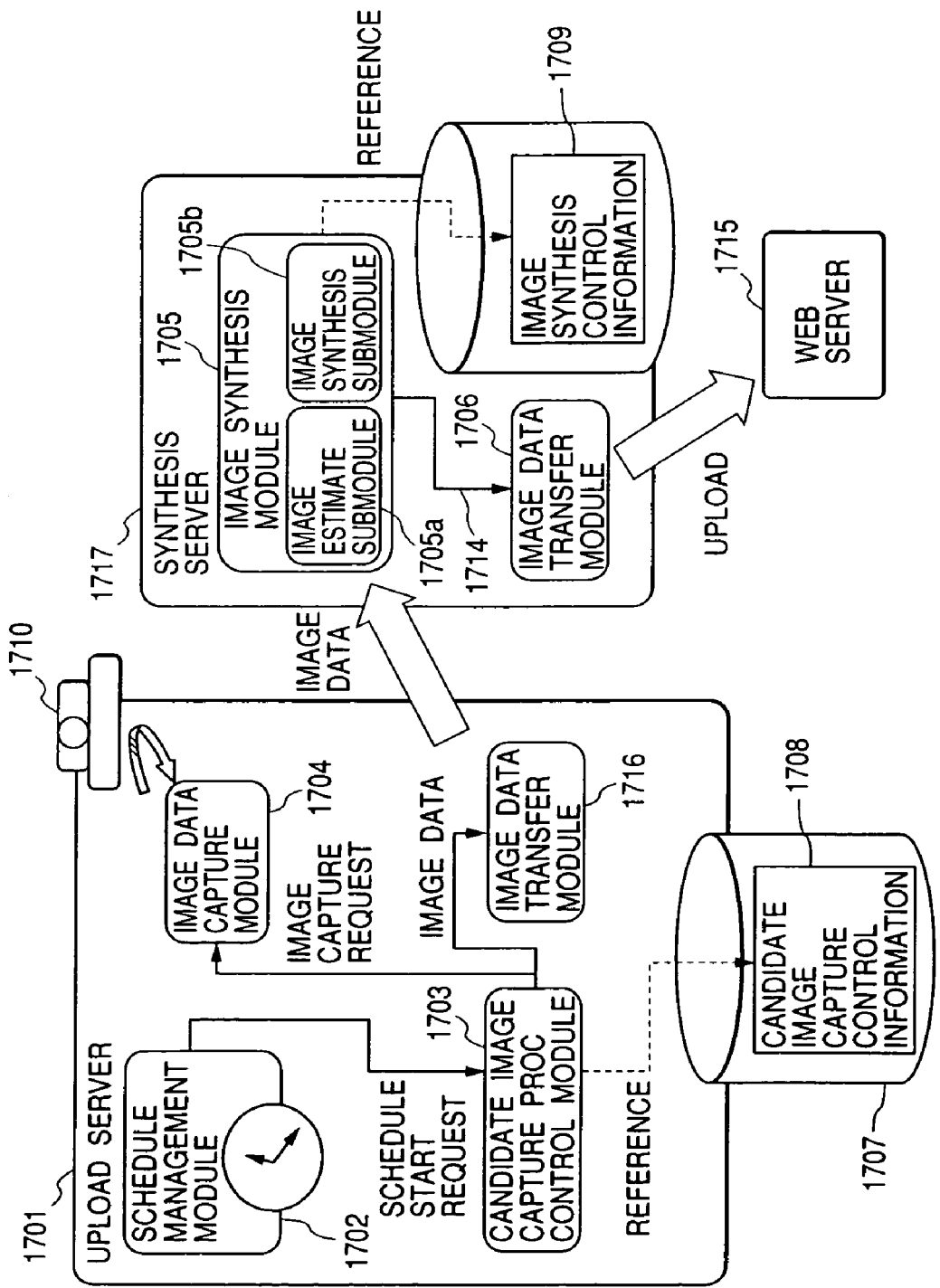
FIG. 31 is a diagram showing a structure according to the fourth embodiment of the present invention.

FIG. 31 is a diagram showing a structure according to the fourth embodiment of the present invention. It is of course possible to use the present embodiment alone. Besides, it is also possible to use the present embodiment by incorporating the points different from the first, second and third embodiments into these embodiments.

The function corresponding to the upload server 1101 is divided into an upload server 1701 and a synthesis server 1717 in FIG. 31. These servers 1701 and 1717 are operated respectively on different computers connected through such the network as shown in FIG. 26.

The upload server 1701 is given by deleting the image synthesis module from the upload server 1101 in the third embodiment. The upload server 1701 is composed of a schedule management module 1702, a candidate image capture process control module 1703, an image data capture module 1704, an image data transfer module 1716 and a candidate image capture control information 1708. It should be noted that, except for the function of the image data transfer module 1716, the functions of these modules are the same as those in the first embodiment respectively. Namely, the image data transfer module 1716 does not transmit the upload image to the Web server but transmits the candidate image before synthesizing to the synthesis server 1717.

In the synthesis server 1717, the candidate image is received by an image synthesis module 1705, and the upload image is created based on image synthesis control information 1709 by an image estimate submodule 1705*a* and an image synthesis submodule 1705*b*. It should be noted that the creation method and its process content are the same as those in the third embodiment.

Finally, an upload request 1714 is transferred to an image data transmission module 1706, and the upload image is uploaded to an Web server 1715.

In the present embodiment, a degree of freedom in the operation increases since the function is divided into the upload server 1701 and the synthesis server 1717. For example, the plural upload servers can create upload images by using the single synthesis server. Conversely, the single upload server can easily cause the plural synthesis server to create various kinds of upload images.

However, when the server is not divided according to the function, it is possible to reduce the cost because there is no need to prepare the plural servers.

Further, in the present embodiment, the image to be uploaded is selected according to the predetermined condition for the image. However, it is possible by using a microphone (not shown) of the camera server shown in FIG. 2 to upload the data in accordance with a predetermined condition of voice. Thus, for example, it is possible to upload an image at the time when noise is larger that a predetermined level.

As described above, according to the present embodiment, it is possible to easily upload the image data having a feature desirable for the user.

Especially, since the upload image is generated according to the similarity, it is possible to upload the same image or conversely not to upload it, so as to cope with various embodiments.

Further, by setting the similarity according to the estimate standard, it is possible to easily designate what kind of image should be uploaded. Also, it is possible to perform various processes according to the setting of the importance.

Further, by performing the above processes on the single server, it is possible to reduce the cost of the entire system. On the other hand, by sharing the function with the plural servers, it is possible to increase process capabilities and the degree of freedom in the processes.

Fifth Embodiment

Hereinafter, the present embodiment will be explained with reference to the attached drawings, by way of example. In this example, it is assumed that the plural images and the files storing the relative information concerning these images are held in the WWW server of the Internet, and a user refers to the plural images by accessing the server from a client machine. It is of course possible to use the present embodiment alone. Besides, it is also possible to use the present embodiment by incorporating the points different from the first to fourth embodiments into these embodiments.

Figure 32:
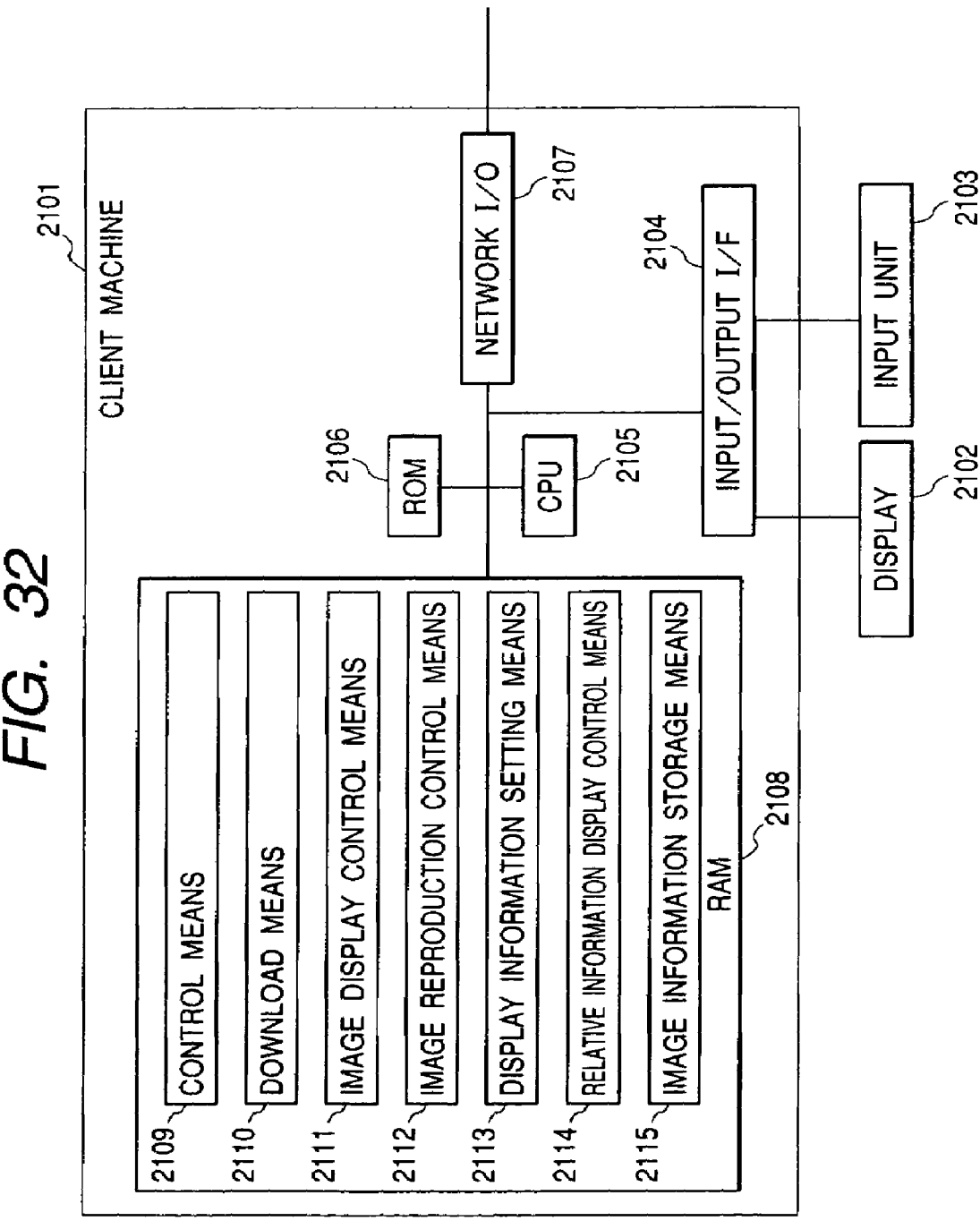
FIG. 32 is a diagram showing a structure according to the fifth embodiment of the present invention.

FIG. 32 shows the structure of the present embodiment. In FIG. 32, numeral 2101 denotes the client machine which can be achieved based on a personal computer, numeral 2102 denotes a display, numeral 2103 denotes an input unit which consists of a mouse and a keyboard, numeral 2104 denotes an input/output interface (I/F), numeral 2105 denotes a CPU, numeral 2106 denotes a ROM, numeral 2107 denotes a network input/output (I/O) port, numeral 2108 denotes a RAM which stores executable programs, and numeral 2109 denotes a control means which controls and operates various means necessary in the present embodiment. It should be noted that the control means 2109 controls the various means by reading and executing the executable programs. Numeral 2110 denotes a download means which downloads an image and its image information, numeral 2111 denotes an image display control means which controls image display, numeral 2112 denotes a means which control image reproduction, and numeral 2113 denotes a means which performs setting of the information to be displayed. This means 2113 also selects a language to be displayed. Numeral 2114 denotes a means which control relative information display, and numeral 2115 denotes a means which stores the downloaded image and its image information. It should be noted that these elements 2109 to 2115 may be stored as executable programs and data. In this case, these programs and data may be stored in the RAM 2108 and executed by the CPU 2105 for various functions.

Figure 33:
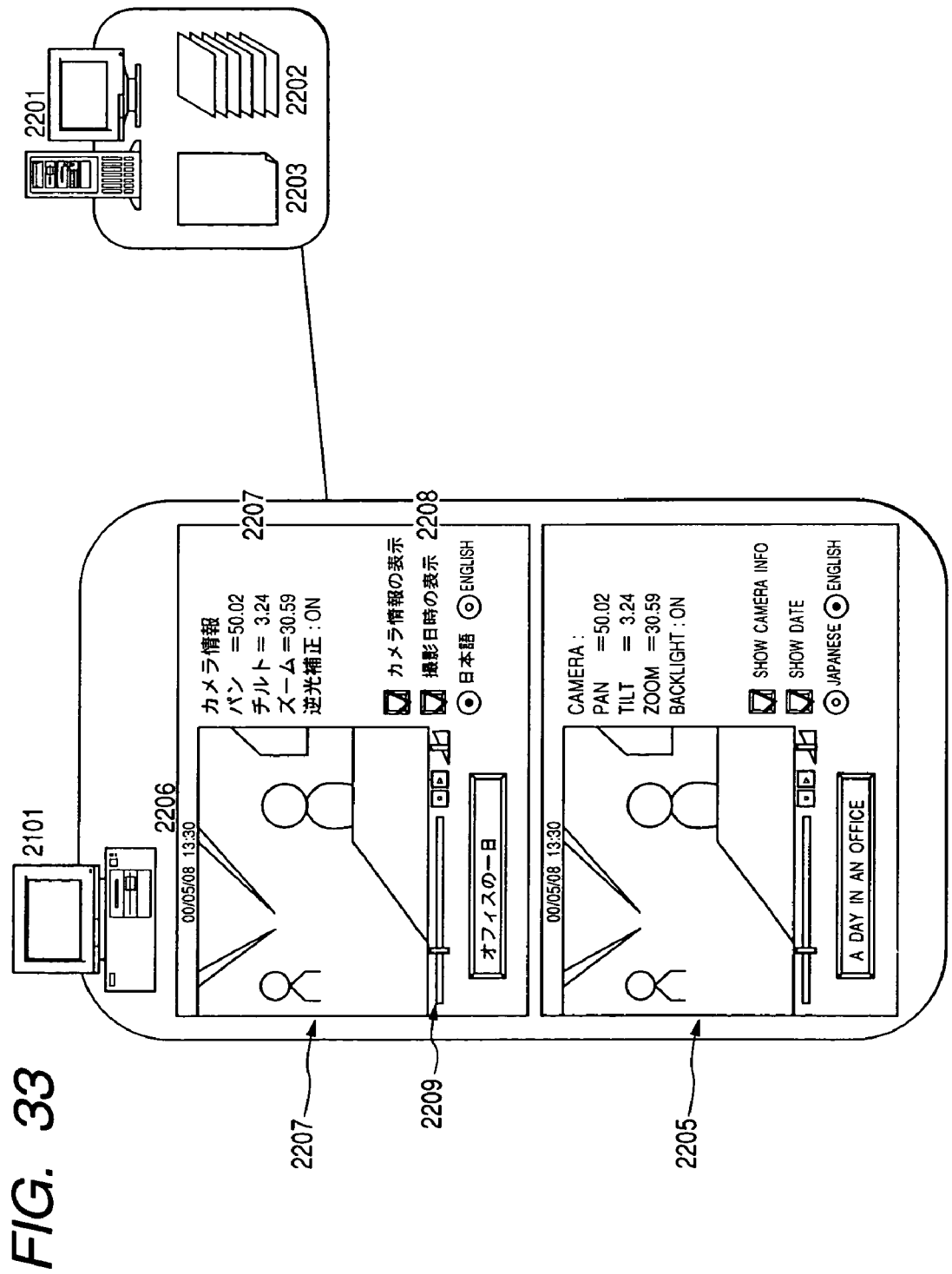
FIG. 33 is a diagram showing a user interface according to the fifth embodiment.

FIG. 33 is a diagram showing an example of a user interface and a system structure. In FIG. 33, numeral 2201 denotes a server which stores the image and its relative information. The server 2201 has the structure same as the personal computer as in the elements 2102 to 2109 to functions as the server. In the present embodiment, the server 2201 is assumed to be the WWW server. When various information has been stored in the WWW server, it is possible to capture these information by using the http protocol. Of course, it is possible to prepare a server other than the WWW server and capture the various information by using a protocol corresponding to this server. Numeral 2202 denotes an image file, and numeral 2203 denotes a relative information list file which stores relative information of the plural images.

Figure 36:
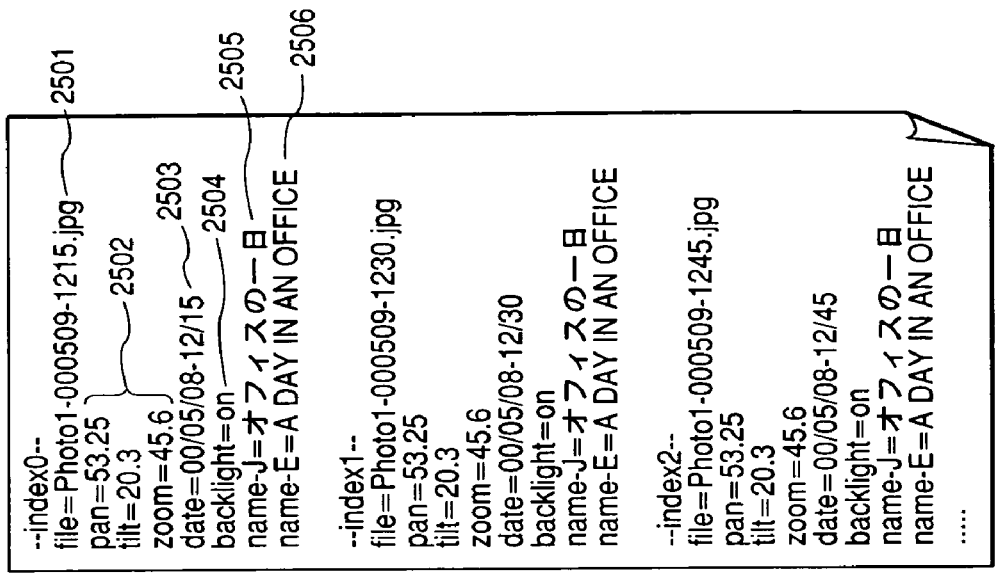
FIG. 36 is a diagram showing a concrete example of a relative information list file which is stored in a server.

The content of the relative information list file 2203 is shown in FIG. 36. In the file, the relative information of three images index0, index1 and index2 is recorded. A character string 2501 represents the file name of the image index0. Character strings 2502 represent the information of the camera direction at the time when the image was photographed, i.e., "pan" is the lateral-direction angle from a predetermined position, "tilt" is the longitudinal-direction angle from the predetermined position, and "zoom" is the zooming angle of the camera. A character string 2503 represents the information of the photographing date and time, a character string 2504 represents whether or not flash for backlight correction was performed. Character strings 2505 and 2506 represent the information of the image title, and "name-J" and "name-E" represent Japanese notation data and English notation data respectively. Either of these two data is displayed according to the user's selection instruction. Although in this case either of the two languages (Japanese and English) is selectable, it is of course possible to use three or more languages. Further, in the above explanation, only the title information corresponds to the plural languages. However, in the following, it is assumed that the information of each of the character strings 2502 to 2506 corresponds to the plural languages.

In FIG. 33 again, numeral 2204 denotes a user interface which is provided on the client side and of which mode has been changed to a Japanese mode. Numeral 2205 denotes a user interface which is provided on the client side and of which mode has been changed to an English mode. Numeral 2206 denotes a photographing date and time display area, numeral 2207 denotes a camera information display area, and numeral 2208 denotes a display information setting area. In the display information setting area 2208, it is possible to select whether or not the camera information (the photographing direction, exposure, and execution/nonexecution of the flash) should be displayed and whether or not the photographing date and time should be displayed. Further, it is possible to select whether the relative information should be displayed in English or in Japanese. Numeral 2209 denotes an image reproduction control area. By providing the image reproduction control area 2209, it is possible to display the images, e.g., in the order of index number. The various information is changed according to change of the displayed image. It should be noted that the order is not limited to the order of index number, i.e., it is possible to display the images in the order of photographing time.

Figure 35:
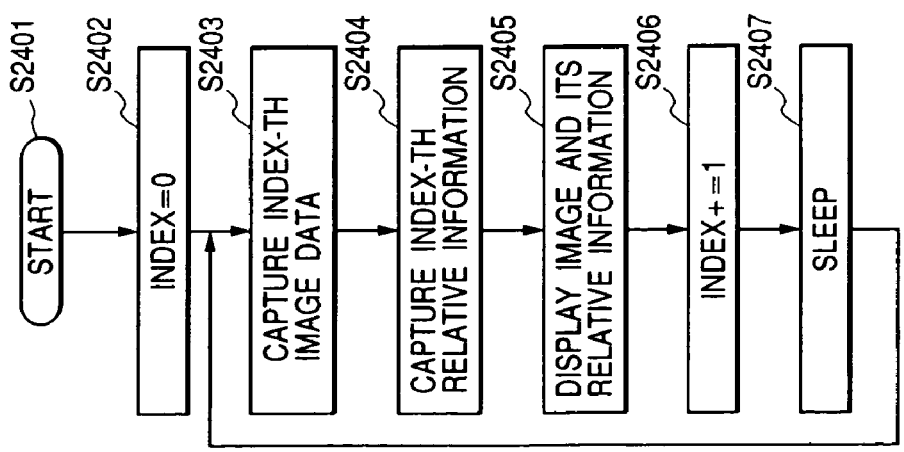
FIG. 35 is a flow chart showing an operation procedure of a thread in the fifth embodiment.

Next, an operation procedure will be explained with reference to FIGS. 34 and 35. First, the process starts in a step S2301 to transmit the transmission request of the desired image data to the server. In a step S2317, the image corresponding to the request and the relative information being relative to this image and capable of being selected and displayed from the plural languages are read and transmitted to the client by the server. Thus, the client receives these image and relative information from the server. In a step S2302, a GUI (graphic user interface) on the setting panel is generated and displayed. In a step S2303, the image file 2202 is downloaded from the server 2201 by the download means 2110 and stored in the image information storage means 2115. In a step S2304, the relative information list file 2203 is downloaded from the server 2201 by the download means 2110 and stored in the image information storage means 2115. In these steps S2302, S2303 and S2304, it is possible to rapidly capture the necessary information from the image information storage means 2115. Next, in a step S2305, the flow is on standby until next data is input by the user. Then, in a step S2306, it is judged whether or not the reproduction button within the image reproduction control area 2209 is depressed. If the button is depressed, the flow advances to a step S2312, while if the button is not depressed, the flow advances to a step S2307. In the step S2312, a thread for sequentially displaying the images is generated, and the process starts. The operation procedure of the thread will be explained later. Then, the flow returns to the step S2305. In the step S2307, it is judged whether or not the stop button within the image reproduction control area 2209 is depressed. If the button is depressed, the flow advances to a step S2313, while if the button is not depressed, the flow advances to a step S2308. In the step S2313, the thread for sequentially displaying the images is stopped, and the flow then returns to the step S2305. In the step S2308, it is judged whether or not there is the user's input to the display information setting area 2208. If there is the input, the flow advances to a step S2314, while if there is no input, the flow advances to a step S2309. In the step S2314, the state of the GUI is changed according to the user's input. For example, when the check box to set whether or not the photographing date and time should be displayed is set to be OFF, such a GUI component is set to be invisible. Then, the flow advances to a step S2315. In the step S2315, the language which is being selected is discriminated, the information of this language is stored, and the display is changed to the display of the language selected by referring to the relative information list file 2203. Then, the flow returns to the step S2305. In the step S2309, it is judged whether or not there is the user's input to the speed variable slider in the image reproduction control area 2209. If there is the input to the slider, the sleep value representing the time up to a next image is stored according to the user's input, and the flow returns to the step S2305, while if there is no input to the slider, the flow advances to a step S2310. In the step S2310, it is judged whether or not the program end request is input from the user. If the program end request is input, the flow advances to a step S2311 to end the process, while if the program end request is not input, the flow returns to the step S2305.

Next, the operation procedure of the thread will be explained with reference to FIG. 35. The thread is generated in the step S2312, and the process starts. Execution of the thread starts in a step S2401. In a step S2402, "Index" which is the variable for holding that the information concerning the image how many is to be proposed is initialized to "0". In a step S2403, the Index-th image is captured. The content of this image has been stored in the image information storage means 2115 in the step S2303. In a step S2404, the Index-th image information (the camera direction etc.) is captured. The captured content which is the content of the relative information list file 2203 is concretely shown in FIG. 36. This content has been stored in the image information storage means 2115 in the step S2304. In a step S2405, the image captured in the step S2403 is displayed on the image display means 2111, and the information captured in the step S2404 is displayed on the photographing date and time display area 2206, the camera information display area 2207, and the like. At this time, the appropriate information is displayed by referring to the language information set in the step S2315. For example, when the Japanese language is being selected, the Japanese language information is captured from the image information storage means 2115 and then displayed on the GUI component. In a step S2406, "Index" is increased by one. In a step S2407, the execution of the thread is temporarily stopped according to the sleep value set in a step S2316. Then, the flow returns to the step S2403. Such the execution of the thread continues until the thread is stopped in the step S2313. By the above operation, the plural images in the server are displayed together with the corresponding image information. Then, the proposed image information and language are changed according to the user's setting.

In the present invention, it is possible to accumulate the image without overwriting and refer to the accumulated image with the simple GUI such as a VCR. Further, since the information representing the camera direction and the like is also recorded, it is possible to provide such the information on the client side. Further, since the display of the information necessary for the user can be set, it is possible to rapidly refer to only the necessary information. Further, since the language information can be changed, it is possible to avoid an inconvenient state that, when users of various countries access, some of them can not understand meaning of the image. Further, since the information for the plural language is transmitted to the client, the client need not access the server whenever he changes the language, whereby it is possible to change the language smoothly.

The present invention is applicable to a system structured by plural equipments (e.g., a host computer, an interface device, a reader, a printer, etc.) or to an apparatus structured by one equipment (e.g., a copying machine, or a fax machine).

Further, it is needless to say that the present invention includes a case where program codes of software to realize the functions of the above embodiments are supplied to a computer in an apparatus or a system connected to various devices to operate them to realize the above functions, and the computer (or CPU or MPU) in this system or apparatus reads and executes the supplied program codes.

In this case, the software program codes themselves realize the functions of the above embodiments, whereby the program codes themselves and the means for supplying these program codes to the computer (e.g., a storage medium storing such the program codes) constitute the present invention.

As the recording medium recording the program codes, for example, it is possible to use a floppy disk, a hard disk, an optical disk, a magnetooptical disk, a CD-ROM, a magnetic tape, a nonvolatile memory card, a ROM, or the like.

Further, it is needless to say that the present invention includes not only the case where the functions of the above embodiments can be realized by executing the supplied program codes, but also a case where the functions of the above embodiments are realized by an OS (operating system) on the computer or in cooperation with other application software or the like.

Further, it is needless to say that the present invention further includes a case where the supplied program codes are once stored in a memory provided in a function expansion board inserted in the computer or a function expansion unit connected to the computer, and a CPU or the like provided in the function expansion board or the function expansion unit executes all the actual process or a part thereof according to the instructions of these program codes, thereby realizing the functions of the above embodiments.

Although the present invention has been explained by using the several preferred embodiments, the present invention is not limited to them. Namely, it is obvious that various modifications and changes are possible in the present invention without departing from the spirit and scope of the appended claims.

What is claimed is:

1. An image processing system comprising:
   capture means for capturing image data from an image input apparatus disposed on a network;
   storage means for storing the plural image data captured by said capture means and, beside the image data, information at the image capture time;
   creation means for creating display image control data from the image data captured by said capture means and the information at the image capture time, the display image control data being the data to control an image for display;
   transmission means for transmitting the display image control data created by said creation means; and
   control means for setting independently a control schedule of each of said capture means, said creation means and said transmission means and effecting a control thereof in accordance with the control schedule set independently.

2. A system according to claim 1, wherein said control means includes image capture control means for controlling said capture means in accordance with the schedule designated in advance.

3. A system according to claim 1, wherein said creation means creates the display image control data in accordance with a predetermined template which is used to cause at least one of a date and time of the image data capture, a size of the image data, a title, camera control information and information concerning voice to be displayed together with the image data.

4. A system according to claim 1, further comprising generation means for generating data of a format suitable for processing and editing the image data captured by said capture means and uploading the processed and edited data to the Internet,
   wherein said storage means stores the data generated by said generation means.

5. A system according to claim 4, wherein the processes which are to be performed by said capture means, said storage means, said creation means and said transmission means are performed by plural image processing apparatuses independently disposed on the network.

6. A system according to claim 1, further comprising control means for receiving a transmission request of an image for display from the network, and controlling said transmission means to transmit the display image control data to a destination from which the transmission request is sent.

7. A system according to claim 1, further comprising transmission route management means for managing a data transmission route to a transmission destination.

8. A system according to claim 7, wherein said transmission route management means manages at least a transmission route for modem connection and a transmission route for gateway host connection.

9. A system according to claim 1, further comprising means for receiving an instruction from a user on the network and controlling said capture means to capture the image data at arbitrary timing.

10. A system according to claim 1, wherein said storage means receives the image data from said capture means through the network.

11. A system according to claim 1, wherein said control means includes transmission control means for performing control to transmit the image data to a predetermined server in accordance with the schedule designated in advance.

12. A system according to claim 1, wherein the information at the image capture time includes information to control an application program for processing and editing the image data.

13. A system according to claim 1, wherein said creation means creates an HTML (HyperText Markup Language) file.

14. A system according to claim 1, wherein said creation means creates an XML (eXtensible Markup Language) file.

15. A system according to claim 1, further comprising deletion means for managing an available term of the image data stored in said storage means and deleting the image data of which available term expired from said storage means.

16. A system according to claim 1, wherein said creation means selects based on a predetermined estimate standard from the plural image data captured by said capture means an image to be uploaded to the network, and creates the display image control data.

17. A system according to claim 16, wherein the predetermined estimate standard is based on a degree of similarity to a predetermined image.

18. A system according to claim 17, wherein the predetermined image is a sample image previously set by a user.

19. A system according to claim 17, wherein the predetermined image is an image generated by said generation means till then.

20. A system according to claim 16, further comprising importance setting means for setting a degree of importance according to the predetermined estimate standard,
   wherein said creation means synthesizes the plural images in accordance with the degree of importance.

21. A system according to claim 20, wherein said capture means, said importance setting means and said creation means are achieved by one server.

22. A system according to claim 20, wherein said capture means, said importance setting means and said creation means are achieved by plural servers.

23. A system according to claim 16, further comprising importance setting means for setting a degree of importance according to the predetermined estimate standard,
   wherein said creation means selects from the plural images the image to be transmitted, in accordance with the degree of importance.

24. A system according to claim 1, wherein said capture means is a camera disposed on the network.

25. A system according to claim 1, wherein said capture means continuously captures the plural images at a predetermined time interval, from a start date and time of the image data capture.

26. A system according to claim 1, wherein the network is the Internet.

27. A system according to claim 1, further comprising:
accumulation means for accumulating the image captured by said capture means, and relative information being relative to the image and capable of being selected and displayed from plural languages; and
reception means for receiving an image transmission request from a client,
wherein said transmission means reads the image based on the image transmission request received by said reception means and the relative information being relative to the read image and capable of being selected and displayed from the plural languages, and then transmits the read image and relative information.

28. An image processing system comprising:
capture means for capturing image data from an image input apparatus disposed on a network;
a storage means for storing the plural image data captured by said capture means;
transmission means for transmitting from the network the image data stored in said storage means, in accordance with a predetermined condition;
means for managing an available term of the image data stored in said storage means; and
control means for setting independently a control schedule of each of said capture means and said transmission means and effecting control thereof in accordance with the control schedule set independently.

29. An image processing system comprising:
capture means for capturing image data from an image input apparatus disposed on a network;
storage means for storing the plural image data captured by said capture means;
processing and editing means for receiving from the network a processing and editing request for the image data stored in said storage means, and processing and editing the image data;
transmission means for transmitting the image data processed and edited by said processing and editing means; and
control means for setting independently a control schedule of each of said capture means, said processing means and said transmission means and effecting control thereof in accordance with the control schedule set independently.

30. An image processing system comprising:
capture means for capturing image data from an image input apparatus disposed on a network;
storage means for storing the plural image data captured by said capture means;
creation means for creating display image control data from the image data captured by said capture means and information at the image captured time, the display image control data being the data to control an image for display;
transmission means for transmitting the display image control data created by said creation means to a transmission destination;
transmission control means for controlling the transmission destination of the transmission process by said transmission means and a transmission time; and
control means for setting independently a control schedule of each of said capture means, said creation means and said transmission means and effecting control thereof in accordance with the control schedule set independently.

31. An image upload server comprising:
capture means for capturing image data from an image input apparatus disposed on a network;
storage means for storing the plural image data captured by said capture means;
creation means for creating display image control data from the image data captured by said capture means and information at the image capture time, the display image control data being the data to control an image for display;
transmission means for transmitting the display image control data created by said creation means; and
control means for setting independently a control schedule of each of said capture means, said creation means and said transmission means and effecting control thereof in accordance with the control schedule set independently.

32. A server according to claim 31, wherein said creation means selects based on a predetermined estimate standard from the plural image data captured by said capture means an image to be uploaded to the network, and creates the display image control data.

33. An image processing method comprising:
a capture step of capturing image data from an image input apparatus disposed on a network;
a storage step of storing the plural image data captured in said capture step and, beside the image data, information at the image capture time;
a creation step of creating display image control data from the image data captured in said capture step and the information at the image capture time, the display image control data being the data to control an image for display;
a transmission step of transmitting the display image control data created in said creation step; and
a control step of setting independently a control schedule of each of said capture step, said creation step and said transmission step and effecting control thereof in accordance with the control schedule set independently.

34. A method according to claim 33, wherein said control step includes an image capture control step of controlling said capture step in accordance with the schedule designated in advance.

35. A method according to claim 34 wherein said control step includes a transmission control step of performing control to transmit the image data to a predetermined server in accordance with the schedule designated in advance.

36. A method according to claim 33, wherein said creation step creates the display image control data in accordance with a predetermined template which is used to cause at least one of a date and time of the image data capture, a size of the image data, a title, camera control information and information concerning voice to be displayed together with the image data.

37. A method according to claim 33, further comprising a generation step of generating data of a format suitable for processing and editing the image data captured in said capture step and uploading the processed and edited data to the Internet,
wherein said storage step stores the data generated in said generation step.

38. A method according to claim 33, further comprising a control step of receiving a transmission request of an image for display from the network, and controlling said transmission step to transmit the display image control data to a destination from which the transmission request is sent.

39. A method according to claim 33, further comprising a transmission route management step of managing a data transmission route to a transmission destination.

40. A method according to claim 39, wherein said transmission route management step manages at least a transmission route for modem connection and a transmission route for gateway host connection.

41. A method according to claim 33, further comprising a step of receiving an instruction from a user on the network and controlling said capture step to capture the image data at arbitrary timing.

42. A method according to claim 33, wherein said storage step receives the image data from said capture step through the network.

43. A method according to claim 33, wherein the information at the image capture time includes information to control an application program for processing and editing the image data.

44. A method according to claim 33, wherein the processes which are to be performed in said capture step, said storage step, said creation step and said transmission step are performed by plural image processing apparatuses independently disposed on the network.

45. A method according to claim 33, wherein said creation step creates an HTML file.

46. A method according to claim 33, wherein said creation step creates an XML file.

47. A method according to claim 33, further comprising a deletion step of managing an available term of the image data stored in said storage step and deleting the image data of which available term expired in said storage step.

48. A method according to claim 33, wherein said creation step selects based on a predetermined estimate standard from the plural image data captured in said capture step an image to be uploaded to the network, and creates the display image control data.

49. A method according to claim 48, wherein the predetermined estimate standard is based on a degree of similarity to a predetermined image.

50. A method according to claim 49, wherein the predetermined image is a previously set sample image.

51. A method according to claim 49, wherein the predetermined image is an image generated in said generation step till then.

52. A method according to claim 48, further comprising an importance setting step of setting a degree of importance according to the predetermined estimate standard, wherein said creation step synthesizes the plural images in accordance with the degree of importance.

53. A method according to claim 48, further comprising an importance setting step of setting a degree of importance according to the predetermined estimate standard, wherein said generation step selects from the plural images the image to be transmitted, in accordance with the degree of importance.

54. A method according to claim 48, wherein said capture step, said importance setting step and said creation step are achieved by one server.

55. A method according to claim 48, wherein said capture step, said importance setting step and said creation step are achieved by plural servers.

56. A method according to claim 33, wherein said capture step captures the image from a camera disposed on the network.

57. A method according to claim 33, wherein said capture step continuously captures the plural images at a predetermined time interval, from a start date and time of the image data capture.

58. A method according to claim 33, wherein the network is the Internet.

59. A method according to claim 33, further comprising:

an accumulation step of accumulating the image captured in said capture step, and relative information being relative to the image and capable of being selected and displayed from plural languages; and a reception step of receiving an image transmission request from a client, wherein said transmission step reads the image based on the image transmission request received in said reception step and the relative information being relative to the read image and capable of being selected and displayed from the plural languages, and then transmits the read image and relative information to the client.

60. An image processing method comprising:

a capture step of capturing image data from an image input apparatus disposed on a network;

a storage step of storing the plural image data captured in said capture step;

a transmission step of transmitting from the network the image data stored in said storage step, in accordance with a predetermined condition;

a step of managing an available term of the image data stored in said storage step; and a control step of setting independently a control schedule of each of said capture step and said transmission step and effecting control thereof in accordance with the control schedule set independently.

61. An image processing method comprising:

a capture step of capturing image data from an image input apparatus disposed on a network;

a storage step of storing the plural image data captured in said capture step;

a processing and editing step of receiving from the network a processing and editing request for the image data stored in said storage step, and processing and editing the image data;

a transmission step of transmitting the image data processed and edited in said processing and editing step; and a controlling step of setting independently a control schedule of each of said capture step, said processing and editing step and said transmission step and effecting control thereof in accordance with the control schedule set independently.

62. An image processing method comprising:

a capture step of capturing image data from an image input apparatus disposed on a network;

a storage step of storing the plural image data captured in said capture step;

a creation step of creating display image control data by adding information at the image capture time to the image data captured in said capture step, the display image control data being the data to control an image for display;

a transmission step of transmitting the display image control data created in said creation step to a transmission destination;

a transmission control step of controlling the transmission destination of the transmission process in said transmission step and a transmission time; and a controlling step of setting independently a control schedule of each of said capture step, said creation step and said transmission step and effecting control thereof in accordance with the control schedule set independently.

63. A computer-readable recording medium encoded with a computer program for implementing an image processing method, said method comprising:

a capture step of capturing image data from an image input apparatus disposed on a network;

a storage step of storing the plural image data captured in said capture step and, beside the image data, information at the image capture time;

a creation step of creating display image control data from the image data captured in said capture step and the information at the image capture time, the display image control data being the data to control an image for display;

a transmission step of transmitting the display image control data created in said creation step; and a control step of setting independently a control schedule of each of said capture step, said creation step and said transmission step and effecting control thereof in accordance with the control schedule set independently.

64. A medium according to claim 63, wherein said creation step selects based on a predetermined estimate standard from the plural image data captured in said capture step an image to be uploaded to the network, and creates the display image control data.

65. A computer-readable recording medium encoded with a computer program for implementing an image processing method, said method comprising:

a capture step of capturing image data from an image input apparatus disposed on a network;

a storage step of storing the plural image data captured in said capture step;

a transmission step of transmitting from the network the image data stored in said storage step, in accordance with a predetermined condition;

a step of managing an available term of the image data stored in said storage step; and a control step of setting independently a control schedule of each of said capture step and said transmission step and effecting control thereof in accordance with the control schedule set independently.

66. A computer-readable recording medium encoded with a computer program for implementing an image processing method, said method comprising:

a capture step of capturing image data from an image input apparatus disposed on a network;

a storage step of storing the plural image data captured in said capture step;

a processing and editing step of receiving from the network a processing and editing request for the image data stored in said storage step, and processing and editing the image data;

a transmission step of transmitting the image data processed and edited in said processing and editing step; and a control step of setting independently a control schedule of each of said capture step, said processing and editing step and said transmission step and effecting control thereof in accordance with the control schedule set independently.

67. A computer-readable recording medium encoded with a computer program for implementing an image processing method, said method comprising:

a capture step of capturing image data from an image input apparatus disposed on a network;

a storage step of storing the plural image data captured in said capture step;

a creation step of creating display image control data by adding information at the image capture time to the image data captured in said capture step, the display image control data being the data to control an image for display;

a transmission step of transmitting the display image control data created in said creation step to a transmission destination;

a transmission control step of controlling the transmission destination of the transmission process in said transmission step and a transmission time; and a control step of setting independently a control schedule of each of said capture step, said creation step and said transmission step and effecting control thereof in accordance with the control schedule set independently.

68. An image upload system comprising:

capture means for capturing plural image data and information at image capture time from an image input apparatus disposed on a network;

creation means for creating display image control data from the image data and the information at the image capture time captured by said capture means, the display image control data being the data to control an image for display;

storage means for storing the display image control data created by said creation means; and control means for setting independently a control schedule of each of said capture means and said creation means and effecting control thereof in accordance with the control schedule set independently.

69. An image accumulation apparatus comprising:

accumulation means for accumulating an image, and relative information being relative to the image and capable of being selected and displayed from plural languages;

reception means for receiving an image transmission request from a client; and transmission means for reading the image based on the image transmission request received by said reception means and the relative information being relative to the image and capable of being selected and displayed from the plural languages, and transmitting the read image and relative information to the client, wherein the image and the relative information, to be accumulated in said accumulation means, are produced and transmitted to said image accumulation apparatus, respectively in accordance with control schedules designated independently in advance.

70. A control method for an image accumulation apparatus, comprising:

a reception step of receiving an image transmission request from a client; and a transmission step of reading from an accumulation means the image based on the image transmission request received in said reception step and relative information being relative to the image and capable of being selected and displayed from plural languages, and transmitting the read image and relative information to the client, wherein the image and the relative information, to be read in said transmission step, are produced and transmitted to said image accumulation apparatus, respectively in accordance with control schedules designated independently in advance.

* * * * *